United States Patent
Hamada et al.

(10) Patent No.: US 7,523,721 B2
(45) Date of Patent: Apr. 28, 2009

(54) HEAT EXCHANGER AND WATER HEATER

(75) Inventors: Tetsurou Hamada, Hyogo (JP); Hitoshi Hara, Hyogo (JP); Hideaki Yoshitomi, Hyogo (JP); Kozo Uehara, Hyogo (JP); Hiroaki Takashima, Hyogo (JP)

(73) Assignee: Noritz Corporation, Hyogo (JP)

( * ) Notice: Subject to any disclaimer, the term of this patent is extended or adjusted under 35 U.S.C. 154(b) by 117 days.

(21) Appl. No.: 11/596,036

(22) PCT Filed: May 10, 2005

(86) PCT No.: PCT/JP2005/008542

§ 371 (c)(1),
(2), (4) Date: Nov. 9, 2006

(87) PCT Pub. No.: WO2005/108876

PCT Pub. Date: Nov. 17, 2005

(65) Prior Publication Data

US 2007/0209606 A1   Sep. 13, 2007

(30) Foreign Application Priority Data

May 11, 2004 (JP) ............................ 2004-141335
May 11, 2004 (JP) ............................ 2004-141337

(51) Int. Cl.
*F22B 1/02* (2006.01)
(52) U.S. Cl. ...................... 122/31.1; 122/33
(58) Field of Classification Search ................ 122/18.1, 122/28, 31.1, 33, 235.11, 235.17, 250 R, 122/251, 271
See application file for complete search history.

(56) References Cited

U.S. PATENT DOCUMENTS 4,502,626 A * 3/1985 Gerstmann et al. ......... 122/44.2

(Continued)

FOREIGN PATENT DOCUMENTS

JP           37-8883 B1        7/1962

(Continued)

OTHER PUBLICATIONS

English Translation of Form PCT/IPEA/409 for PCT/JP2005/008542, File Ref. #2005-002WO, Int'l Filing Date May 10, 2005 (6 pages).

(Continued)

*Primary Examiner*—Gregory A Wilson
(74) *Attorney, Agent, or Firm*—Rader, Fishman & Grauer, PLLC

(57) ABSTRACT

A heat exchanger A1 includes a partition 19 partitioning the space 35 surrounded by a coiled tube 60 at an axially intermediate portion of a housing 2 into a first and a second regions 35*a* and 35*b* and partitioning the coiled tube 60 into a first and a second heat exchanging portions HT1 and HT2. The combustion gas supplied to the first region 35*a* flows to a combustion gas path 36 by passing through a clearance 61 of the first heat exchanging portion HT1 and then passes through a clearance 61 of the second heat exchanging portion HT2. With this structure, the amount of heat recovery is increased, and the heat exchange efficiency is enhanced while simplifying the overall structure of the heat exchanger A1 and reducing the size of the heat exchanger.

19 Claims, 41 Drawing Sheets

U.S. PATENT DOCUMENTS

| | | | | |
|---|---|---|---|---|
| 4,531,572 | A | * | 7/1985 | Molitor .................. 219/201 |
| 6,305,331 | B1 | * | 10/2001 | Fullemann et al. ......... 122/18.3 |
| 7,281,497 | B2 | * | 10/2007 | Le Mer et al. ............ 122/31.2 |
| 7,302,916 | B2 | * | 12/2007 | LeMer et al. ............. 122/18.1 |
| 2006/0102106 | A1 | * | 5/2006 | Le Mer et al. ............ 122/32 |

FOREIGN PATENT DOCUMENTS

| | | | |
|---|---|---|---|
| JP | 48-3648 | U | 1/1973 |
| JP | 51-21156 | U | 2/1976 |
| JP | 53-43253 | U | 4/1978 |
| JP | 55-48241 | U | 3/1980 |
| JP | 55-127944 | U | 9/1980 |
| JP | 57-82687 | A | 5/1982 |
| JP | 57-161484 | A | 10/1982 |
| JP | 57-200853 | U | 12/1982 |
| JP | 58-12944 | A | 1/1983 |
| JP | 59-1943 | A | 1/1984 |
| JP | 59-066646 | A | 4/1984 |
| JP | 59-67748 | U | 5/1984 |
| JP | 59-170642 | A | 9/1984 |
| JP | 59-172945 | U | 11/1984 |
| JP | 61-69676 | U | 5/1986 |
| JP | 61-74779 | U | 5/1986 |
| JP | 62-288446 | A | 12/1987 |
| JP | 63-220091 | A | 9/1988 |
| JP | 03-7741 | B2 | 2/1991 |
| JP | 06-42812 | A | 2/1994 |
| JP | 06-331220 | A | 11/1994 |
| JP | 07-77397 | A | 3/1995 |
| JP | 09-033103 | A | 2/1997 |
| JP | 10-48168 | A | 2/1998 |
| JP | 11-23067 | A | 1/1999 |
| JP | 2000-055466 | A | 2/2000 |
| JP | 2000-074418 | A | 3/2000 |
| JP | 2001-065801 | A | 3/2001 |
| JP | 2001-141308 | A | 5/2001 |
| JP | 2002-323291 | A | 11/2002 |
| JP | 2004-610 | | 1/2004 |
| JP | 2004-44914 | A | 2/2004 |
| JP | 2006-503260 | A | 1/2006 |
| WO | WO-2004/036121 | | 4/2004 |

OTHER PUBLICATIONS

International Search Report (Jun. 28, 2005).

* cited by examiner

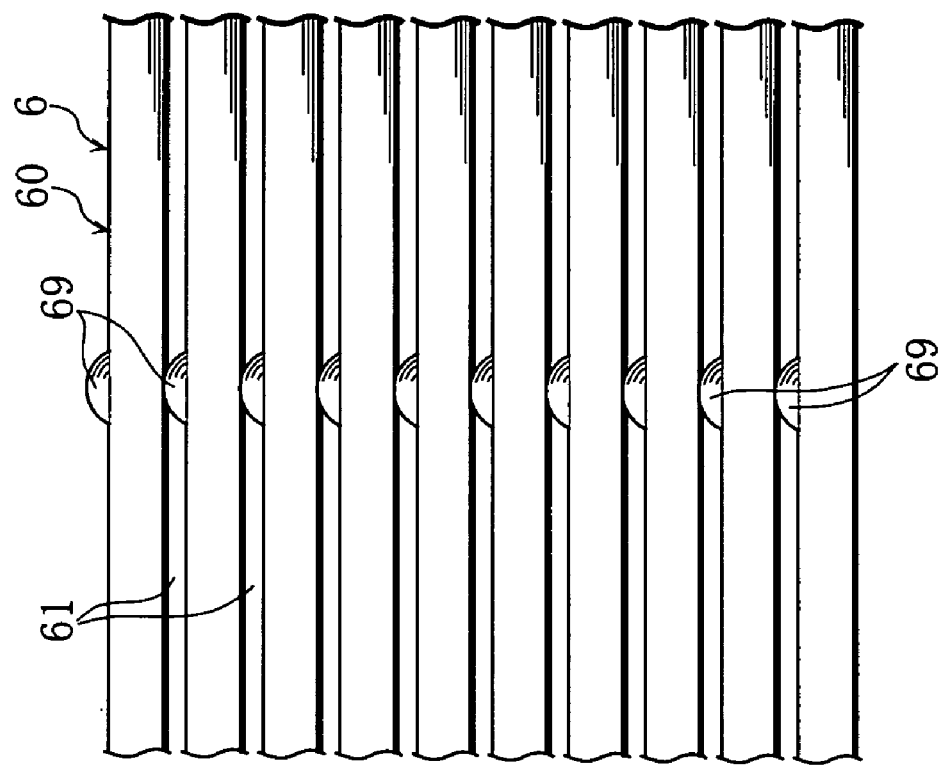
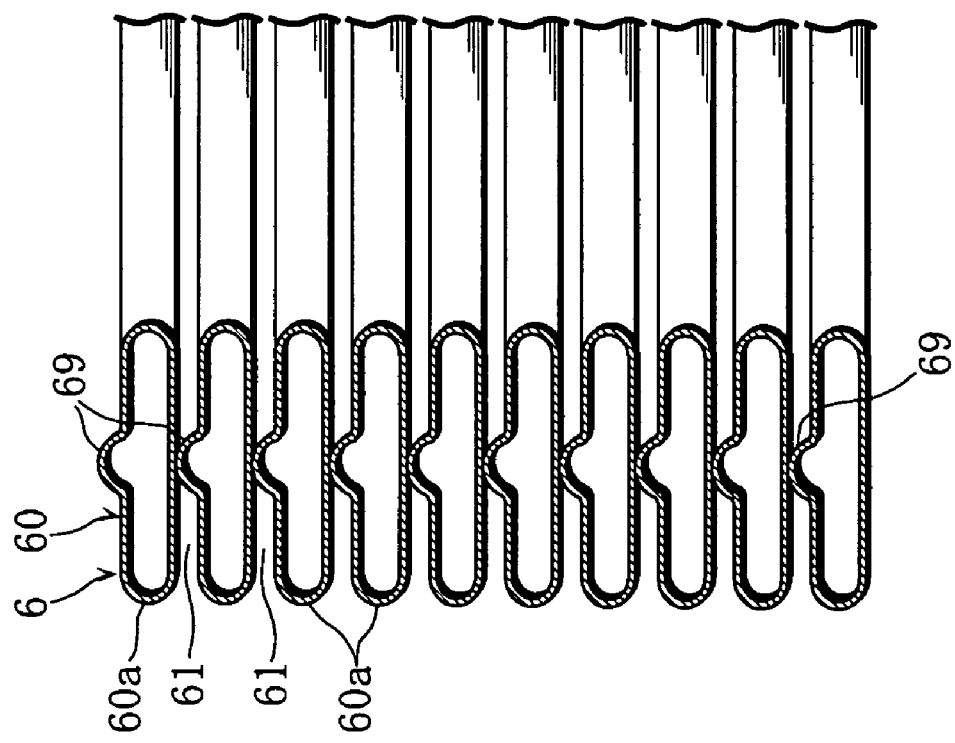

HEAT EXCHANGER AND WATER HEATER

TECHNICAL FIELD

The present invention relates to a heat exchanger for recovering heat from combustion gas and to a water heater incorporating a heat exchanger.

BACKGROUND ART

Examples of heat exchanger are disclosed in Patent Documents 1 and 2. As shown in FIG. 52, the heat exchanger disclosed in the Patent Document 1 includes a heat exchange coiled tube 40e placed in a housing 2e. The bottom of the space 3e surrounded by the coiled tube 40e is closed by a partition 6e. In the heat exchanger, when combustion gas is introduced from the top of the housing 2e, the combustion gas flows out from the space 3e by passing through the clearances of the coiled tube 40e and is discharged to the outside through the bottom opening of the housing 2e. On the other hand, a medium is supplied to the coiled tube 40e through one end thereof, and the medium is heated by the combustion gas. The heated medium flows out of the coiled tube 40e through the other end thereof. In the head exchanger, the coiled tube 40e comprises a single helical tube, and the structure is simple as compared with a heat exchanger utilizing a large number of finned tubes, for example. Therefore, this structure is suitable for reducing the manufacturing cost and the size of the entire heat exchanger.

As shown in FIG. 53, in the heat exchanger disclosed in the Patent Document 2, a burner 90A is arranged at a lower portion of a housing 91A, and a coiled water tube 96 is provided in the housing. The water tube 96 includes a plurality of loops 96a, and baffles 97A for preventing combustion gas from flowing into the loops 96a and baffles 97B for preventing combustion gas from flowing through the space around the loops 96a are alternately provided at or around the loops. With this arrangement, the combustion gas flows alternately inside and outside of the loops 60a of the water tube 96, whereby the amount of heat transfer from the combustion gas to the water tube 96 can be increased.

However, the above-described conventional structures have the following problems.

In the conventional structure shown in FIG. 52, combustion gas flows only in one direction i.e., from inside to outside of the coiled tube 40e through the clearances. Therefore, the amount of heat transfer is small. Moreover, since the area of the overall length of the coiled tube 40e provides a large flow path area for allowing passing of combustion gas at the same time, the combustion gas is liable to act locally on one portion of the coiled tube body 40e. Therefore, in this conventional structure, the heat exchange efficiency is low. In recent years, for the purpose of environmental protection by fuel saving, reduction of the running cost and so on, the enhancement of the heat exchange efficiency of a heat exchanger is strongly needed. As effective means to enhance the heat exchange efficiency, it may be considered to recover latent heat from combustion gas (more precisely, latent heat of water vapor in combustion gas) in addition to sensible heat. However, with the conventional structure, it is difficult to recover such latent heat.

On the other hand, the conventional structure shown in FIG. 53 has a complicated structure including the same number of baffles 97A, 97B as the loops 96a in the housing 91A. Further, the diameter of the baffles 97A, 97B is generally equal to or larger than the diameter of the loops 96a, and the size is large, whereby the manufacturing cost is increased. Further, since the baffles 97A, 97B absorb heat upon its contact with the combustion gas and hence causes loss, and the provision of a large number of baffles increases the heat capacity in the entire housing 91A. Therefore, the rise time of the temperature of water in the water tube 96 in starting the hot water supply is long, so that the ability for use in an instantaneous water heater is insufficient. Moreover, since the water tube 96 comprises a single helical tube similarly to the conventional structure shown in FIG. 52, it is difficult to obtain high heat exchange efficiency in spite of the complicated overall structure.

Patent Document 1: JP-U 61-69676
Patent Document 2: JP-A 59-66646

DISCLOSURE OF THE INVENTION

Problems to be Solved by the Invention

An object of the present invention is to solve or lessen the above-described problems of the conventional structures.

Means for Solving the Problems

According to a first aspect of the present invention, thereis provided a heat exchanger comprising a housing including axially opposite ends formed with a burner opening and a combustion gas outlet, respectively, a heat-exchange coiled tube including a plurality of loops arranged in the housing along the axial direction via a plurality of clearances, a space surrounded by the coiled tube and having one end communicating with the burner opening, and a combustion gas path formed around the coiled tube for guiding the combustion gas flowed thereto to the combustion gas outlet. The heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances. The combustion gas supplied to the first region flows to the combustion gas path by passing through a plurality of clearances of the first heat exchanging portion and then passes through a plurality of clearances of the second heat exchanging portion.

Preferably, the housing includes a cylindrical circumferential wall, and the combustion gas path is defined between the circumferential wall and the coiled tube.

Preferably, the coiled tube comprises a flat tube having a thickness in the axial direction and a width in a direction crossing the axial direction, and the width is larger than the thickness.

Preferably, the width of the flat tube is larger in the second heat exchanging portion than in the first heat exchanging portion.

Preferably, at least part of the coiled tube is inclined to reduce height as proceeding in a direction in which the combustion gas passes through the clearance.

Preferably, the heat exchanger according to the present invention further comprises a plurality of tube modules each including opposite ends for connection and an intermediate portion in the form of a loop which is flat in section, and water flow means connected to the opposite ends of the plurality of tube modules for enabling water flow in the tube modules with the tube modules arranged along the axial direction in the housing. The plurality of tube modules provide the coiled tube.

Preferably, the first and the second heat exchanging portions differ from each other in dimension of the clearance.

Preferably, the heat exchanger according to the present invention further comprises at least one additional coiled tube which differs from said coiled tube in either one of diameter of the loops and width of the loops, and the plurality of coiled tubes are arranged in a lap winding manner to form a tube lap winding structure in which the plurality of loops are arranged along the axial direction and along a direction crossing the axial direction. The tube lap winding structure is partitioned into the first and the second heat exchanging portions.

Preferably, each of the coiled tubes comprises a helical tube in which the plurality of loops are helically connected to each other.

Preferably, the plurality of coiled tubes are equal to each other in tube diameter.

Preferably, the plurality of coiled tubes are unequal to each other in tube diameter, and the innermost coiled tube has the largest tube diameter.

Preferably, the first and the second heat exchanging portions are partitioned from each other by either of the partition and a member separate from the partition.

Preferably, the heat exchanger according to the present invention further comprises a partitioning portion closing a gap between an end of the coiled tube and the housing and preventing the combustion gas from flowing directly from the first region to an end of the combustion gas path which is adjacent to the burner opening.

Preferably, in the heat exchanger according to the present invention, the combustion gas path is formed continuously around the first and the second heat exchanging portions, and the heat exchanger further comprises a partitioning portion closing an end of the combustion gas path which is adjacent to the combustion gas outlet and preventing the combustion gas reached the end from flowing directly to the second region.

Preferably, the heat exchanger according to the present invention further comprises a first auxiliary partition partitioning each of the second heat exchanging portion and the combustion gas path in the axial direction into two divided portions and causing the combustion gas passed a portion of the combustion gas path around the first heat exchanging portion to flow to a clearance of one of the divided portions of the second heat exchanging portion to guide the combustion gas into the second region, and a second auxiliary partition for preventing the combustion gas guided into the second region from directly flowing to the combustion gas outlet and causing the combustion gas to flow to a clearance of another one of the divided portions of the second heat exchanging portion.

Preferably, the second heat exchanging portion is extended beyond the second auxiliary partition toward the combustion gas outlet, and the combustion gas flowed to a portion of the combustion gas path which surrounds the extended portion passes through a clearance of the extended portion.

According to a second aspect of the present invention, there is provided a water heater comprising a burner and a heat exchanger for recovering heat from combustion gas generated by the burner. The heat exchanger comprises a housing including axially opposite ends formed with a burner opening and a combustion gas outlet, respectively, a heat-exchange coiled tube including a plurality of loops arranged in the housing along the axial direction via a plurality of clearances, a space surrounded by the coiled tube and having one end communicating with the burner opening, and a combustion gas path formed around the coiled tube for guiding the combustion gas flowed thereto to the combustion gas outlet. The heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances. The combustion gas supplied to the first region flows to the combustion gas path by passing through a plurality of clearances of the first heat exchanging portion and then passes through a plurality of clearances of the second heat exchanging portion.

Preferably, the housing includes a cylindrical circumferential wall, and the combustion gas path is defined between the circumferential wall and the coiled tube.

Preferably, a water inflow tube is connected to the second heat exchanging portion, whereas a hot-water outflow tube is connected to the first heat exchanging portion, and water from the water inflow tube flows through the first heat exchanging portion after flowing through the second heat exchanging portion.

Preferably, a water inflow tube is connected to the first heat exchanging portion, whereas a hot-water outflow tube is connected to the second heat exchanging portion, and water from the water inflow tube flows through the second heat exchanging portion after flowing through the first heat exchanging portion.

Preferably, the heat exchanger is so oriented that the burner opening is positioned higher than the combustion gas outlet, and the burner is connected to an upper portion of the heat exchanger and burns fuel downward. A bottom casing for guiding combustion gas flowed downward through the combustion gas outlet to an exhaust port is connected to a lower portion of the heat exchanger.

Preferably, the water heater further comprises a drain receiving portion provided in the housing of the heat exchanger for receiving drain dropping from the coiled tube, and drain discharge means for discharging drain received by the drain receiving portion to outside of the heat exchanger so that the drain does not flow into the bottom casing.

Preferably, the heat exchanger is so configured that drain dropping from the coiled tube is guided to the combustion gas outlet, and a drain receiving member for receiving drain dropping through the combustion gas outlet and discharging the drain to outside of the bottom casing is provided in the bottom casing.

Preferably, the heat exchanger is so configured that drain dropping from the coiled tube is guided to the combustion gas outlet, and the bottom casing includes a bottom wall for receiving drain dropping through the combustion gas outlet and a discharge port for discharging the drain received on the bottom wall to outside.

Preferably, the heat exchanger is so oriented that the burner opening is positioned lower than the combustion gas outlet, and the burner is connected to a lower portion of the heat exchanger and burns fuel upward. The heat exchanger further comprises a drain receiving portion for receiving drain dropping from the coiled tube, and drain discharge means for discharging the drain received by the drain receiving portion to outside of the heat exchanger so that the drain does not drop onto the burner.

Preferably, each of the loops is rectangular, and the housing includes a circumferential wall which is in the form of a rectangular cylinder and which surrounds the loops. The combustion gas path is defined between the circumferential wall and the loops.

Other features and advantages of the present invention will become more apparent from description of embodiments of the present invention given below with reference to the accompanying drawings.

BRIEF DESCRIPTION OF THE DRAWINGS

FIG. 3A is a plan view showing an example of tube module constituting a heat-exchange water tube, whereas

FIG. 11A is a sectional view showing another example of heat exchanger according to the present invention, whereas

FIG. 12A is a sectional view showing another example of heat exchanger according to the present invention, whereas

FIG. 15A is a sectional view showing a principal portion of an example of double tube structure of a heat-exchange water tube, whereas

FIG. 16A is a sectional view showing a principal portion of another example of means for forming clearances in a coiled tube in the present invention, whereas FIG. 16B is a left side view of the principal portion.

FIG. 46A is a side view showing a principal portion of another example of means for forming clearances in a coiled tube, whereas

BEST MODE FOR CARRYING OUT THE INVENTION

Preferred embodiments of the present invention will be described below in detail with reference to the accompanying drawings.

Figure 1:
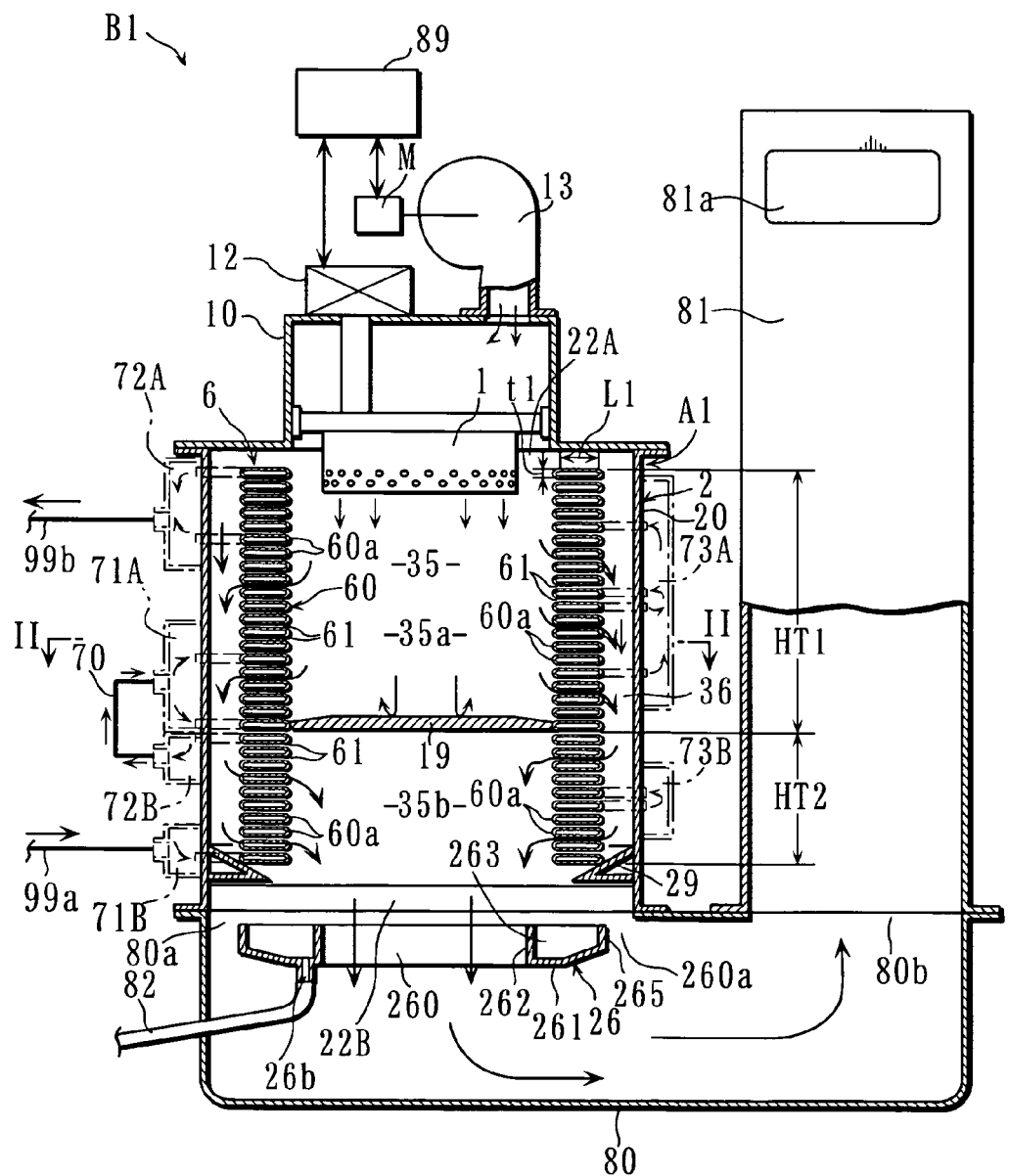
FIG. 1 is a schematic sectional view showing an example of heat exchanger and water heater incorporating the heat exchanger according to the present invention.
Figure 2:
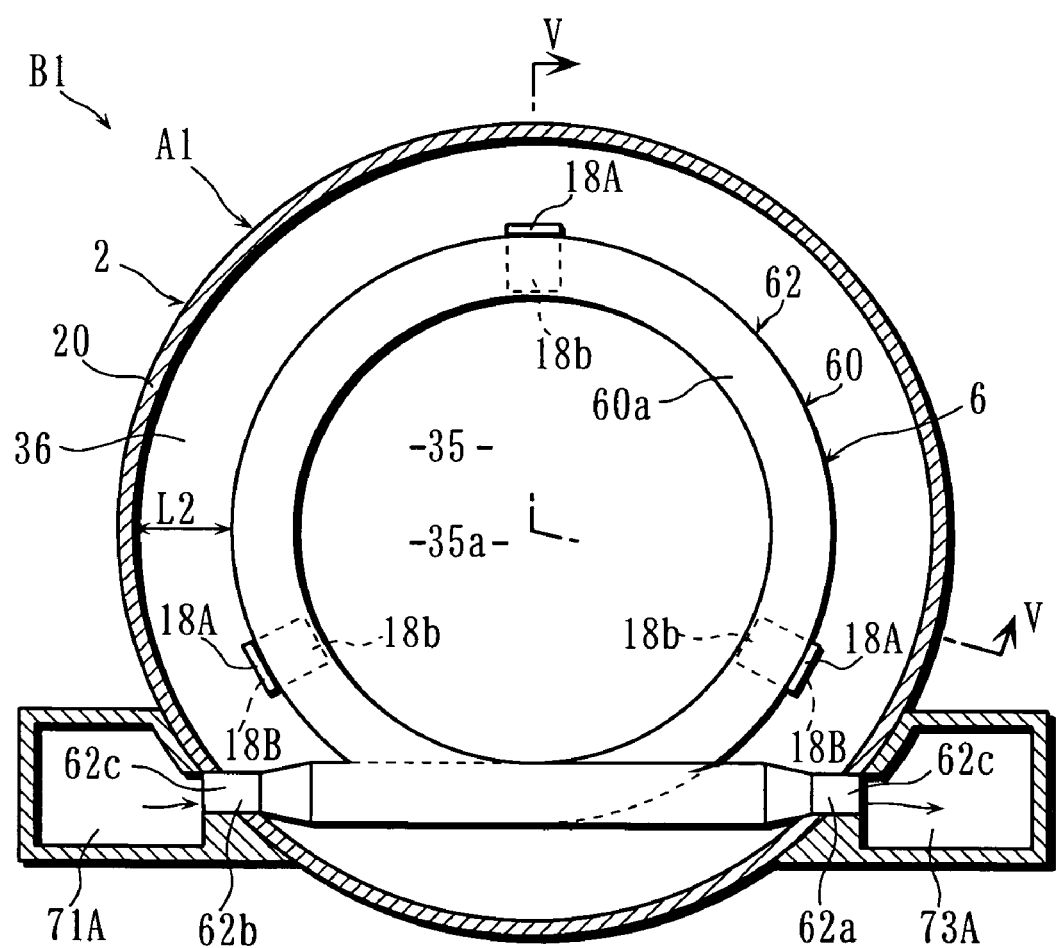
FIG. 2 is a sectional view taken along lines II-II in FIG. 1.

FIG. 1 shows an example of heat exchanger and water heater incorporating the heat exchanger according to the present invention. FIGS. 2-6 show the structure of the heat exchanger shown in FIG. 1 and the related parts thereof. As better shown in FIG. 1, the water heater B1 of this embodiment includes a burner 1, a bottom casing 80, an exhaust duct 81 and a controller 89 in addition to the heat exchanger A1.

The burner 1 is a reverse-combustion burner in which the gas obtained by vaporizing kerosene as the fuel is burned downward or kerosene is jetted downward for burning. The burner is arranged at an upper portion in the heat exchanger A1 or thereabove. On the heat exchanger A1, a housing 10 which is generally in the form of a box having an open bottom is placed. The burner 1 is supported in the housing 10. A fan 13 for supplying air for combustion downwardly into the housing 10 is provided on the housing 10. The air supply by the fan 13 is helpful for causing the air for combustion to flow in the heat exchanger A1 along a predetermined path, which will be described later. On the housing 10, a fuel supply unit 12 is also mounted which serves to supply fuel to the burner 1 and is capable of adjusting the supply. The controller 89 comprises a microcomputer including a CPU and a memory coupled thereto. Though detailed description is omitted, the controller 89 determines the combustion power level of the burner 1 in accordance with certain conditions and controls the fuel supply from the fuel supply unit 12 to the burner 1 and the number of revolutions of the motor M of the fan 13 so that the burner 1 can be adjusted at the determined combustion power level.

The heat exchanger A1 includes a housing 2 and a heat-exchange water tube 6. Both of the housing 2 and the water tube 6 are made of stainless steel so as not to be easily corroded by the drain which is produced when latent heat is recovered from combustion gas by utilizing the water tube 6. Specifically, when the latent heat is recovered from the combustion gas, water vapor in the combustion gas is condensed to produce drain (condensate water), and the drain adheres to a surface of the water tube 6. Generally, the drain, which has absorbed sulfur oxide, nitrogen oxide and so on contained in the combustion gas, has a strong acidity of about pH 3. Therefore, the housing 2 and the water tube 6 are made of a material having an excellent acid resistance. A drain receiving portion 26, a partition 19 and spacers 18, which will be described later, are also made of stainless steel.

The housing 2 is connected to a bottom of the housing 10 and includes a generally cylindrical circumferential wall 20. The housing 2 has an upper portion and a lower portion respectively formed with a burner opening 22A and a combustion gas outlet 22B. The burner opening 22A is utilized for introducing combustion gas from the burner 1 or inserting and mounting the burner 1 in the housing 2. In this embodiment, the burner 1 is partially inserted in the housing 2 through the burner opening 22A.

The water tube 6 includes a coiled tube 60 arranged in the housing 2 and including a plurality of loops 60a arranged along the height direction of the heat exchanger A via clearances 61. In a space 35 surrounded by the coiled tube 60, a partition 19 is provided at an intermediate portion of the space in the height direction. Therefore, the space 35 is partitioned into a first and a second regions 35a and 35b positioned above and below the partition 19, respectively. The partition 19 is in the form of a circular plate corresponding to the shape of the space 35 and mounted to the inner circumference of the coiled tube 60 by welding, for example. Similarly to the embodiment which will be described later with reference to FIGS. 17-21, the partition 19 may have a laminated structure obtained by covering a surface of a metal plate with a heat insulating material or a structure in which the upper surface which contacts the combustion gas is dented.

The coiled tube 60 includes a first heat exchanging portion HT1 and a second heat exchanging portion HT2 surrounding the first region 35a and the second region 35b, respectively. Each of the heat exchanging portions includes a plurality of loops 60a and a plurality of clearances 61. A combustion gas path 36 extending in the height direction of the housing 2 is continuously formed between the outer circumference of the coiled tube 60 and the circumferential wall 20 of the housing 2. However, a ring-shaped guide 29 closing the bottom of the combustion gas path 36 is provided at a lower portion of the circumferential wall 20. Therefore, the combustion gas flowed to the end adjacent to the bottom of the combustion gas path 36 enters the second region 35b by passing through the clearances 61 of the second heat exchanging portion HT2. The guide 29 has an upper surface which is inclined to become lower as proceeding toward the center of the housing 2 and part of which is positioned below the lowermost loop 60a of the second heat exchanging portion HT2. With this structure, the drain dropped from the loops 60a onto the guide 29 can be properly guided to the drain receiving portion 26.

Figure 3A:
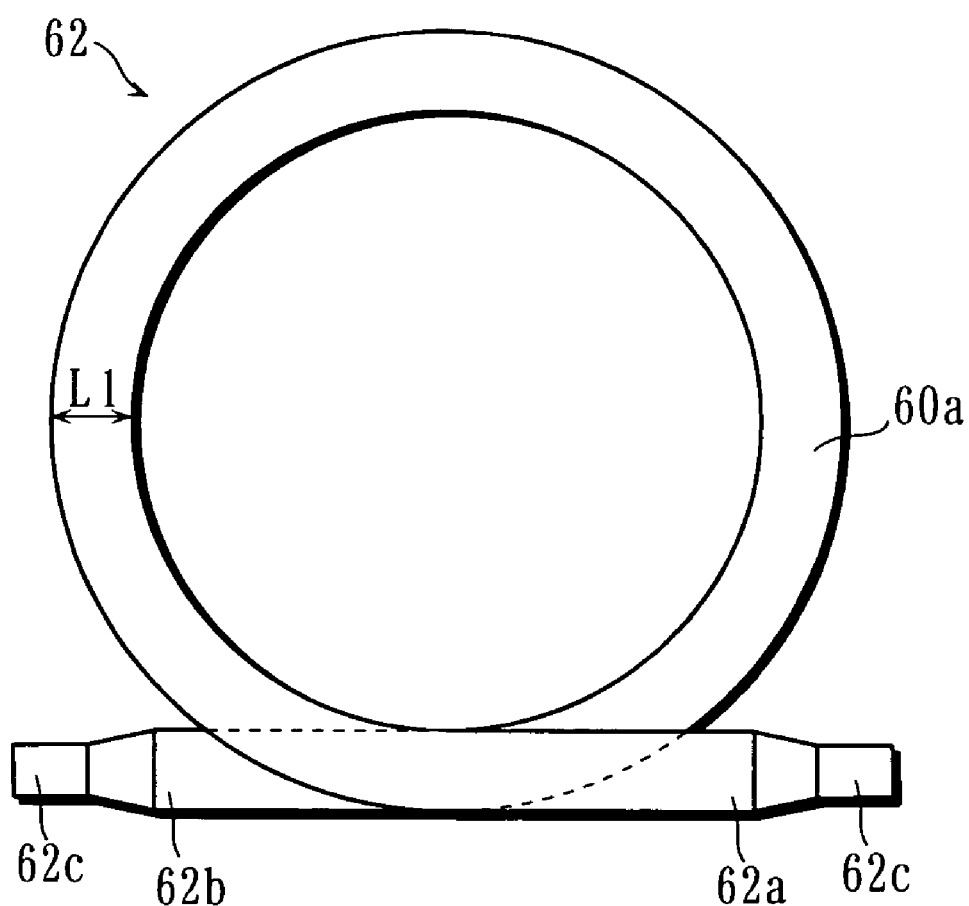
Figure 3B:
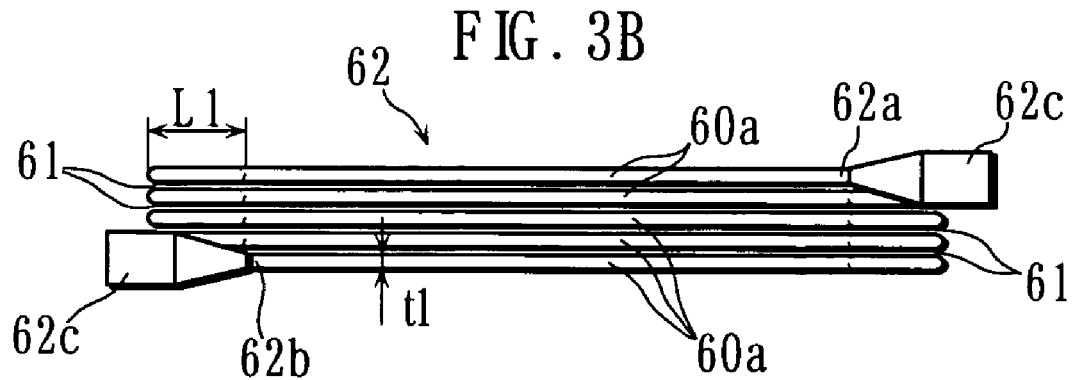
FIG. 3B is a front view thereof.

The water tube 6 is formed by stacking a plurality of tube modules 62 having the same size and shape in the housing 2. Specifically, as shown in FIG. 3, each of the tube modules 62 includes apart made up of e.g. five loops 60a which are generally annular in plan view and stacked in the thickness direction thereof. This part has a first and a second ends 62a and 62b each of which is provided with a connection plug 62c. The five loops 60a are helically connected to each other. The tube module 62 is made of stainless steel and comprises a flat tube whose width L1 is larger than the thickness t1 throughout the length thereof except for the portions provided with the connection plugs 62c. Specifically, the thickness t1 may be about 5 mm, whereas the width L1 may be about 25 mm, for example.

Figure 4:
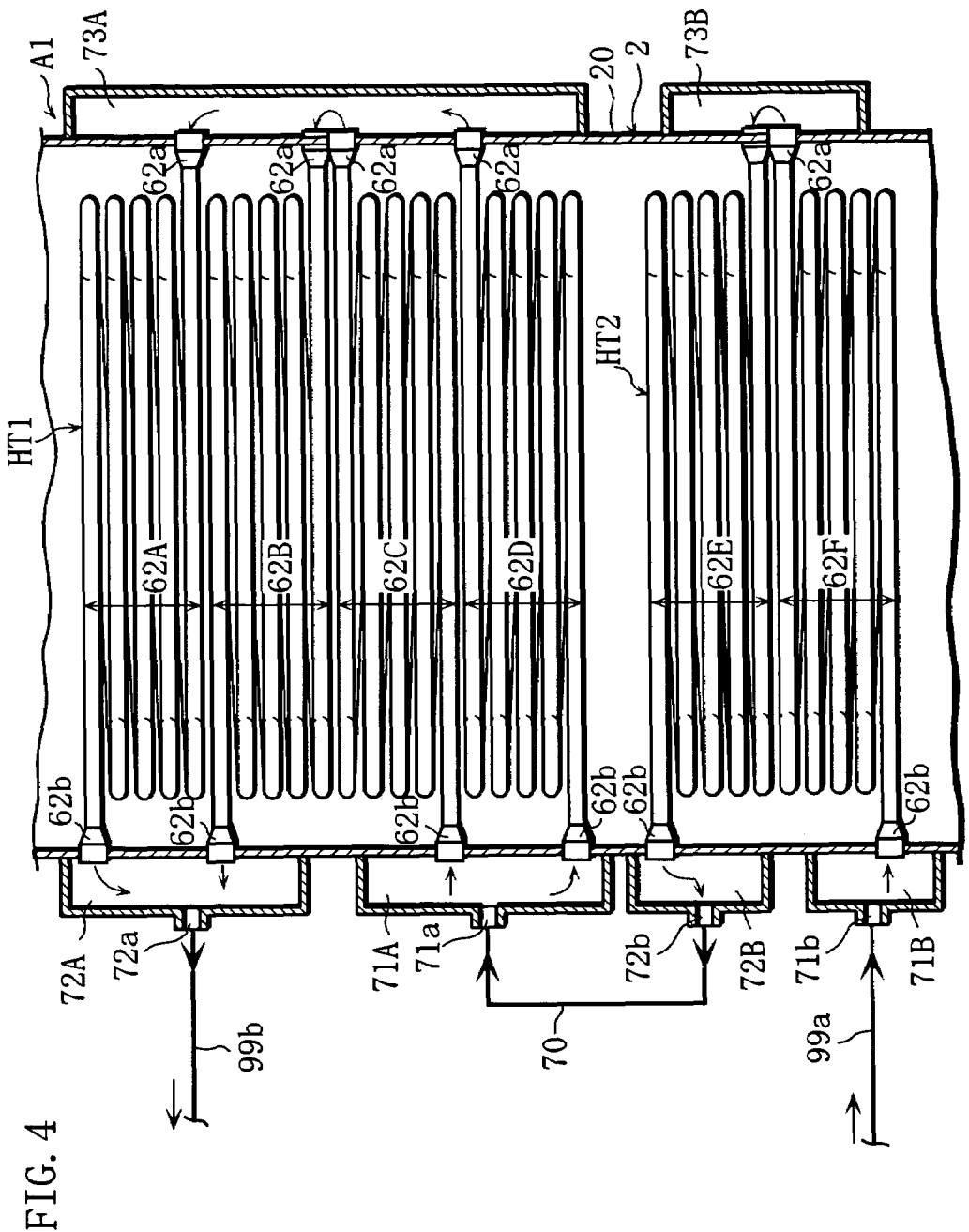
FIG. 4 is a sectional view showing a principal portion of the water heater shown in FIG. 1.

As shown in FIG. 4, for example, the water tube 6 includes six tube modules 62A-62F (62) stacked vertically in the height direction. Although six tube modules 62 are described in this embodiment for easier understanding, the number of tube modules is not limited to six. The first heat exchanging portion HT1 includes upper four tube modules 62A-62D, whereas the second heat exchanging portion HT2 includes lower two tube modules 62E and 62F.

As a header for connecting and supporting the plurality of tube modules 62, the housing 2 is provided with water inflow chambers 71A, 71B formed with water inlet 71a, 71b, hot-water outflow chambers 72A, 72B formed with hot-water outlets 72a, 72b, and common chambers 73A, 73B. For example, the chambers may be formed by welding appropriate casing members to the outer surface of the circumferential wall 20.

The respective first ends 62a of the tube modules 62A-62D of the first heat exchanging portion HT1 are connected to the common chamber 73A. The respective second ends 62b of the tube modules 62C and 62D are connected to the water inflow chamber 71A. The respective second ends 62b of the tube modules 62A and 62B are connected to the hot-water outflow chamber 72A. With this structure, in the first heat exchanging portion HT1, the water entered the water inflow chamber 71A through the water inlet 71*a* flows into the common chamber 73A through the two tube modules 62C, 62D, flows into the tube modules 62A, 62B through the first ends 62*a* to reach the hot-water outflow chamber 72A, and then exits as hot water through the hot-water outlet 72*a*. To the hot-water outlet 72*a* is connected a hot-water outflow tube 99*b*, which is connected to a desired hot-water destination.

The respective first ends 62*a* of the tube modules 62E and 62F of the second heat exchanging portion HT2 are connected to the common chamber 73B. The second end 62*b* of the lower tube module 62F is connected to the water inflow chamber 71B, whereas the second end 62*b* of the upper tube module 62E is connected to the hot-water outflow chamber 72B. With this structure, in the second heat exchanging portion HT2, the water entered the water inflow chamber 71B through the water inlet 71*b* flows into the common chamber 73B through the tube module 62F, flows into the tube module 62E through the first end 62*a* to reach the hot-water outflow chamber 72B, and then exits as hot water through the hot-water outlet 72*b*. To the water inlet 71*b* is connected a water inflow tube 99*a* for supplying water from the outside. The hot-water outlet 72*b* and the water inlet 71*a* are connected to each other via a pipe 70. Therefore, in the heat exchanger A, the water supplied through the water inflow tube 99*a* flows through the second heat exchanging portion HT2 and then enters the first heat exchanging portion HT1.

Figure 5:
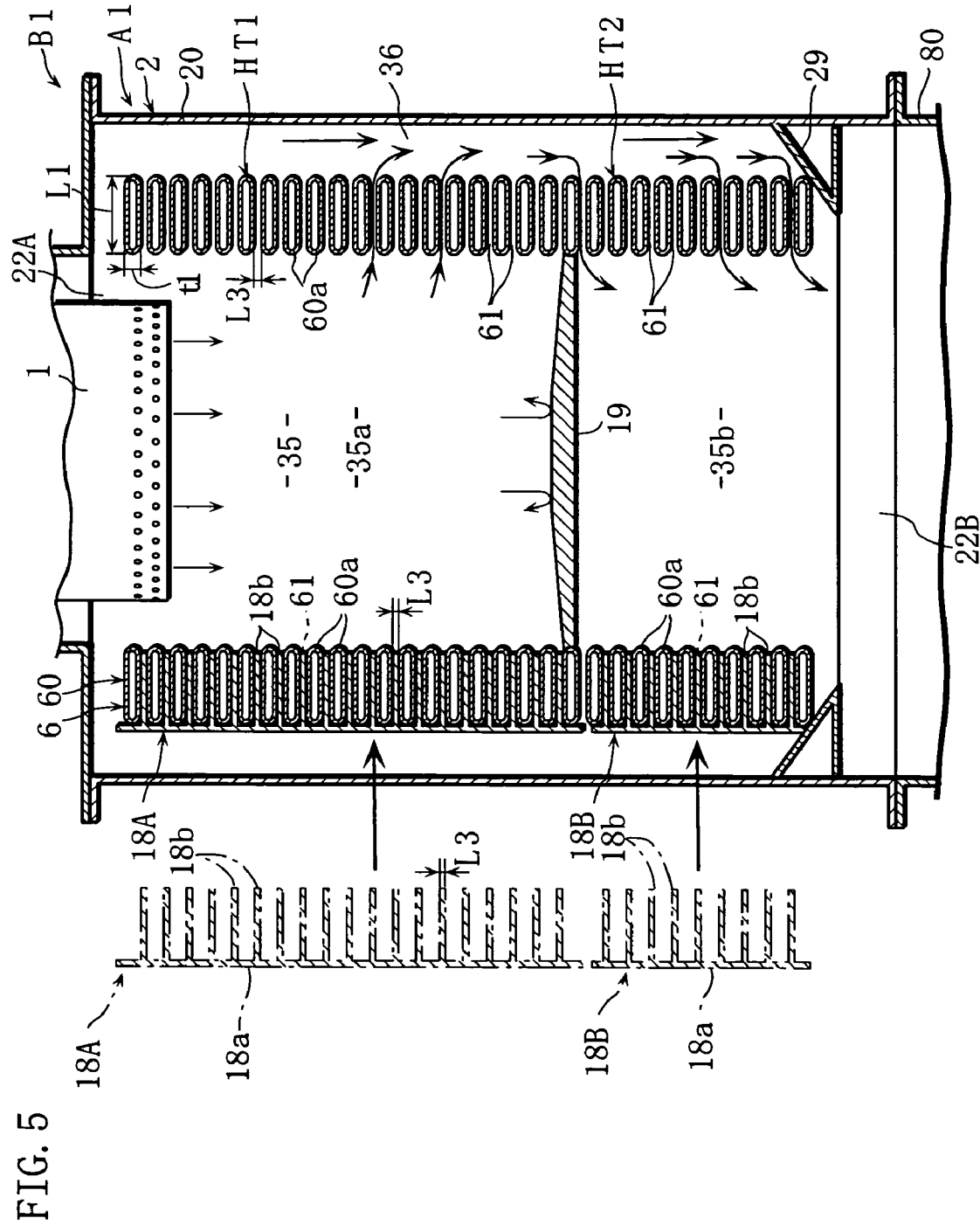
FIG. 5 is a sectional view taken along lines V-V in FIG. 2.
Figure 6:
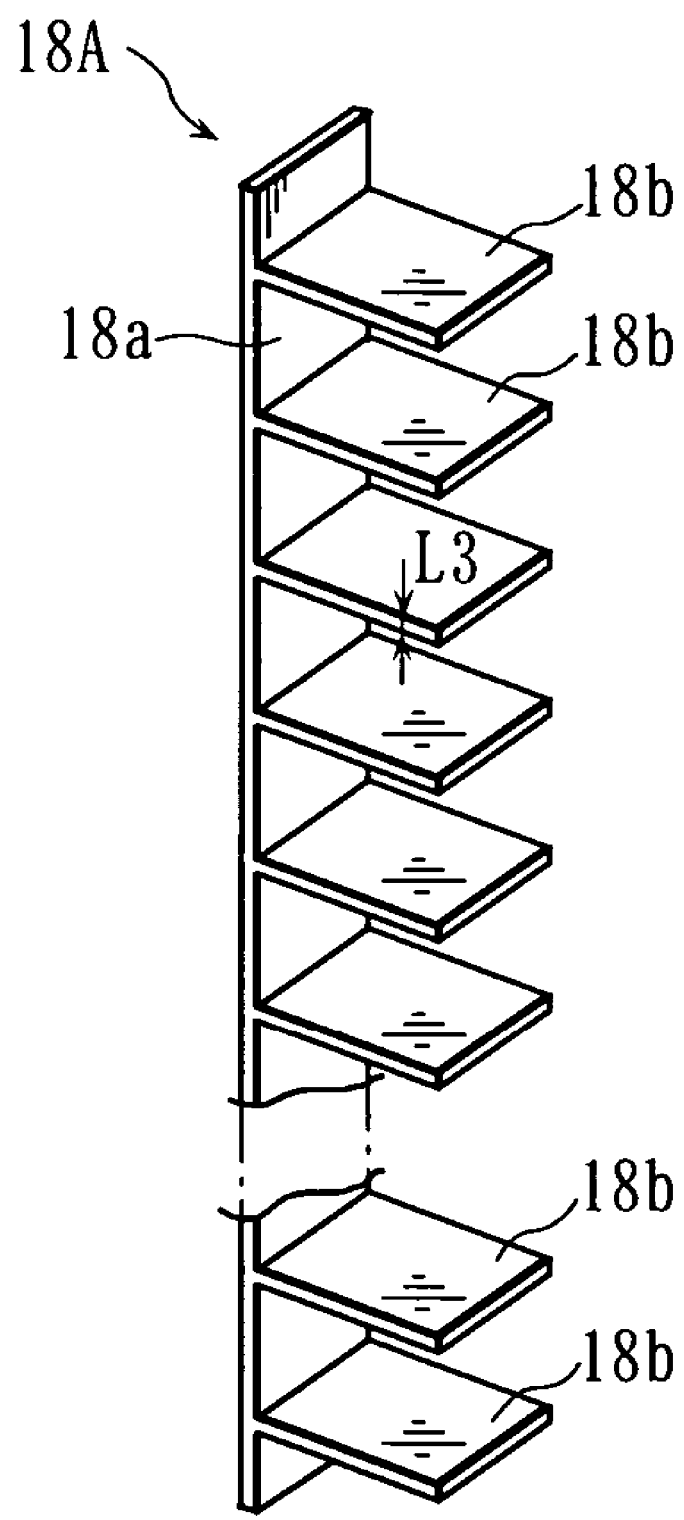
FIG. 6 is a perspective view, partially omitted, showing an example of spacer used in the water heater shown in FIG. 1.

As better shown in FIG. 5, a plurality of spacers 18A and 18B are provided in the heat exchanger A1. For example, as shown in FIG. 6, the spacer 18A includes a base portion 18*a* in the form of an elongated rectangle and a plurality of projections 18*b* in the form of a flat plate formed at a front surface of the base portion. The spacer 18B has the same structure. The spacers 18A and 18B can be formed by skiving of metal, welding of a plurality of metal plates or cutting and bending a metal plate. Other specific examples of spacer will be described later.

As shown in FIG. 5, each of the projections 18*b* of the spacers 18A, 18B is inserted between adjacent loops 60*a* of the first and the second heat exchanging portions HT1, HT2, whereby clearances 61 having a dimension equal to the thickness of the projections 18*b* are formed. The plurality of projections 18*b* have the same thickness L3, so that the plurality of clearances 61 have the same dimension which is equal to the thickness. However, as will be described later, the clearances 61 may have different dimensions. While the thickness t1 of the water tube 6 is about 5 mm as noted above, the dimension L3 of the clearances 61 is about 0.8 to 2.0 mm, for example. For example, as better shown in FIG. 2, the spacers 18A, 18B are provided at three locations along the outer circumference of the coiled tube 60 at approximately regular intervals. To reliably mount the spacers 18A, 18B, the spacers may be welded to appropriate portions of the coiled tube 60 or the housing 2. To secure the opening area of the clearances 61, the width of the spacers 18A, 18B is considerably small as compared with the length of the circumference of the loops 60*a*.

As better shown in FIG. 1, the drain receiving portion 26 is provided below the heat exchanger A1. The drain receiving portion 26 serves to receive the drain adhering to the water tube 6 accompanying the combustion of the fuel and dropping from the water tube 6. The drain receiving portion is supported by an appropriate support member (not shown) and arranged in the bottom casing 80 and directly below the second heat exchanging portion HT2. The drain receiving portion 26 is in the form of a ring at the center of which an opening 260 for passing combustion gas is formed. The drain receiving portion includes a bottom surface 261, and standing walls 262 and 265 standing upward at the inner circumference and the outer circumference of the bottom surface 261, respectively. Between the standing walls 262 and 265 is defined a groove 263 into which drain is to be collected. The bottom of the groove 263 is formed with a drain discharge port 26*b*. A pipe 82 for discharging the drain out of the housing 2 and the bottom casing 80 is connected to the discharge port 26*b*. Around the drain receiving portion 26 is defined gap 260*a* for allowing combustion gas to pass therethrough similarly to the opening 260.

The bottom casing 80 is generally in the form of a hollow rectangular parallelepiped. The heat exchanger A1 and the exhaust duct 81 are mounted side by side on the bottom casing 80. The bottom casing 80 includes an upper wall formed with openings 80*a* and 80*b* respectively communicating with the combustion gas outlet 22B of the heat exchanger A1 and the bottom opening of the exhaust duct 81. Therefore, the combustion gas flowing downward from the combustion gas outlet 22B of the heat exchanger A1 toward the bottom casing 80 flows through the bottom casing 80 and then flows upward into the exhaust duct 81 from below. The combustion gas flowed into the exhaust duct 81 is then discharged to the outside through an exhaust port 81*a* as exhaust gas. The exhaust duct 81 contains therein a sound absorbing material (not shown) such as glass wool and serves as a silencer for reducing the exhaust noise.

The operation and advantages of the water heater B1 having the above-described structure will be described below.

First, the burner 1 is driven while supplying air for combustion downward from the fan 13. As a result, combustion gas is generated in the first region 35*a*, and the combustion gas flows into the combustion gas path 36 through the clearances 61 of the first heat exchanging portion HT1. Since the bottom of the first region 35*a* is closed by the partition 19, the combustion gas generated in the first region 35*a* positively passes through the clearances 61 of the first heat exchanging portion HT1. Then, the combustion gas flows downward through the combustion gas path 36 and then enters the second region 35*b* through the clearances 61 of the second heat exchanging portion HT2. Thereafter, the combustion gas enters the bottom casing 80 through the combustion gas outlet 22B and is then discharged to the outside through the exhaust port 81*a*.

In this way, in the heat exchanger A, the combustion gas flows smoothly in the heat exchanger A1 along a predetermined route. Therefore, the combustion gas is prevented from being partially retained within the heat exchanger A1, and the combustion gas successively generated by the driving of the burner 1 is effectively utilized for heat exchange in the heat exchanger A1.

In the above-described combustion gas flow, heat is recovered by the combustion performed in the first region 35*a* and by the passing of the combustion gas through the clearances 61 of the first region 35*a*. The width of the clearances 61 can be set to the optimum by utilizing the spacers 18A and 18B so that heat transfer can be performed properly. Since the width L1 of each loop 60*a* is large, the contact time between each loop 60*a* and the combustion gas when the combustion gas passes through the clearances 61 is long. As a result, the amount of heat transfer to the first heat exchanging portion HT1 is large. The combustion gas transfers heat to the first heat exchanging portion HT1 also in flowing downward through the combustion gas path 36. For these reasons, the heat exchange efficiency in the first heat exchanging portion HT1 is high.

The combustion gas passed through the first heat-exchanging portion HT1 further transfers heat to the loops 60a when the combustion gas thereafter passes through the outer periphery or clearances 61 of the second heat exchanging portion HT2 and through the second region 35b within the second heat exchanging portion. In the second heat exchanging portion HT2, latent heat can be recovered from the combustion gas, so that the heat exchange efficiency is further enhanced. Therefore, with the heat exchanger A1 and the water heater B1 of this embodiment, enhancement of the hot water supply performance and energy saving is possible. Particularly, in the heat exchanger A1, the coiled tube 60 is divided into the first and the second heat exchanging portions HT1 and HT2, and combustion gas is caused to flow successively through the portions each having a reduced combustion gas flow area. Therefore, the combustion gas can affect the coiled tube 60 without a large unevenness in the distribution. This effect also enhances the heat exchange efficiency.

In the heat exchanger A1, the heat exchange efficiency is enhanced without using a finned tube as the water tube 6, and the structure of the water tube 6 is simple. Therefore, although the heat exchanger A1 is made of stainless steel, the manufacturing cost is relatively low. Since the water tube 6 is formed by using a plurality of tube modules 62 having the same shape and size, the manufacturing cost is further reduced. Further, by forming the water tube 6 using a plurality of tube modules 62, it is possible to form of water tubes having different total lengths or volumes by changing the number of the tube modules 62. Therefore, the specifications of the heat exchanger A1 can be easily changed.

When the combustion gas comes into contact with the coiled tube 60 and performs heat exchange, drain is generated. However, the drain drops from the coiled tube 60 and is then received by the drain receiving portion 26 to be discharged to the outside through the pipe 82. Therefore, such a problem that the housing 2 or the bottom casing 80 is contaminated by the drain does not occur. Since the portions, such as the heat exchanger A1, which may come into contact with drain is made of stainless steel, corrosion due to the contact with acidic drain is also prevented. Moreover, since the water tube 6 is made of stainless steel, well water containing metal such as copper, for example, can be introduced into the water tube 6 for use, which increases the range of use of the heat exchanger.

In the heat exchanger A1, since unheated water supplied from the water inflow tube 99a and having a relatively low temperature enters the second heat exchanging portion HT2, latent heat is efficiently recovered in the second heat exchanging portion HT2. Further, it is possible to cause drain to be generated concentratedly in the second heat exchanging portion HT2 to reduce the amount of drain generated in the first heat exchanging portion HT1. In such a case, the recovery of drain by the drain receiving portion 26 is enhanced. Particularly, since the heat exchanger A is of a so-called reverse-combustion type and the combustion gas flows downward, the dropping of the drain from the coiled tube 60 is promoted by this flow action of combustion gas. When the drain is left adhering on a surface of the coiled tube 60, the drain hinders the heat exchange between the combustion gas and the coiled tube 60. Such a problem can be solved or lessened by promoting the dropping of the drain from the coiled tube 60.

As noted before, the water tube 6 comprises a flat tube having a small thickness t1. Therefore, the number of loops 60a can be increased without considerably increasing the entire height of the coiled tube 60 of the water tube 6, whereby the amount of water in the water tube 6 can be increased. The amount of water can be further increased by increasing the width L1 of the flat tube.

FIGS. 7-51 show other embodiments of the present invention. In these figures, the elements which are identical or similar to those of the foregoing embodiment are designated by the same reference signs as those used for the foregoing embodiment.

Figure 7:
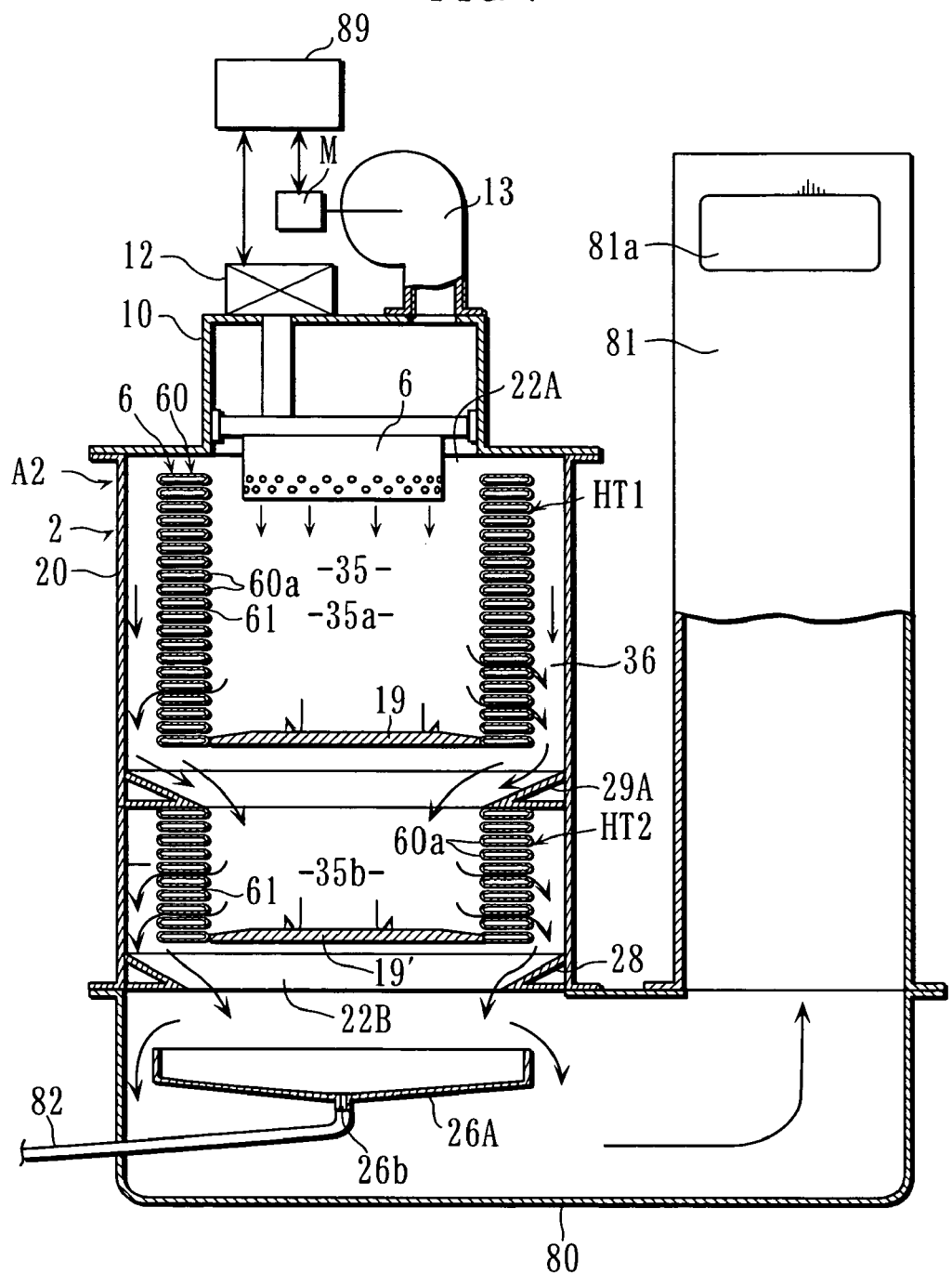
FIG. 7 is a schematic sectional view showing another example of heat exchanger and water heater according to the present invention.

In the embodiment shown in FIG. 7, a guide 29A and a partition 19' are provided in the heat exchanger A2.

The guide 29A serves to prevent the combustion gas, which has flowed downward through the combustion gas path 36, from further flowing downward to the outer periphery of the second heat exchanging portion HT2 and cause the combustion gas to flow into the second region 35b from an upper portion thereof. The guide 29A is ring-shaped and mounted to the inner surface of the circumferential wall 20 of the housing 2 by welding, for example, and partitions the first and the second heat exchanging portions HT1 and HT2. The partition 19' serves to close the bottom opening of the second region 35b, and the structure thereof is the same as that of the partition 19.

With this structure, the combustion gas passed through the first heat exchanging portion HT1 flows into the second region 35b through the combustion gas path 36 and then flows from the second region 35b to pass through the clearances 61 of the second heat exchanging portion HT2. Since the bottom opening of the second region 35b is closed by the partition 19', the combustion gas can be properly guided to the clearances 61 of the second heat exchanging portion HT2. Therefore, similarly to the foregoing embodiment, heat exchange utilizing the first and the second heat exchanging portions HT1 and HT2 properly and effectively is possible also in this embodiment. When the upper surface of the guide 29A is so inclined as to be lower as progressing toward the center of the housing 2, the combustion gas can be smoothly guided to the second region 35b.

In the embodiment shown in FIG. 7, a generally ring-shaped guide 28 is also provided below the second heat exchanging portion HT2. The upper surface of the guide 28 is inclined similarly to the upper surface of the guide 29A. By the provision of the guide 28, the drain dropping from the second heat-exchanging portion HT2 can be guided to the drain receiving portion 26A. Therefore, this structure is suitable for preventing the drain from unduly dropping to the outside of the drain receiving portion 26A while reducing the size of the drain receiving portion 26A. As shown in the figure, in the present invention, the drain receiving portion 26A which is not formed with an opening at the center thereof can be employed.

Figure 8:
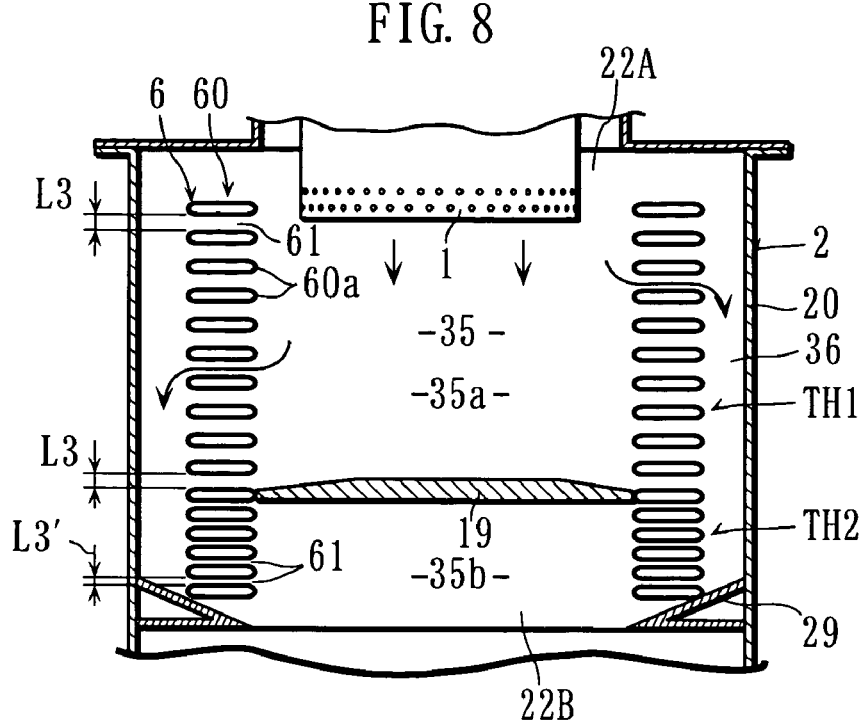
FIG. 8 is a sectional view showing a principal portion of another example of heat exchanger according to the present invention.

In the embodiment shown in FIG. 8, the dimension L3 of the clearances 61 of the first heat exchanging portion HT1 and the dimension L3' of the clearances 61 of the second heat exchanging portion HT2 differ from each other. Specifically, the dimension L3' is smaller than the dimension L3. In the embodiment shown in FIG. 9, the width L1 of the loops 60a constituting the first heat exchanging portion HT1 and the width L1' of the loops 60a constituting the second heat exchanging portion HT2 differ from each other, and the width L1' is larger than the width L1.

Figure 9:
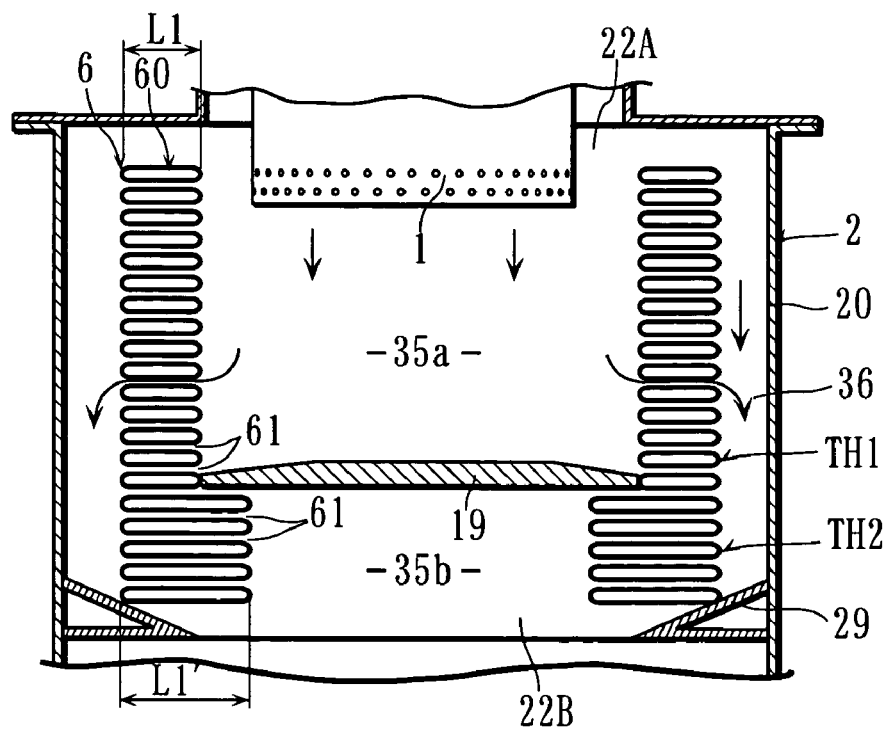
FIG. 9 is a sectional view showing a principal portion of another example of heat exchanger according to the present invention.

With the structures shown in FIGS. 8 and 9, the combustion gas whose temperature is reduced by passing through the first heat exchanging portion HT1 can transfer a large amount of heat to the loops 60a in passing through the clearances 61 of the second heat exchanging portion HT2. Therefore, the structures are suitable for enhancing the heat transfer efficiency. In the present invention, it is possible to employ the structure obtained by combining the structure shown in FIG. 8 and that shown in FIG. 9. Specifically, t the second heat exchanging portion HT2 may be smaller in dimension of the clearances 61 and larger in width of the loops 60a than the first heat exchanging portion HT1. Moreover, in the present invention, the dimension of the clearances 61 and the width of the loops 60a can be made non-uniform in each of the first and the second heat exchanging portions HT1 and HT2. For example, in the first region 35a, the temperature may become higher at the lower portion than at the upper portion. Conversely, the temperature may become higher at the upper portion closer to the burner 1 than at the lower portion. Such temperature distribution depends on the characteristics of the burner 1, the amount of air for combustion sent by the fan 13 or the manner of sending air, for example. In the present invention, in accordance with such temperature distribution, the dimension of the clearances 61 may be reduced or the width of the loops 60a may be increased with respect to a high temperature portion of the first heat exchanging portion H1 so that the high-temperature combustion gas can be effectively utilized.

Figure 10:
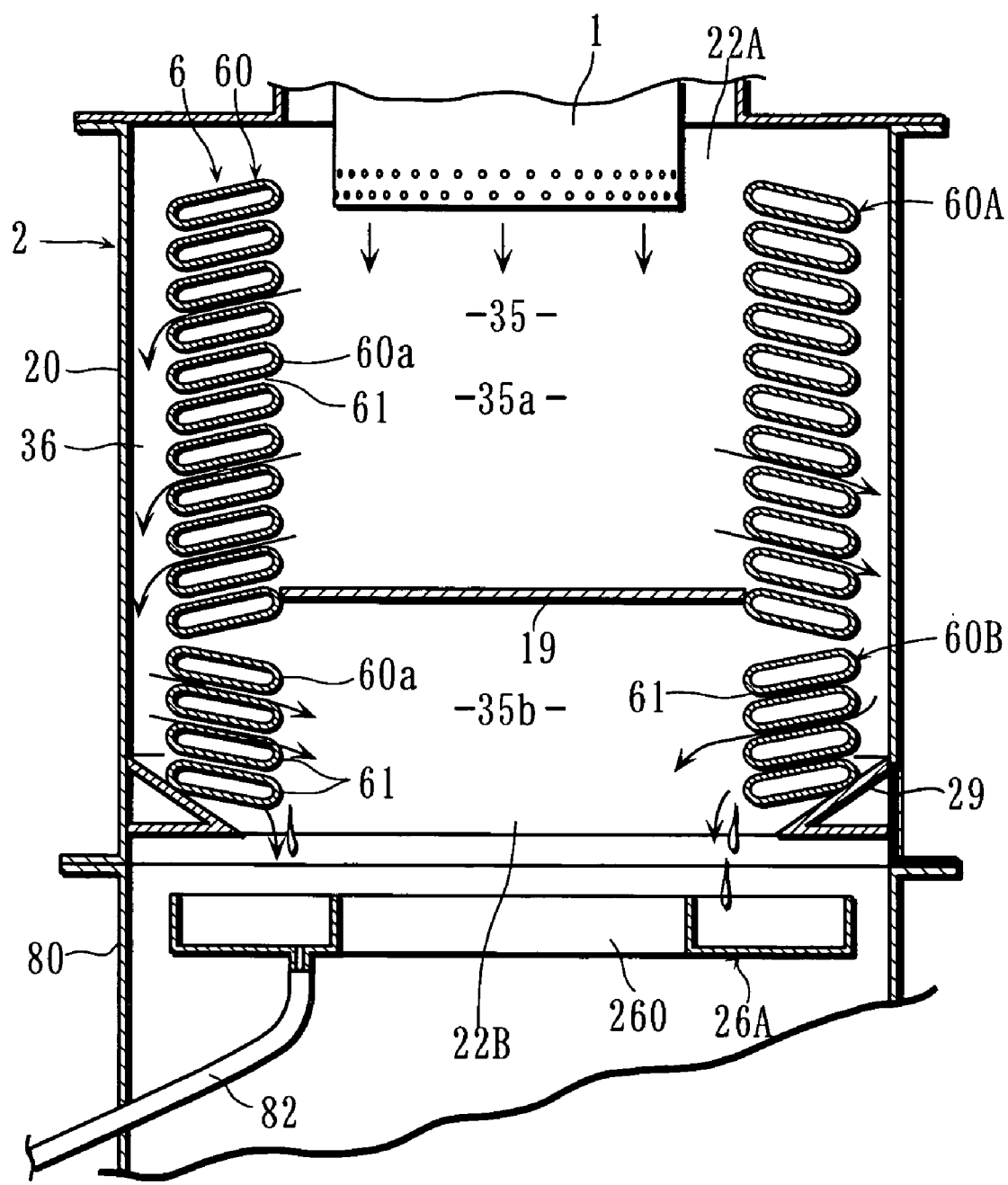
FIG. 10 is a sectional view showing a principal portion of another example of heat exchanger according to the present invention.

In the embodiment shown in FIG. 10, each of the loops 60a of the water tube 6 is inclined in the radial direction of the loops 60a. This inclination corresponds to the direction in which the combustion gas passes through the clearances 61, and the height of each of the loops 60a reduces as proceeding in the flow direction of the combustion gas. Specifically, in the first heat exchanging portion HT1, each of the loops 60a is so inclined that the outer circumference of the loop is positioned lower than the inner circumference of the loop. On the other hand, in the second heat exchanging portion HT2, each of the loops 60a is so inclined that the inner circumference of the loop is positioned lower than the outer circumference of the loop.

With this structure, when the combustion gas passes through the clearances 61, the drain adhering to the loops 60a is caused to move toward lower portions of the loops 60a. Therefore, dropping of the drain from the loops 60a to the drain receiving portion 26 is promoted, which is advantageous for enhancing the recovery of the drain. When loops 60a are to be inclined, it is preferable that all of the loops 60a are inclined like this embodiment. However, unlike this embodiment, only some of the loops 60a may be inclined. Also in such a case, dropping of the drain is promoted at the inclined portions so that the recovery of the drain is enhanced. In this case, however, it is preferable that at least the lowermost loop 60a is inclined, because, in most cases, dropping of the drain from the coiled tube 60 to the drain receiving portion 26 occurs at the lowermost loop 60a.

Figure 11A:
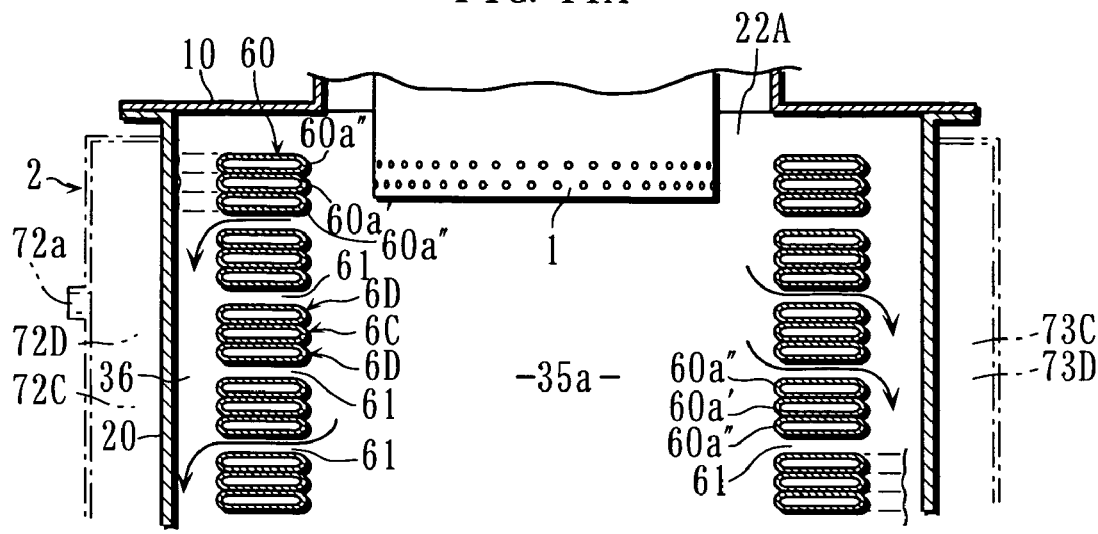
Figure 11B:
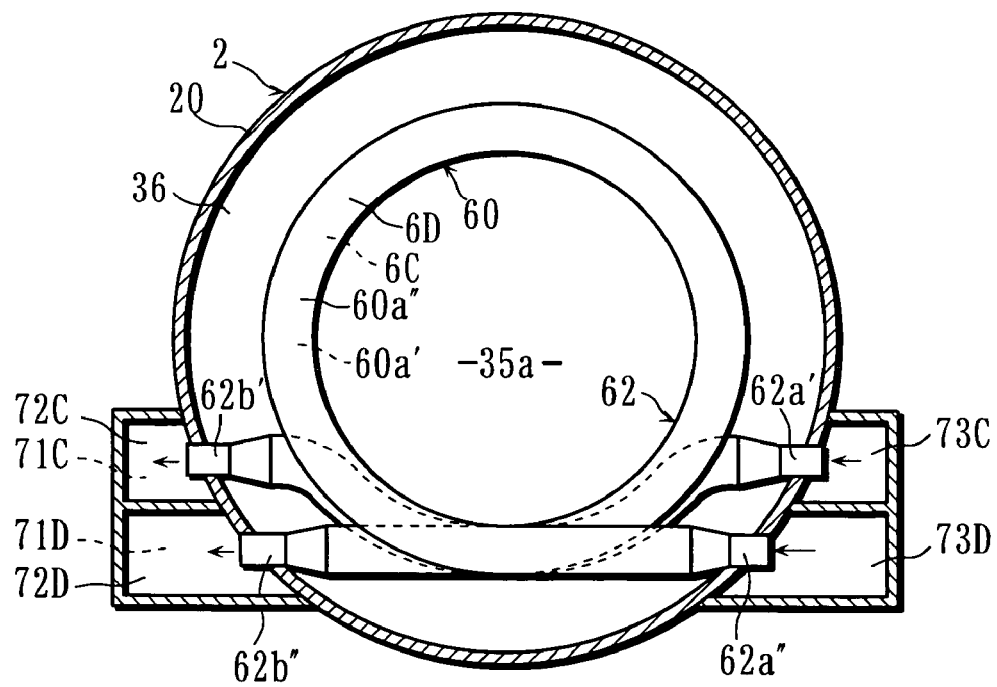
FIG. 11B is a horizontal sectional view thereof.

The heat exchanger of the embodiment shown in FIG. 11A is a heat exchanger with one housing and two water paths, including a water tube 6C and two water tubes 6D for different hot-water supply destinations. For example, the water tube 6C maybe utilized for supplying hot-water to a kitchen, whereas the water tubes 6D may be utilized for supplying hot-water to a bath. Each of the loops 60a' of the water tube 6C is sandwiched between and held in direct contact with the loops 60a" of the two water tubes 6D. In this embodiment, three loops 60a', 60a" in all are combined into one set, and a clearance 61 for passing the combustion gas is defined between the adjacent sets. As better shown in FIG. 11B, the header for water tube connection includes a water inflow chamber 71C, a hot-water outflow chamber 72C and a common chamber 73C to which opposite ends 62a', 62b' of a plurality of tube modules 62 constituting the water tube 6C are to be connected. The heat exchanger of this embodiment further includes a water inflow chamber 71D, a hot-water outflow chamber 72D and a common chamber 73D, to which opposite ends 62a", 62b" of a plurality of tube modules 62 constituting the water tubes 6D are to be connected. With this structure, water flowing through the water tubes 6C and 6D are prevented from mixing.

In the above-described structure, when hot water is to be supplied only to the kitchen, for example, with the burner 1 driven, water flow is performed only in the water tube 6C, whereas the water in the water tubes 6D remains in the tube. Conceivably, therefore, the water remaining in the water tubes 6D may be heated and boil. In this embodiment, however, heat transfer is performed between the water tubes 6C and 6D, so that such boiling is properly prevented. On the other hand, when water flow is performed only in the water tubes 6D, the boiling of the water in the water tube 6C is prevented in a similar way. Since the water tubes 6C, 6D are made of flat tubes, the contact area (heat transfer area) is advantageously large. For a heat exchanger with one housing and two water paths like this embodiment, it is sometimes necessary to perform water flow in both of the two kinds of water tubes to supply hot water to e.g. both of a kitchen and a bath at the same time. Since high heat exchange efficiency is achieved in the present invention as noted above, the present invention is suitable for the structure with one housing and two water paths which requires a large amount of hot water supply.

Figure 12A:
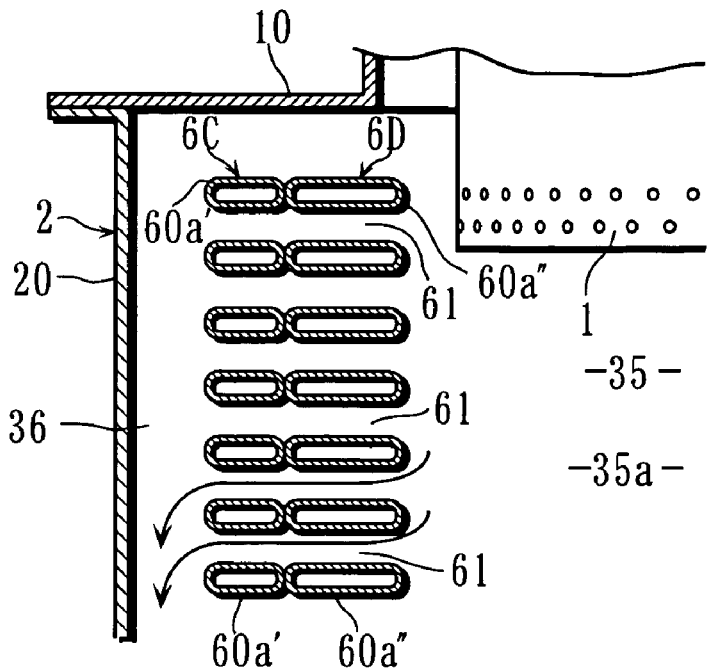
Figure 12B:
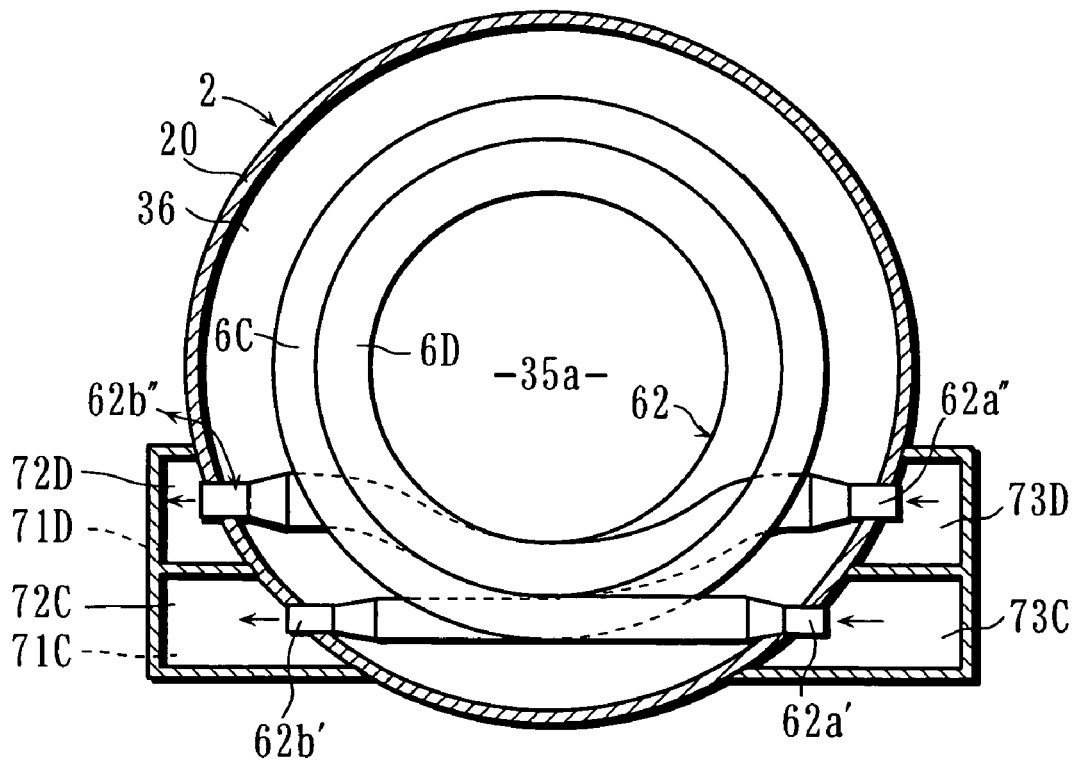
FIG. 12B is a horizontal sectional view thereof.
Figure 13:
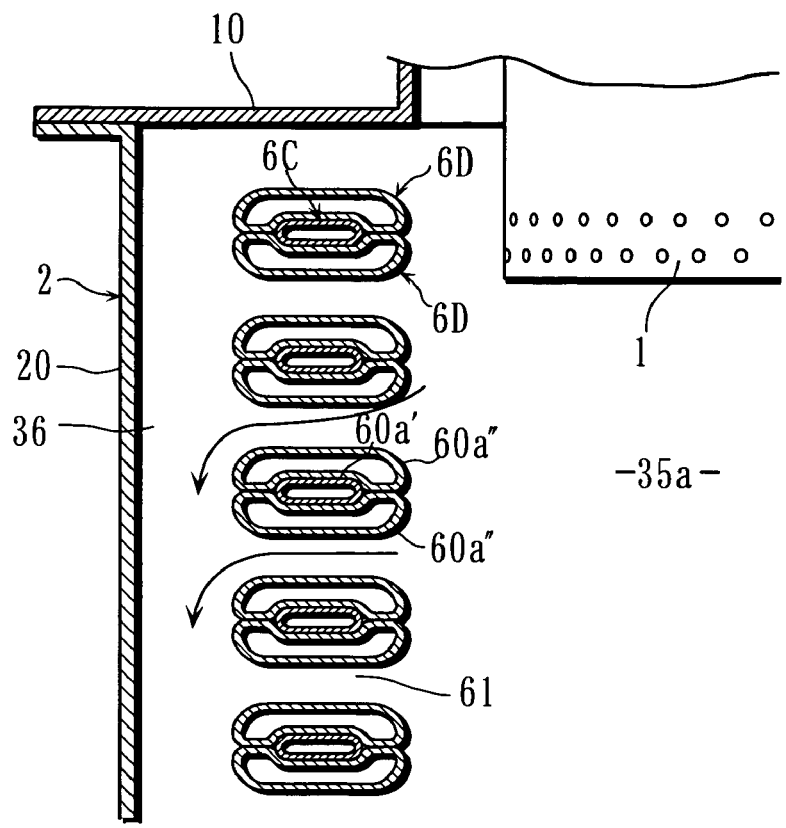
FIG. 13 is a sectional view showing another example of heat exchanger according to the present invention.
Figure 14:
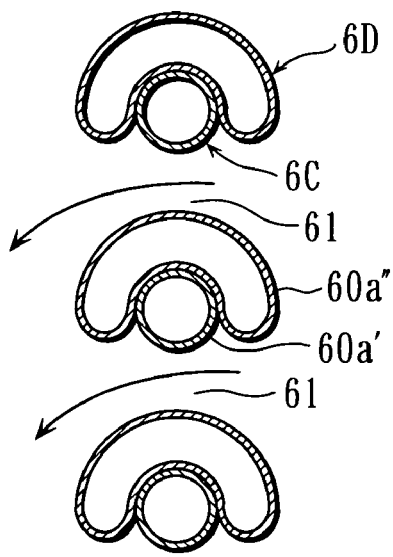
FIG. 14 is a sectional view showing a principal portion of another example of structure in which a plurality of heat-exchange water tubes are held in contact with each other.

In the embodiment shown in FIG. 12A, loops 60a' and 60a" of two kinds of water tubes 6C and 6D are paired and arranged side by side in contact with each other in the radial direction of the coiled tube 60. As better shown in FIG. 12B, the structure of the header for connecting the water tubes 6C, 6D is basically the same as that of the foregoing embodiments, although the positional relationship of each part is different. In the embodiment shown in FIG. 13, the loops 60a" of two water tubes 6D surround the entire circumference of the loop 60a' of the water tube 6C in contact with the loop 60a'. In the embodiment shown in FIG. 14, the water tube 6C comprises a circular pipe, and the water tube 6D surrounds approximately half of the circumference of the water tube 6C in contact therewith. As will be understood from these embodiments, plural kinds of water tubes can be held in contact with each other in various ways. However, a structure in which the contact area between the tubes is large is preferable, because larger contact area provides a larger amount of heat transfer and more reliably prevents boiling of water in a water tube which is not used.

Figure 15A:
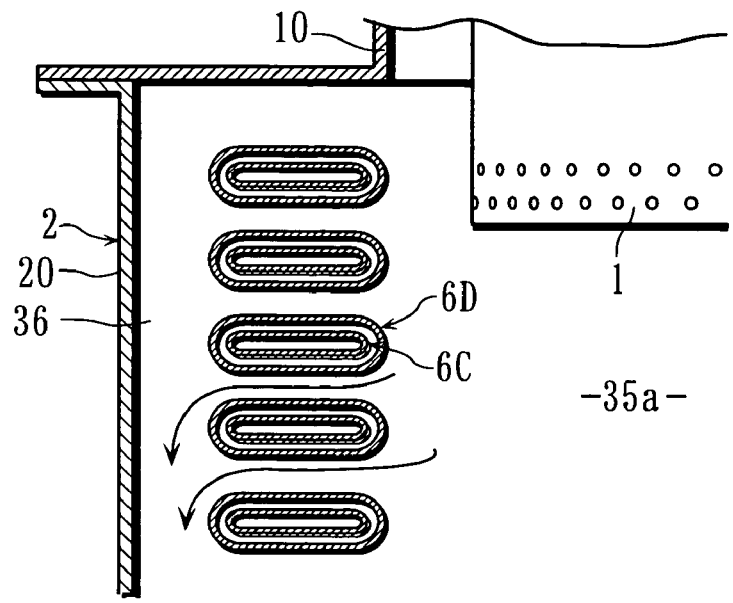
Figure 15B:
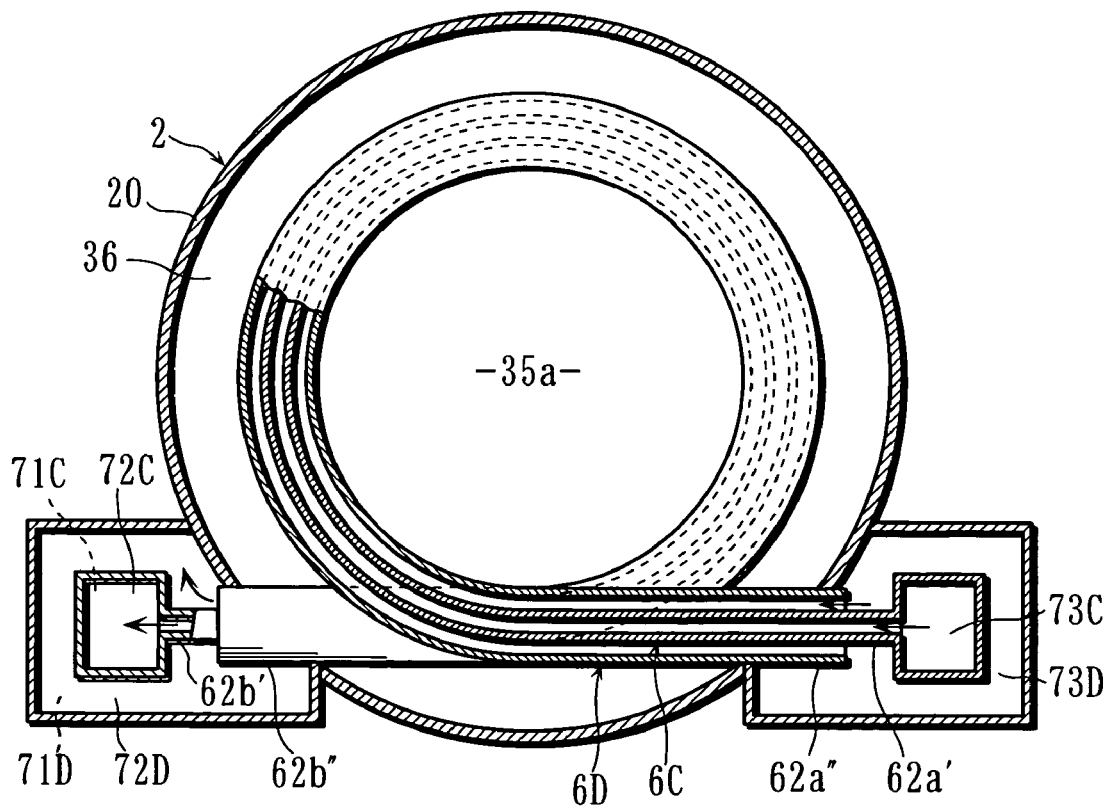
FIG. 15B is a horizontal sectional view of the principal portion.

In the embodiment shown in FIGS. 15A and 15B, the water tube has a double tube structure including an inner tube 6C and an outer tube 6D. Since the water flow in the inner tube 6C and the water flow in the space between the inner tube 6C and the outer tube 6D need to be performed individually, the water inflow chambers 71C, 71D, the hot-water outflow chambers 72C, 72D and the common chambers 73C, 73D, to which opposite ends of the tubes are to be connected, also have a double structure.

With such a structure again, hot water can be supplied individually to two destinations. The water existing between the inner tube 6C and the outer tube 6D performs heat transfer with the water in the inner tube 6C via the inner tube 6C. Therefore, when the water in either location only is utilized for hot water supply, boiling of the water in the other location can be properly prevented.

In the embodiment shown in FIGS. 16A and 16B, each loop 60a of the coiled tube 60 of the water tube 6 has an outer surface formed with a projection 69. The loops 60a which are adjacent to each other in the height direction are held in contact with each other via the projection 69.

With this structure, clearances 61 having a desired dimension can be formed between the loops 60a by utilizing the projection 69. Therefore, the use of a spacer is unnecessary, and the work for mounting the spacer can be eliminated. Therefore, the assembling of the heat exchanger is facilitated.

FIGS. 17-51 show a heat exchanger including a tube lap winding structure and embodiments related thereto. However, the contents of these embodiments include technical matters which are applicable to the above-described heat exchanger using a flat tube. Conversely, the technical matters described as to the heat exchanger using a flat tube are applicable to a heat exchanger including a tube lap winding structure.

Figure 17:
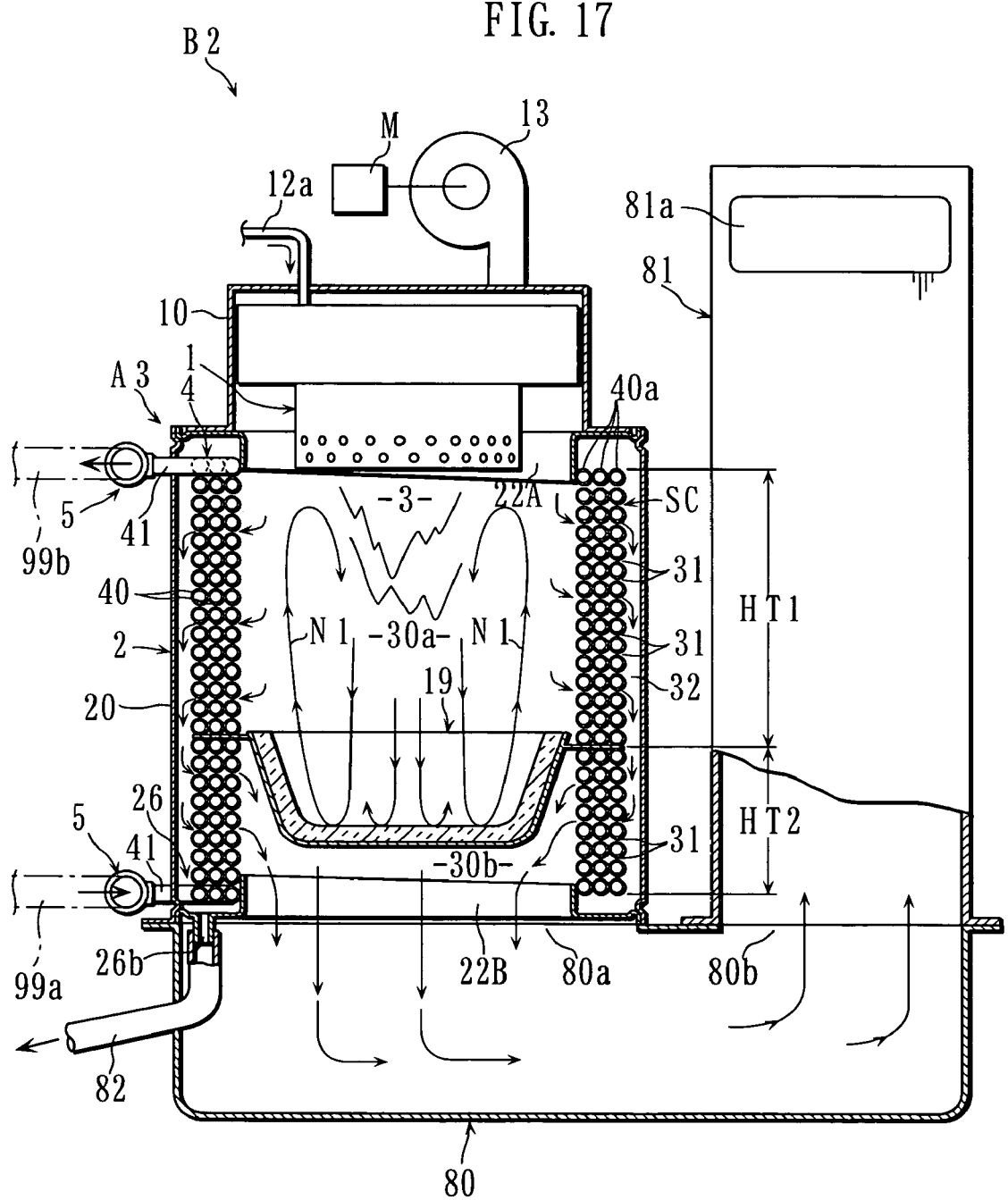
FIG. 17 is a schematic sectional view showing another example of heat exchanger and water heater incorporating the heat exchanger according to the present invention.

FIG. 17 shows an example of heat exchanger and water heater incorporating the heat exchanger according to the present invention. FIGS. 18-24 show the structure of the heat exchanger shown in FIG. 17 and the related parts thereof. As better shown in FIG. 18, the heat exchanger A3 of this embodiment includes a housing 2, a plurality of water tubes 4, a pair of water inflow and hot-water outflow headers 5, and a partition 19. The plurality of water tubes 4 have a tube lap winding structure SC provided by arranging a plurality of coiled tubes 40 in a lap winding manner. Unlike the foregoing embodiments, each of the water tubes 4 comprises a round pipe.

The housing 2 includes a generally cylindrical circumferential wall 20 and a pair of covers 21A and 21B respectively mounted to an upper portion and a lower portion of the circumferential wall 20. Similarly to the foregoing embodiments, these members are made of stainless steel, for example. As will be described later, the circumferential wall 20 is formed by curving a generally rectangular stainless plate into a cylindrical shape and bonding a pair of edges 20a shown in FIG. 20 together. Each of the edges 20a is formed with a projection 20a' projecting radially outward and formed by bending the edge, and the projections 20a' are put together and welded. One or a plurality of brackets 23 for mounting the housing 2 to a desired position are welded to the outer surface of a lower portion of the circumferential wall 20.

Figure 18:
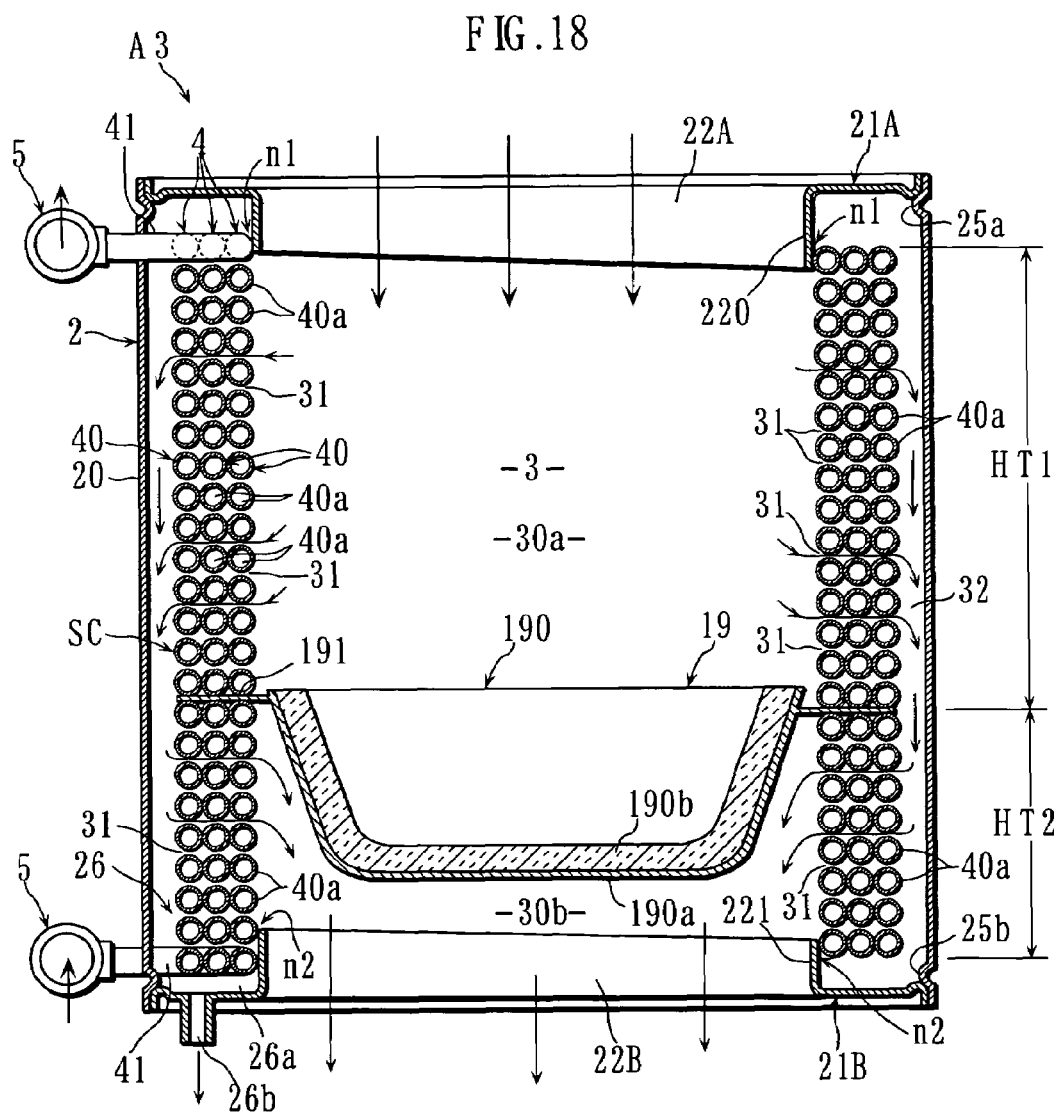
FIG. 18 is a sectional view of the heat exchanger shown in FIG. 17.
Figure 19:
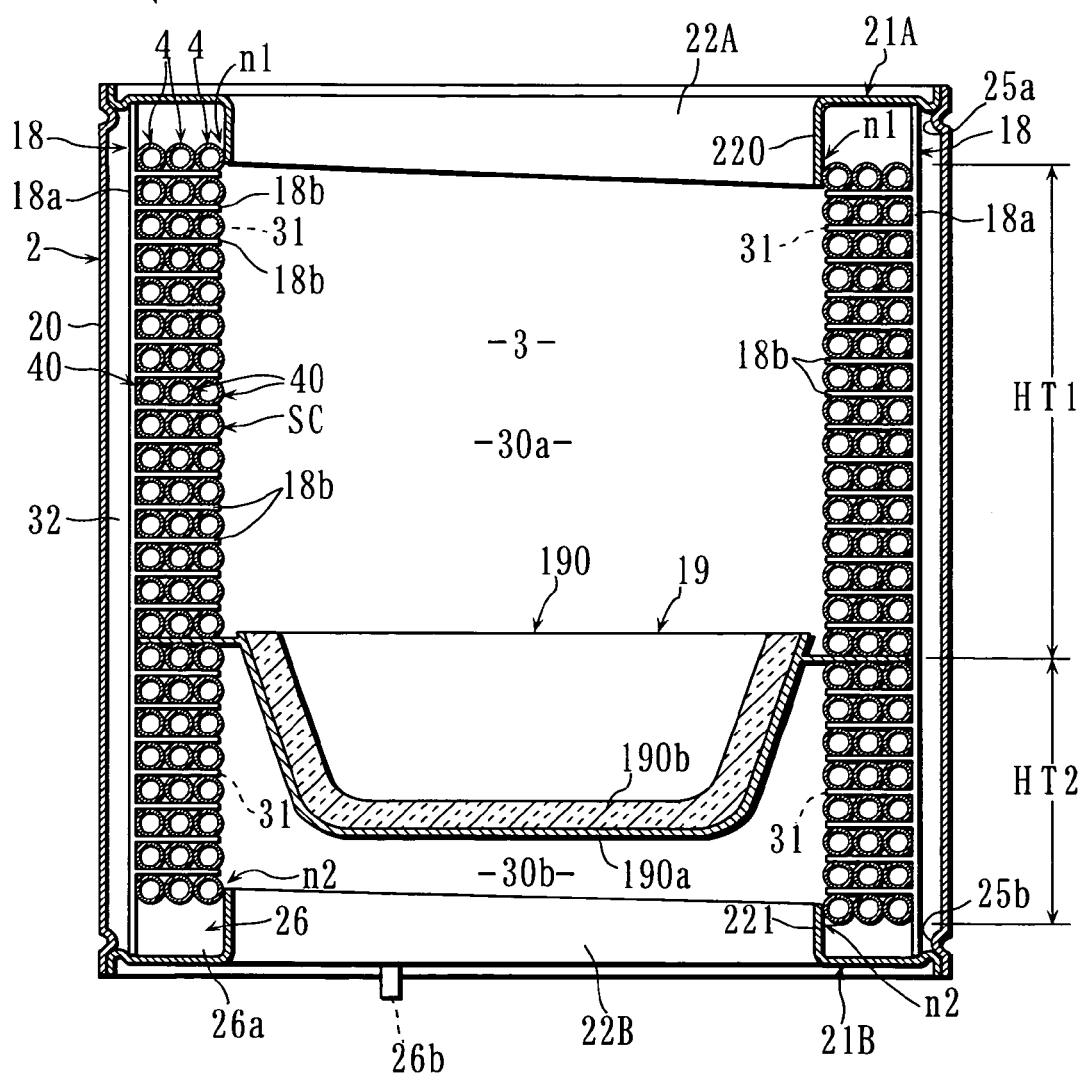
FIG. 19 is a sectional view of the heat exchanger shown in FIG. 17.

As better shown in FIGS. 18 and 19, the cover 21A comprises a generally circular plate formed with a burner opening 22A at the center thereof. Similarly to the foregoing embodiment, the burner opening 22A is utilized as a combustion gas introduction port for introducing the combustion gas generated at the burner into the housing 2 or as a portion for inserting a portion of the burner into the housing 2 for mounting. The burner opening 22A is a burring hole including a circumferential annular wall 220 projecting downward. The cover 21A is fitted into the upper opening of the circumferential wall 20 and welded to the circumferential wall 20. A plurality of projections 25a projecting inward of the housing 2 are formed on the circumferential wall 20 at a portion close to the upper end. The cover 21A is positioned by engaging with the projections 25a. The projections 25a are formed by press working of the circumferential wall 20 and appropriately spaced from each other in the circumferential direction of the circumferential wall 20.

The cover 21B is formed with a combustion gas outlet 22B at the center thereof and comprises a generally circular plate which is similar to the cover 21B. A plurality of projections 25b which are similar to the above-described projections 25a are formed on the inner surface of the circumferential wall 20 at a portion close to the lower end. The cover 21A is fitted into the lower opening of the circumferential wall 20 to engage with the projections 25b and welded to the circumferential wall 20. The combustion gas outlet 22B is a burring hole which is similar to the burner opening 22A and includes a circumferential annular wall 221 projecting upward. A drain receiving portion 26 for receiving the drain which drops from the water tubes 4 accompanying the latent heat recovery is provided at the bottom of the housing 2. The drain receiving portion 26 is defined by the annular wall 221, a lower portion of the circumferential wall 20, an annular space 26a formed between the walls and the bottom portion thereof. The cover 21B is formed with a drain discharge port 26b for discharging drain received by the drain receiving portion 26 to the outside of the housing 2.

Each of the water tubes 4 includes a coiled tube 40 arranged in the housing 2 and a plurality of bent tubes 41 connected to opposite ends 400 of the coiled tube. The heat exchanger A3 of this embodiment includes three water tubes 4. Each coiled tube 40 is a helical tube including a plurality of circular loops 40a stacked in the vertical direction. The coiled tubes 40 differ from each other in coil diameter, and the tube lap winding structure SC is provided by arranging the plurality of coiled tubes 40 concentrically or generally concentrically. In the tube lap winding structure SC, the plurality of loops 40a are arranged not only along the height direction of the housing 2 but also along the horizontal direction.

Figure 20:
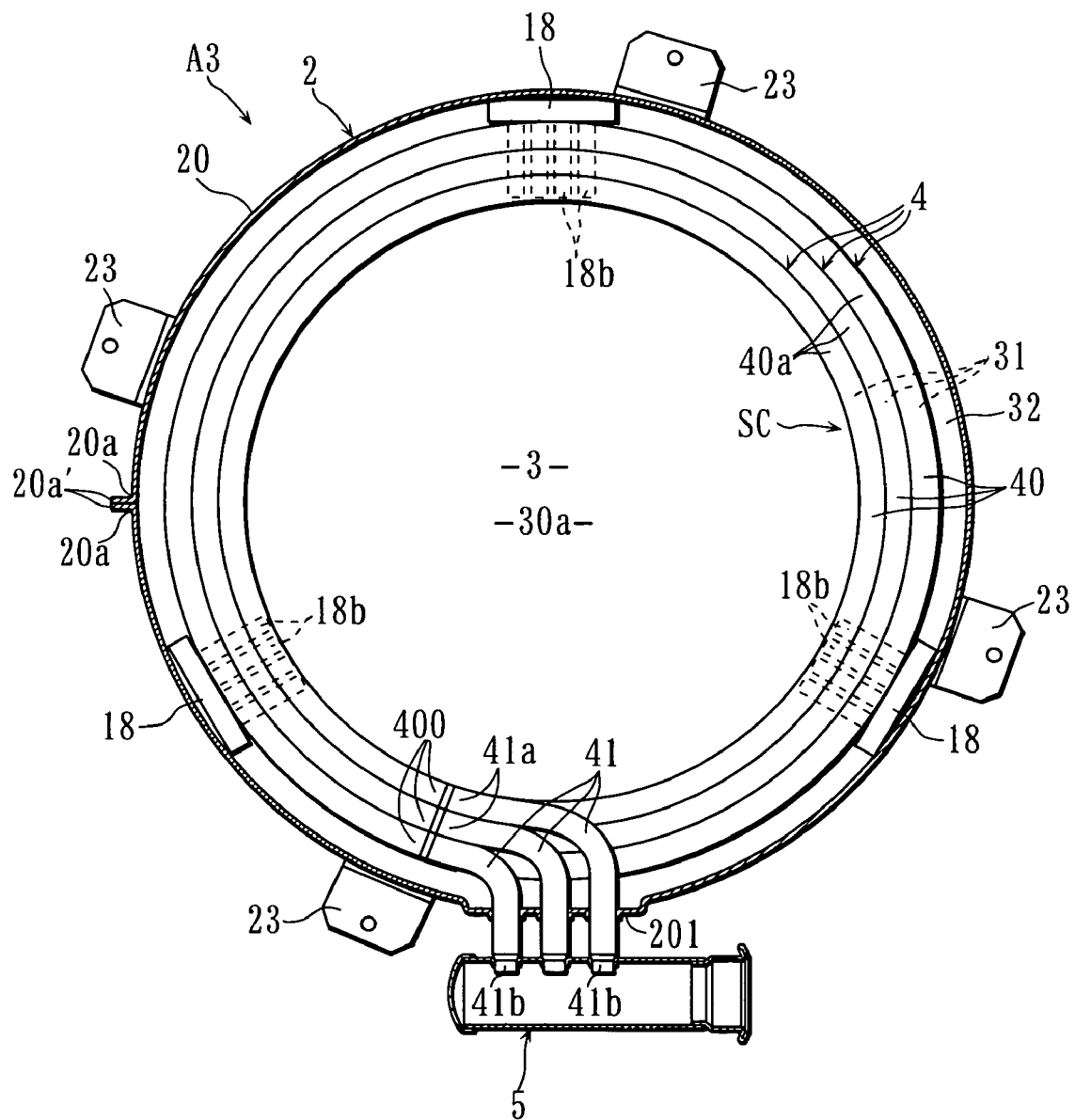
FIG. 20 is a horizontal sectional view of the heat exchanger shown in FIG. 17.
Figure 21:
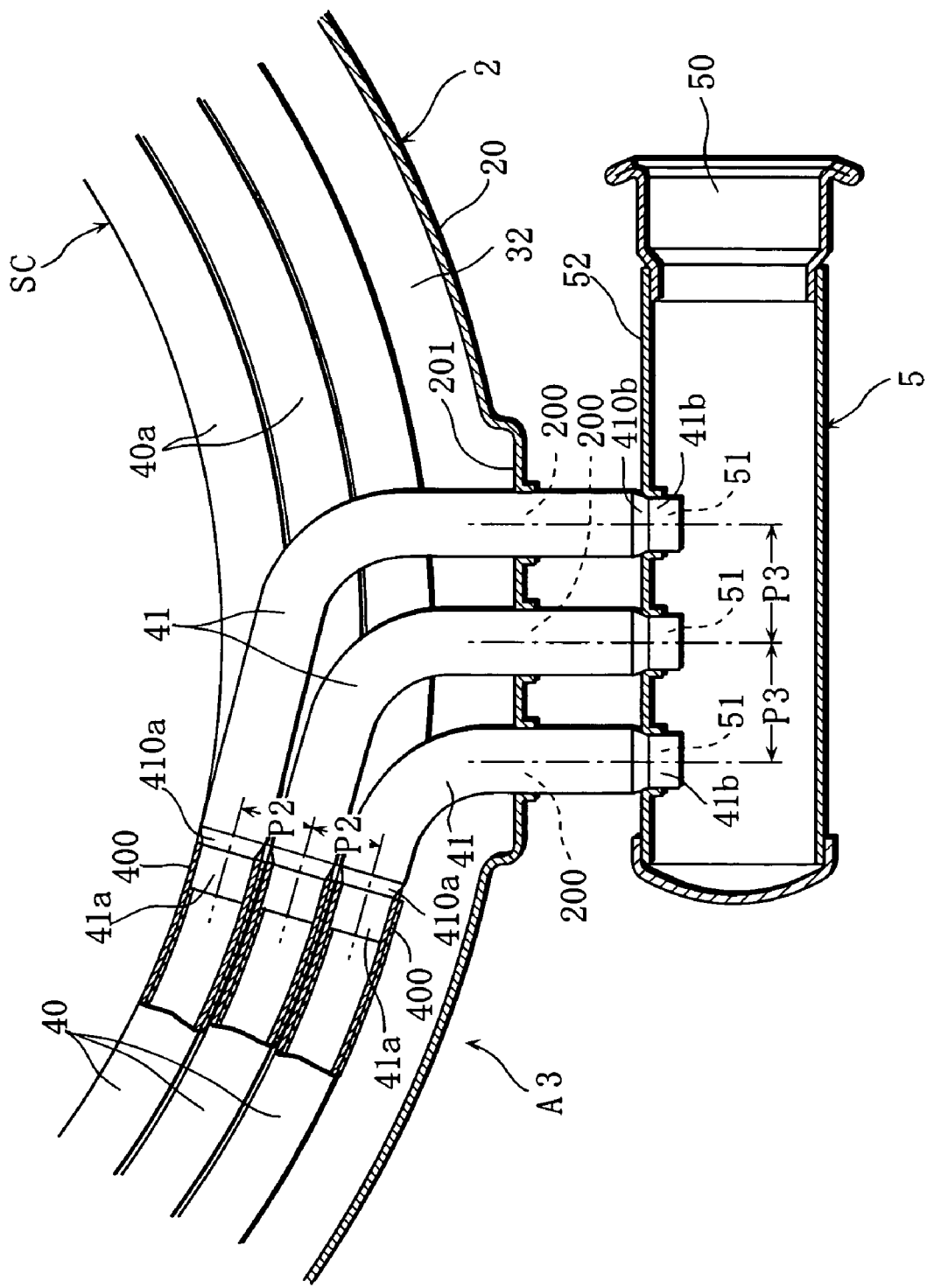
FIG. 21 is an enlarged sectional view showing a principal portion of FIG. 20.

As better shown in FIGS. 20 and 21, the bent tubes 41 of the water tubes 4 serve as joint pipes for connecting the coiled tubes 40 to the headers 5. Each of the bent tubes 41 has an opposite pair of first and second ends 41a and 41b respectively formed with stepped portions 410a and 410b which include tapered surfaces. The portions closer to the ends than the stepped portions 410a, 410b are smaller-diameter potions whose diameter is smaller than that of the longitudinally intermediate portion. Each of the bent tubes 41 is connected to a respective coiled tube 40 by fitting the smaller-diameter portion of the first end 41a to the end 400. The direction in which the smaller-diameter portion is fitted to the end 400 is the tangential direction of the loops 40a of the coiled tube 40. The tapered surface of the stepped portion 410a is held in contact with the end surface of the end 400, and the contact portion is subjected to welding or brazing. Alternatively, however, the water tube 4 and the bent tube 41 may be connected by connection means shown in FIG. 24, for example. In the connection means shown in the figure, the distal portion of the first end 41a of the bent tube 41 is expanded and fitted around the end 400 of the water tube 4. Also by such means, the water tube 4 and the bent tube 41 can be connected properly by the fitting.

The bent tubes 41 are inserted into a plurality of openings 200 formed adjacent to an upper and a lower ends of the circumferential wall 20, and portions of the bent tubes 41 adjacent to the second ends 41b project out of the housing 2. The plurality of bent tubes 41 differ from each other in bending radius and total length, and the arrangement pitch P3 of the portions penetrating through the circumferential wall 20 and the second ends 41b is larger than the arrangement pitch P2 of the first ends 41a. With this structure, the connection of the headers 5 can be facilitated, and the strength of the portion formed with the openings 200 can be increased due to the large spacing between the openings 200. The portions of the bent tubes 41 adjacent to the second ends 41b extend straight in a direction perpendicular to the circumferential wall 20 and in parallel with each other. Between the portion penetrating through the circumferential wall 20 and the second end 41b of each bent tube 41, a portion which is larger in diameter than the penetrating portion does not exist. With such a structure, the insertion of the bent tubes 41 into the openings 200 of the circumferential wall 20 can be performed easily and properly.

Preferably, each of the openings 200 is a burring hole whose periphery is bent to stand, so that the periphery has an increased strength. Part of the circumferential wall 20, which includes the region formed with the openings 200, is a flat plate portion 201 which is not arcuate. The flat plate portion 201 is elongated in the height direction with a constant width and projects radially outward relative to other portions of the housing 2. With this structure, dimensioning of each of the openings 200 is easy, and the strength of the circumferential wall 20 can be enhanced. Moreover, since a large space is defined between the coiled tube 40 and the flat plate portion 201, bent tubes 41 having a relatively large radius of curvature can be used.

Each of the paired headers 5 is connected to the second ends 41b of the plurality of bent tubes 41. The header 5 may comprise a circular pipe 52, for example, and has an end formed with a connection port 50 to which a water inflow tube 99a or a hot-water outflow tube 99b shown in FIG. 17 is to be connected. The header 5 is formed with a plurality of openings 51. The smaller-diameter portion of the second end 41b of each bent tube 41 is fitted into a respective one of the openings 51, and the tapered surface of the stepped portion 41 is held in engagement with the periphery of the opening 51. The contact portion is subjected to welding or brazing. Therefore, the bent tube 41 and the header 5 are reliably connected to each other and watertight sealing is provided.

Figure 22:
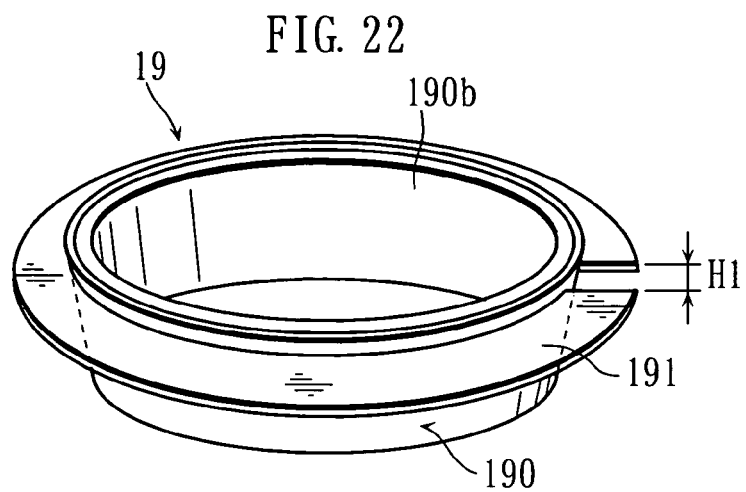
FIG. 22 is a perspective view showing an example of partition used for the heat exchanger shown in FIG. 17.

As better shown in FIG. 18, the partition 19 partitions the space 3 surrounded by the tube lap winding structure SC in the vertical direction into a first and a second regions 30a and 30b. The coiled tubes 40 of the tube lap winding structure SC is partitioned by the partition 19 into a first heat exchanging portion HT1 and a second heat exchanging portion HT2 surrounding the first region 30a and the second region 30b, respectively. The partition 19 includes a main body 190 positioned in the space 3 and having an upper surface formed with a recess, and a flange piece 191 formed at the outer circumferential surface of the main body 190. For example, the main body 190 comprises a plate member 190a made of stainless steel and a heat insulating member 190b which is excellent in fire and heat resistance and laminated on the plate member. The heat insulating member 190b may be made of ceramic material, for example. As shown in FIG. 22, the flange piece 191 circles around the outer circumferential surface of the main body 190 once or more than once and has a helical shape having opposite ends defining height difference H1. The partition 19 is mounted to the coiled tubes 40 by screwing the helical flange piece 191 to the coiled tubes 40. The flange piece 191 partitions between the first and the second heat exchanging portions HT1 and HT2 so that the combustion gas is prevented from flowing from the first heat exchanging portion HT1 directly to the second heat exchanging portion HT2 in the tube lap winding structure SC.

A combustion gas path 32 is defined between the outermost coiled tube 40 and the circumferential wall 20. As shown in FIG. 18, clearances 31 are defined between adjacent loops 40a in the height direction of the coiled tubes 40. The first and the second regions 30a and 30b communicate with the combustion gas path 32 through the clearances 31. Therefore, as will be described later, combustion gas flows from the first region 30a to the combustion gas path 32 through the clearances 31 of the first heat exchanging portion HT1 and then flows from the combustion gas path 32 to the second region 30b through the clearances 31 of the second heat exchanging portion HT2.

As indicated by the reference sign n1, the annular wall 220 of the cover 21A is held in contact with an upper portion of the innermost coiled tube 40 so that combustion gas is prevented from passing therebetween to directly flow from the first region 30a into the combustion gas path 32. Further, as indicated by the reference sign n2, the annular wall 221 of the cover 21A is held in contact with a lower portion of the innermost coiled tube 40 so that combustion gas is prevented from passing therebetween to directly flow from the combustion gas path 32 into the second region 30b.

Figure 23:
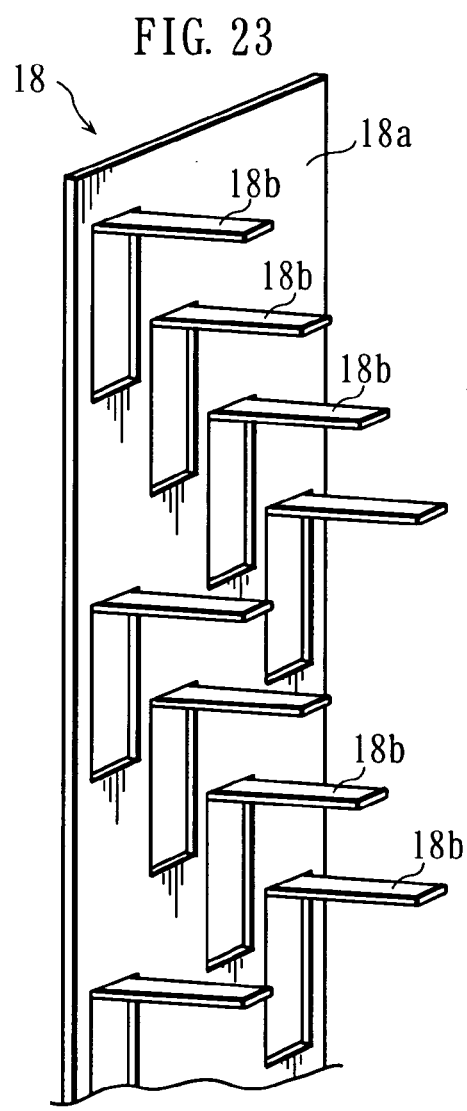
FIG. 23 is a perspective view showing a principal portion of an example of a spacer used for the heat exchanger shown in FIG. 19.
Figure 24:
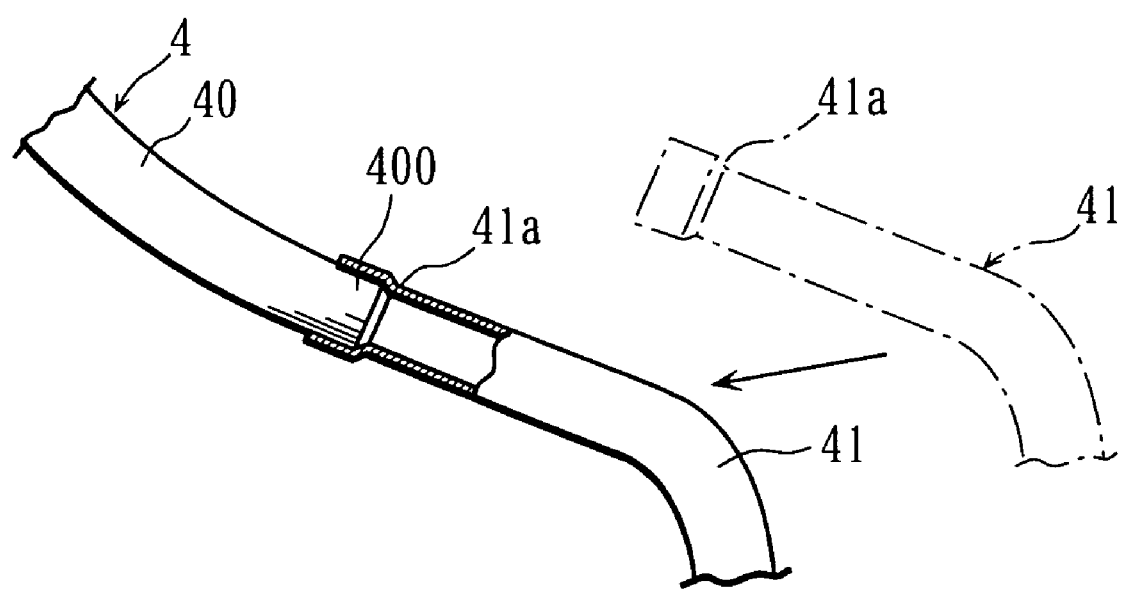
FIG. 24 is a sectional view showing a principal portion of another example of connection structure between a bent tube and a coiled tube constituting a water tube.

As shown in FIG. 19, the clearances 31 of the coiled tubes 40 are defined by using a plurality of spacers 18. Specifically, as shown in FIG. 23, the spacer 18 includes a base portion 18 in the form of an elongated rectangular plate made of stainless steel and a plurality of projections 18b arranged like teeth of a comb and formed by cutting and bending the base portion at a plurality of locations. By inserting the projections 18b between loops 40a of the coiled tubes 40, the clearances 31 are formed, and the height of the clearances is determined. For example, as shown in FIG. 20, three spacers 18 are arranged at approximately regular intervals in the heat exchanger A3. The space between adjacent loops 40a in the height direction, excluding the portion in which the projection 18b of the spacer 18 is inserted, is the clearance 31.

As better shown in FIGS. 20 and 21, the bent tubes 41 of the water tubes 4 serve as joint pipes for connecting the coiled tubes 40 to the headers 5. Each of the bent tubes 41 has an opposite pair of first and second ends 41a and 41b respectively formed with stepped portions 410a and 410b which include tapered surfaces. The portions closer to the ends than the stepped portions 410a, 410b are smaller-diameter potions whose diameter is smaller than that of the longitudinally intermediate portion. The first end 41a of each bent tube 41 is connected to the end 400 of the coiled tube 40 by fitting the smaller-diameter portion to the end 400. The direction in which the smaller-diameter portion is fitted to the end 400 is the tangential direction of the loops 40a of the coiled tube 40. The tapered surface of the stepped portion 410a is held in contact with the end surface of the end 400, and the contact portion is subjected to welding or brazing.

The bent tubes 41 are inserted into a plurality of openings 200 formed adjacent to an upper and a lower ends of the circumferential wall 20, and portions of the bent tubes 41 adjacent to the second ends 41b project out of the housing 2. The plurality of bent tubes 41 differ from each other in bending radius and total length, and the arrangement pitch P3 of the portions penetrating through the circumferential wall 20 and the second ends 41b is larger than the arrangement pitch P2 of the first ends 41a. With this structure, the connection of the headers 5 can be facilitated, and the strength of the portion formed with the openings 200 can be increased due to the large spacing between the openings 200. The portions of the bent tubes 41 adjacent to the second ends 41b extend straight in a direction perpendicular to the circumferential wall 20 and in parallel with each other. Between the portion penetrating through the circumferential wall 20 and the second end 41b of each bent tube 41, a portion which is larger in diameter than the penetrating portion does not exist. With such a structure, the insertion of the bent tubes 41 into the openings 200 of the circumferential wall 20 can be performed easily and properly.

Preferably, each of the openings 200 is a burring hole whose periphery is bent to stand, so that the periphery has an increased strength. Part of the circumferential wall 20, which includes the region formed with the openings 200, is a flat plate portion 201 which is not arcuate. The flat plate portion 201 is elongated in the vertical direction with a constant width and projects radially outward relative to other portions of the housing 2. With this structure, dimensioning of each of the openings 200 is easy, and the strength of the circumferential wall 20 can be enhanced. Moreover, since a large space is defined between the coiled tube 40 and the flat plate portion 201, bent tubes 41 having a relatively large radius of curvature can be used.

Each of the paired headers 5 is connected to the second ends 41b of the plurality of bent tubes 41. The header 5 may comprise a circular pipe 52, for example, and has an end formed with a connection port 50 to which a water inflow tube or a hot-water outflow tube (not shown) is to be connected. The header 5 is formed with a plurality of openings 51. The smaller-diameter portion of the second end 41b of each bent tube 41 is fitted into a respective one of the openings 51, and the tapered surface of the stepped portion 41 is held in engagement with the periphery of the opening 51. The contact portion is subjected to welding or brazing. Therefore, the bent tube 41 and the header 5 are reliably connected to each other and watertight sealing is provided.

For example, the heat exchanger A3 is manufactured by the following method.

Figure 25:
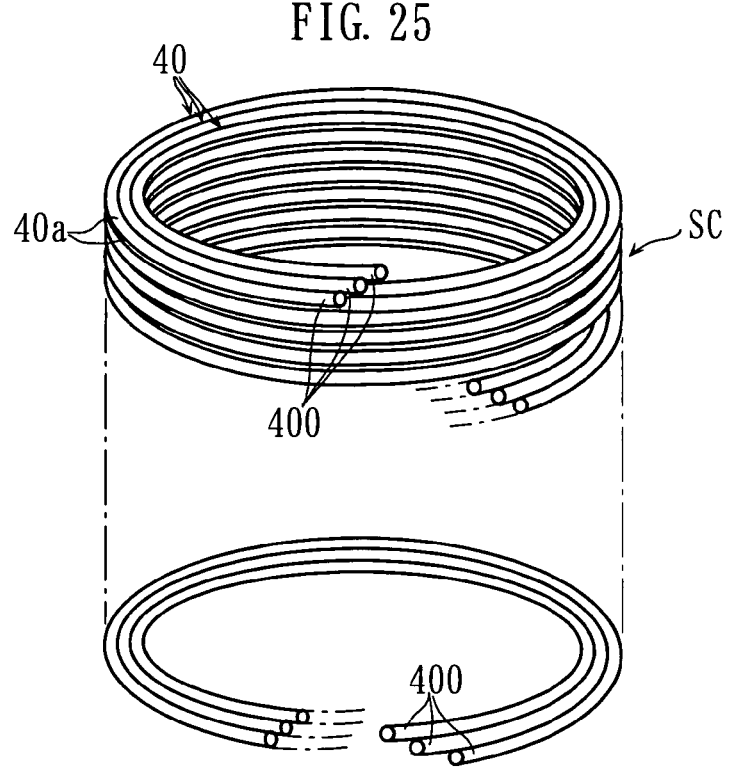
FIG. 25 is a schematic perspective view showing an example of plurality of coiled tubes.
Figure 26:
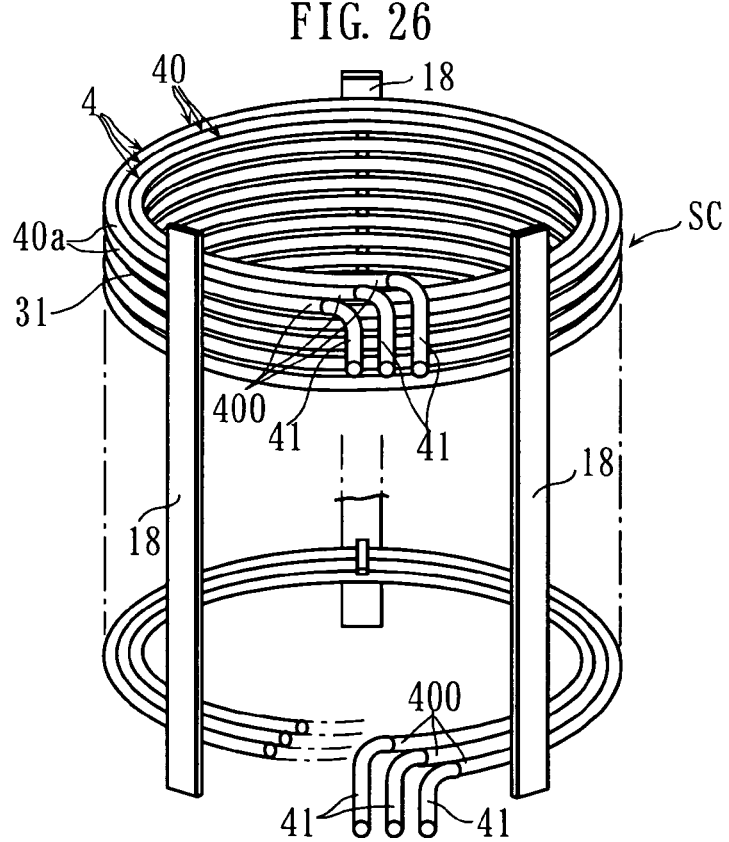
FIG. 26 is a schematic perspective view showing a process step of mounting attachments to the plurality of coiled tubes shown in FIG. 25.

First, as shown in FIG. 25, a plurality of coiled tubes 40 are arranged in a lap winding manner. Specifically, a plurality of coiled tubes 40 having different diameters are prepared by curving straight tubes into a helical shape, and then, the coiled tubes are fitted to each other. Subsequently, as shown in FIG. 26, bent tubes 41 are connected to opposite ends 400 of each coiled tube 40, whereby a plurality of water tubes 4 are completed. As described with reference to FIGS. 20 and 21, the connection of the bent tube 41 to each coiled tube 40 is performed by fitting the smaller-diameter portion of the first end 41a of the bent tube 41 into the end 400 of the coiled tube 40. Therefore, even when the arrangement pitch P2 of the ends 400 is small, the connection can be performed easily. Further, since the tapered surface of the stepped portion 410a and the end 400 are held in contact with each other and the contact portion is subjected to welding or brazing, good watertight sealing is provided.

Figure 27:
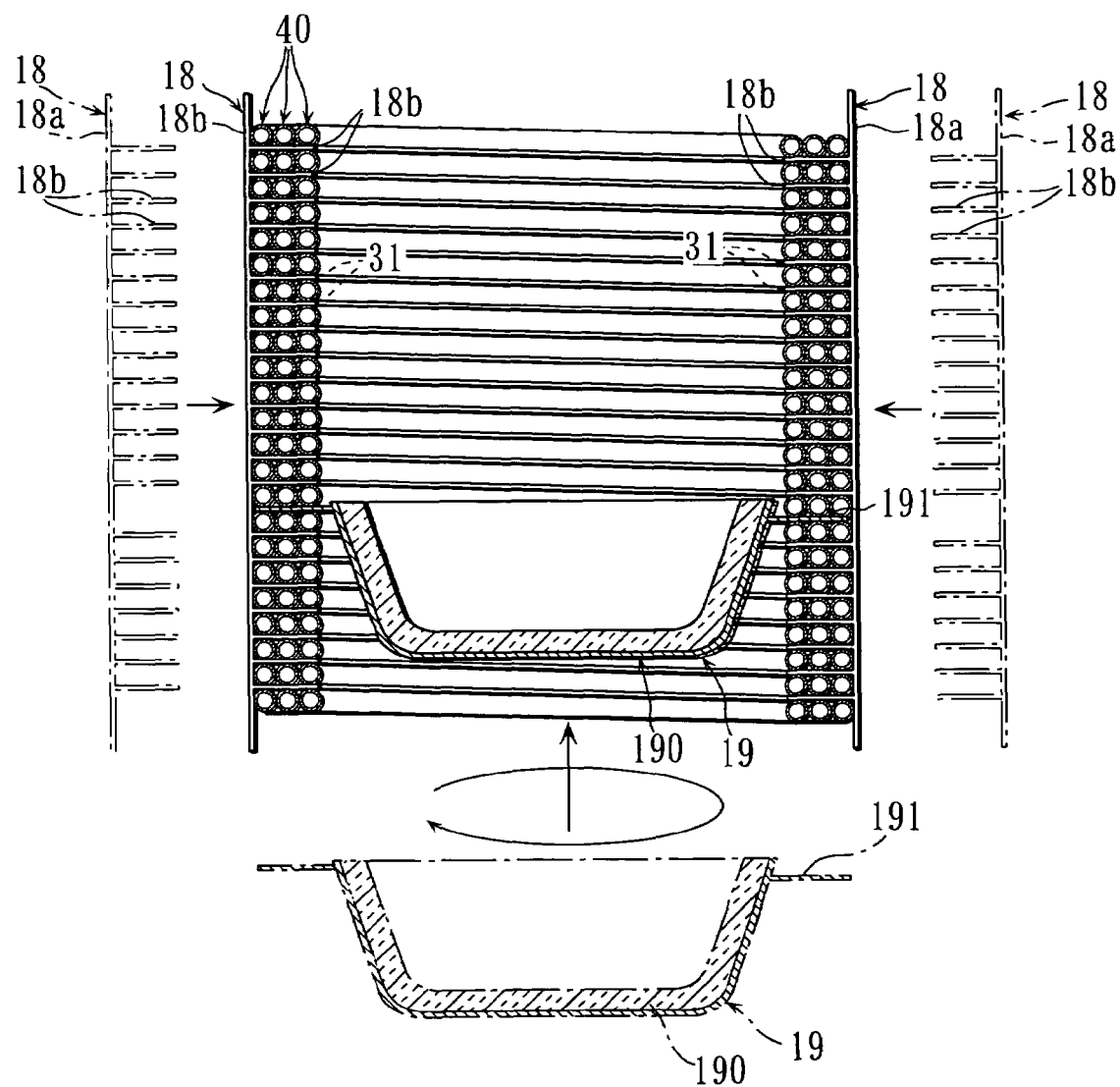
FIG. 27 is a sectional view showing a process step of mounting attachments to the plurality of coiled tubes shown in FIG. 25.

Subsequently, as shown in FIG. 27, a partition 19 is mounted to the coiled tubes 40. Specifically, mounting of the partition 19 is performed by turning the main body 190 of the partition 19 in the helical direction of the coiled tubes 40 while inserting the main body into the coiled tubes 40 from one end thereof so that the helical flange piece 191 is screwed to the coiled tubes 40. The partition 19 proceeds within the coiled tubes 40 in a certain direction when the partition 19 is turned in the predetermined direction and retreats when turned in the opposite direction. Therefore, the partition 19 can be easily set to a predetermined height. Thereafter, a plurality of spacers 18 are mounted to the coiled tubes 40. Specifically, the spacers are mounted by inserting the projections 18b of each spacer 18 between the loops 40a from the outside of the outermost coiled tube 40. By this operation, clearances 31 having a dimension equal to the thickness of each projection 18b are defined between the loops 40a. In the structure shown in FIG. 27, the projection 18b of each spacer 18 is not inserted into a portion corresponding to the flange piece 191 of the partition 19. However, instead of this structure, the projection 18b and the flange piece 191 may be inserted in a common space so that the projection overlaps the flange piece. Each of the spacers 18 may have a structure divided into a plurality of parts in the vertical direction.

Figure 28:
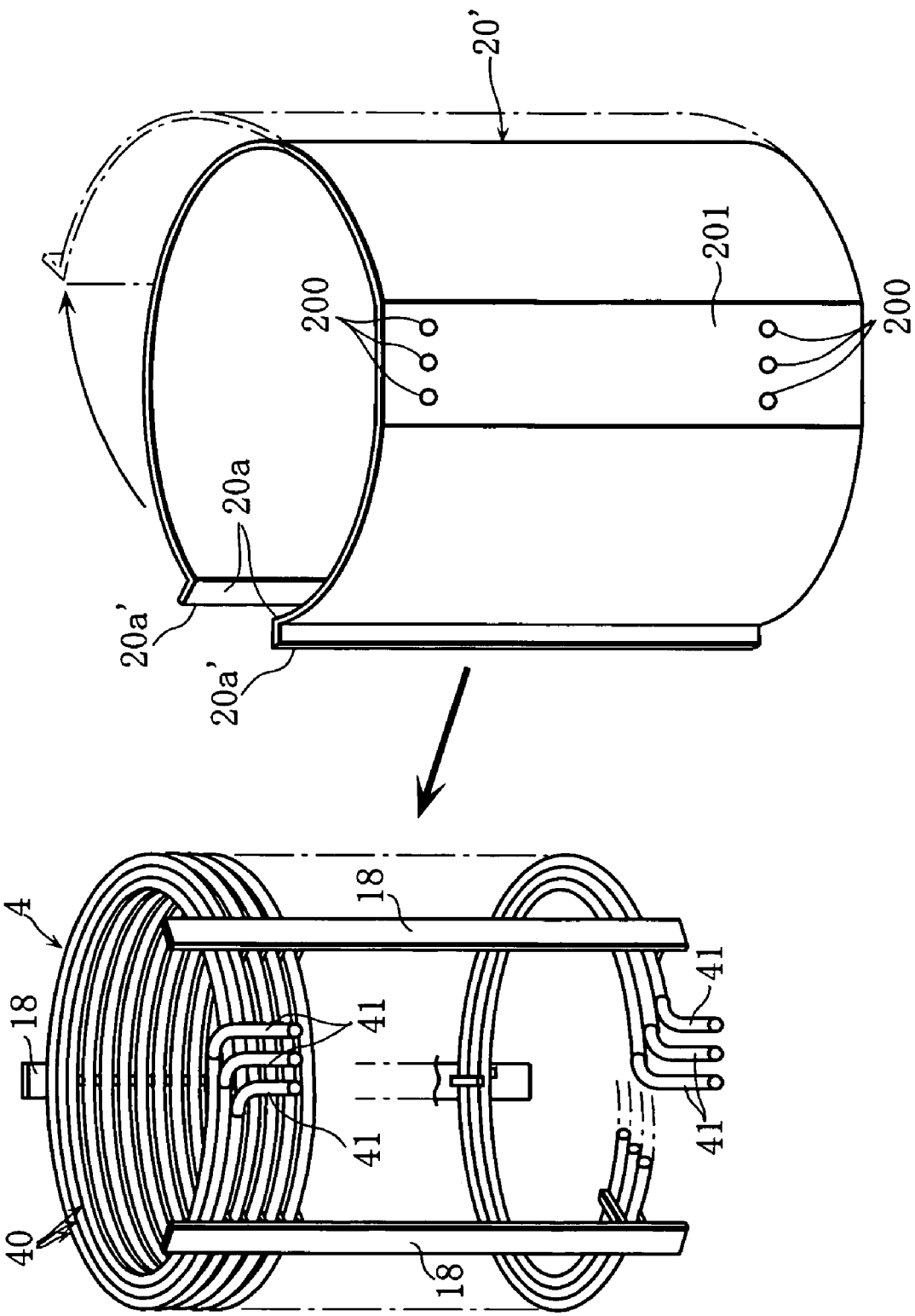
FIG. 28 is a schematic perspective view showing a process step of surrounding the coiled tubes and the attachments shown in FIG. 26 by a plate.

On the other hand, as shown in FIG. 28, a non-cylindrical plate 20' is prepared. The plate 20' is a part to become a cylindrical wall 20 of the housing 2 and made of a rectangular stainless steel plate having flexibility. Opposite edges 20a of the plate 20' are bent to form a pair of projections 20a'. Further, a plurality of openings 200 for inserting bent tubes 41 of water tubes 4 are formed. The plate 20' is curve-worked in advance so as to be easily formed into a cylindrical shape, and a flat plate portion 201 is also formed.

After the plate 20' is prepared, the plate 20' is placed to surround the coiled tubes 40 by widening the space between the edges 20a. At this time, the plurality of bent tubes 41 are inserted into the openings 200 from the respective second ends 41b. As noted before, the portions adjacent to the second ends 41b of the bent tubes 41 extend straight and in parallel with each other, so that the insertion of these portions into the openings 200 can be performed easily and properly.

Figure 29:
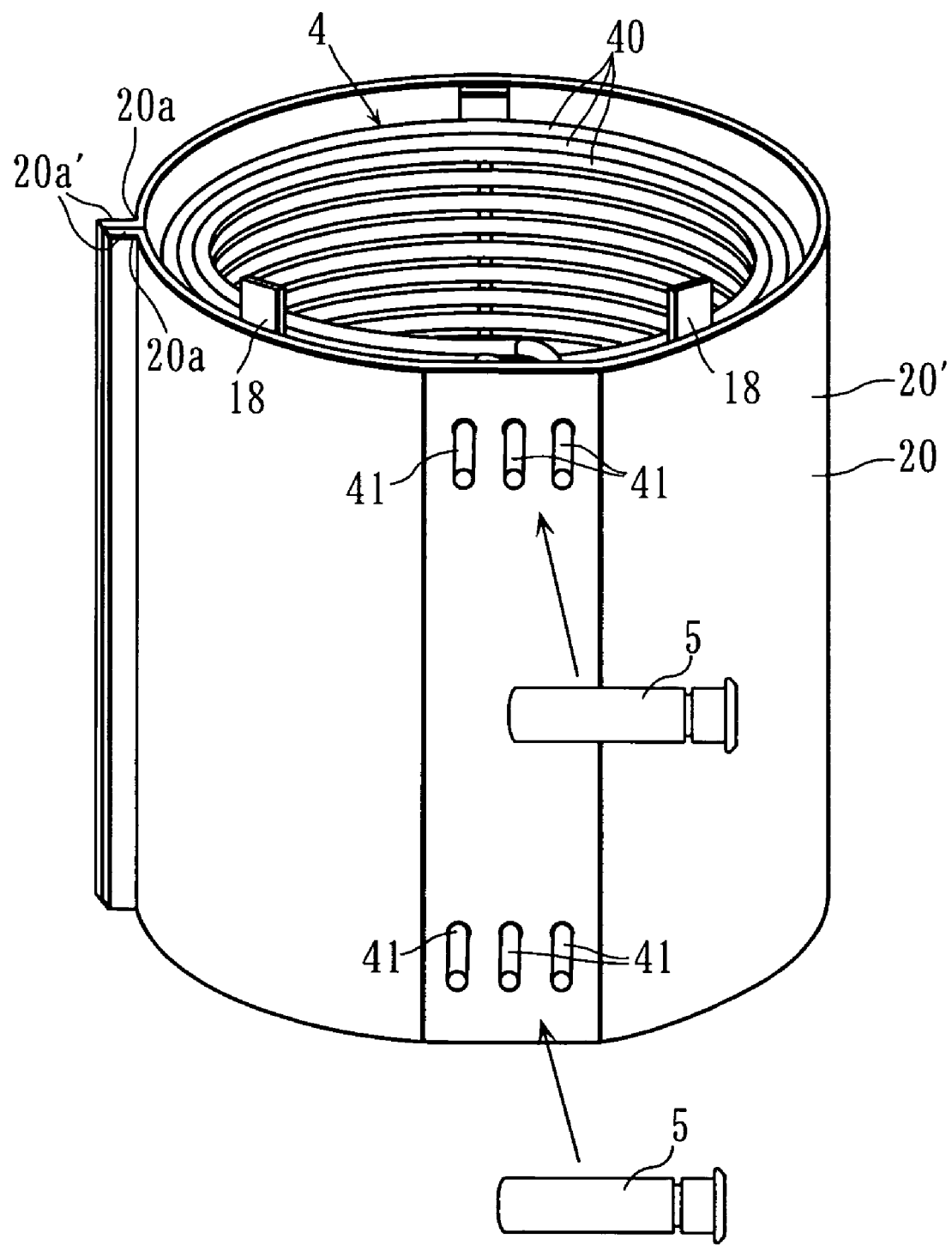
FIG. 29 is a perspective view showing the state in which the coiled tubes and the attachments shown in FIG. 26 are surrounded by the plate.

Thereafter, as shown in FIG. 29, the opposite edges 20a of the plate 20' are caused to face and come into contact with each other to make the plate 20' cylindrical. By pinching the paired projections 20a' by using an appropriate jig (not shown), the cylindrical shape of the plate 20' can be maintained, and in this state, the projections 20a' are welded together. As a result, a circumferential wall 20 having a fixed cylindrical shape is formed. Although each of the projections 20a' in this embodiment extends along the entire length of the edge 20a, the projection 20a' may be partially provided at one or plurality of locations of the edge 20a (at the upper and the lower ends of the edge 20a, for example).

Subsequently, a pair of headers 5 are connected to the bent tubes 41. As noted before, the connection of the headers 5 does not use any particular member and can be performed just by fitting the second end 41b of each bent tube 41 into the opening 51 of the header 5 and performing welding or brazing. Therefore, the cost is relatively low. Further, as shown in FIG. 21, the arrangement pitch P3 of the second ends 41b of the bent tubes 41 and the openings 51 is large, so that the connection of the bent tubes 41 and the header 5 can be performed easily.

Though not illustrated in FIG. 29, a pair of covers 21A and 21B are fitted into the upper and the lower openings of the circumferential wall 20 and welded to the circumferential wall 20. As noted before, the covers 21A and 21B can be positioned properly by utilizing a plurality of projections 25a and 25b formed at the circumferential wall 20. Therefore, the mounting of the covers is easy. Further, a plurality of brackets 23 are welded to the circumferential wall 20. However, the welding of the brackets 23 can be performed either before or after making the plate 20' cylindrical.

By the above-described method, the heat exchanger A3 is manufactured. As will be understood from the above description, in the heat exchanger A3, even when the arrangement pitch P2 of the ends 400 of the coiled tubes 40 is small, the headers 5 can be easily and properly connected to the coiled tubes 40 by utilizing the plurality of bent tubes 41. Particularly in this embodiment, after the bent tubes 41 are connected to the coiled tubes 40, the coiled tubes 40 are surrounded by the circumferential wall 20 of the housing 2, which further facilitates the connection of the bent tubes 41 to the coiled tubes 40. Even when the bent tubes 41 project largely from the coiled tubes 40, the coiled tubes 40 can be properly surrounded by the plate 20' by inserting the bent tubes 41 into the openings 200 of the circumferential wall 20 (plate 20'). When the bent tubes 41 project out from the housing 2 only by a small amount, the headers 5 are positioned close to the housing 2, so that the operation such as welding for mounting the headers 5 to the bent tubes 41 may be difficult. According to this embodiment, however, part of each bent tube 41 can project largely, so that such a difficulty can be properly avoided.

The water heater B2 shown in FIG. 17 includes a burner 1, a bottom casing 80 and an exhaust duct 81 in addition to the heat exchanger A3. Though FIG. 17 indicates that the fuel supply to the burner 1 is performed via a pipe 12a, there is no substantial difference between the burner 1 of this embodiment and that of the foregoing embodiments. Since the structures of the bottom casing 80 and the exhaust duct 81 are the same as those of the foregoing embodiments, detailed description thereof will be omitted.

In the water heater B2, the water inflow tube 99*a* and the hot-water water outflow tube 99*b* are connected to the paired headers 5. Preferably, the connection is so performed that the lower header 5 is used for water inflow whereas the upper header 5 is use for hot-water outflow. In such a case, water flows upward through the water tubes 4, and this water flow direction is opposite from the direction in which the combustion gas flows (downward), which is advantageous for enhancing the heat exchange efficiency. Particularly, since unheated water which has a relatively low temperature is supplied to the second heat exchanging portion HT2, the amount of heat recovery at the second heat exchanging portion HT2 can be increased, and latent heat can be properly recovered at this portion.

In the water heater B2, when the burner 1 is driven, fuel burns in the first region 30*a* to generate combustion gas. Although the combustion gas tries to flow downward, the gas cannot flow downward directly to the second region 30*b*, because the bottom of the first region 30*a* is closed by the partition 19. Therefore, the combustion gas passes through the clearances 31 of first heat exchanging portion HT1 of the tube lap winding structure SC to flow into the combustion gas path 32. In this process, the first heat exchanging portion HT1 recovers sensible heat from the combustion gas. Since a plurality of loops 40*a* are arranged in a lap winding manner in the first heat exchanging portion HT1, a large amount of heat can be recovered. Since the upper surface of the partition 19 is dented, the combustion gas which has flowed near the center of the first region 30*a* downward is reflected upward to avoid the center or the neighboring portions. As a result, combustion gas circulation as indicated by the arrows N1 in FIG. 17 is generated. By this operation, the temperature of the combustion gas within the first region 30*a* can be made uniform, and the amount of combustion gas flowing into each of clearances 31 is also made uniform, whereby the heat exchange efficiency can be further enhanced.

The combustion gas flowed to the combustion gas path 32 then passes through the clearances 31 of the second heat exchanging portion HT2 while flowing downward through the combustion gas path 32 and enters the second region 30*b*. In this process, the second heat exchanging portion HT2 recovers latent heat from the combustion gas. Similarly to the first heat exchanging portion HT1, a plurality of loops 40*a* are arranged in a lap winding manner also in the second heat exchanging portion HT2, so that a large amount of heat can be recovered.

When the latent heat recovery is performed in the second heat exchanging portion HT2, drain is generated at the portion and adheres to the surfaces of the loops 40*a*. Due to the gravity and the downward flow of the combustion gas, the drain drops downward and is duly received in the drain receiving portion 26. Since each of the coiled tubes 40 is helical and inclined, it is expected that the drain can advantageously flow readily downward along the surfaces of the coiled tube 40. As noted before, when the drain remains on the surfaces of the coiled tube 40, the direct contact between the coiled tube 40 and the combustion gas is hindered by the drain, which may result in a reduction in the amount of heat transfer. However, by causing the drain to readily flow downward, such a problem can be avoided. The drain received by the drain receiving portion 26 is duly discharged to the outside through the drain discharge port 26*b* and the pipe 82. Therefore, the inside of the bottom casing 80 is not contaminated by the acidic drain. Therefore, the bottom casing 80 can be made of a material such as copper or iron which is inferior in acid resistance to stainless steel but less expensive than stainless steel.

Figure 30:
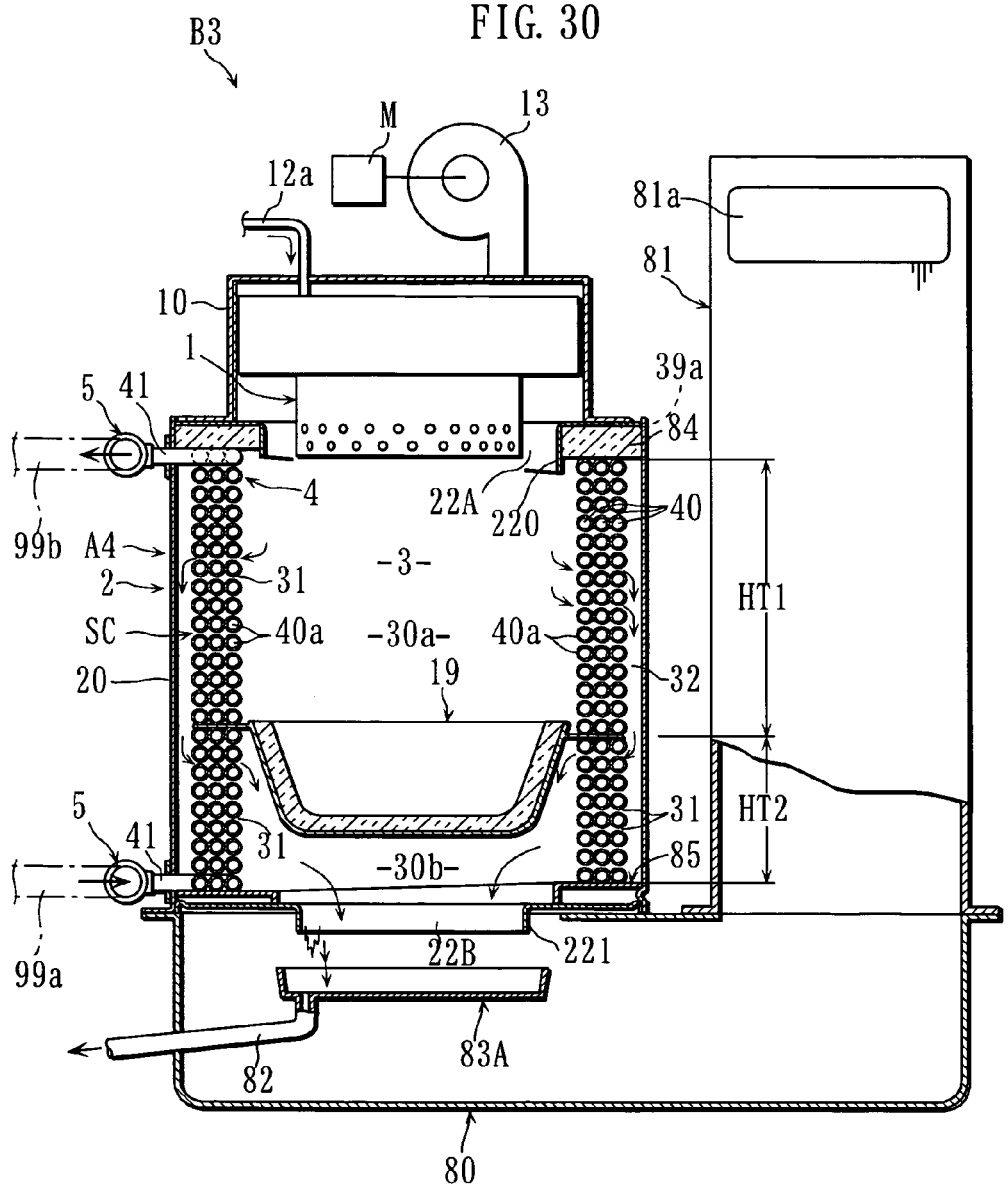
FIG. 30 is a schematic sectional view showing another example of heat exchanger and water heater incorporating the heat exchanger according to the present invention.

In the water heater B3 shown in FIG. 30, a heat insulating member 84 and a spacer 85 are arranged in the housing 2 of the heat exchanger A4. Further, a receiving member 83A for receiving drain is arranged in the bottom casing 3. The heat insulating member 84 is ring-shaped and interposed between the upper end of the tube lap winding structure SC and the cover 21A so as to close the gap 39*a* therebetween. The heat insulating member 84 may be made of a flexible ceramic material, for example. As noted before, since the tube lap winding structure SC is made up of helical tubes, the upper end surface of the tube lap winding structure SC is inclined. Accordingly, the heat insulating member 84 does not have a uniform thickness, and the bottom surface thereof is inclined, so that the clearance 39*a* can be properly closed.

With this structure, the heat insulating member 84 properly prevents the combustion gas from flowing from the first region 30*a* directly to the upper end of the combustion gas path 32 through the gap 39*a*. Therefore, the annular wall 220 of the cover 21A does not need to be held in contact with the inner circumferential surface of the innermost coiled tube 40. As a result, the diameter of the burner opening 22A can be made smaller than the inner diameter of the coiled tube 40.

The spacer 85 is ring-shaped similarly to the heat insulating member 84 and placed at the bottom of the housing 2 to support the tube lap winding structure SC. Since the lower end surface of the tube lap winding structure SC is inclined similarly to the upper end surface, the spacer 85 does not have a uniform thickness, and the upper surface thereof is inclined, similarly to the above-described heat insulating member 84. Moreover, the support member 85 closes the terminating end of the combustion gas path 32. Therefore, the combustion gas reaching the terminating end is reliably prevented from directly flowing into the second region 30*b* without passing through the clearances 31 of the tube lap winding structure SC. Therefore, the annular wall 221 of the cover 21B does not need to be held in contact with the inner circumferential surface of the innermost coiled tube 40. In this embodiment, the annular wall 221 projects downward.

The bottom portion of the housing 2 serves as a drain guide portion for guiding the drain dropping from the tube lap winding structure SC to the combustion gas outlet 22B. Since the upper surface of the spacer 85 is inclined as noted before, the drain can be caused to flow readily toward the combustion gas outlet 22B by utilizing the inclination. The receiving member 83A is in the form of a pan, for example, and arranged directly below the combustion gas outlet 22B so as to be capable of receiving the drain dropping from the combustion gas outlet 22B. The drain received in the receiving member 83A is discharged to the outside of the bottom casing 80 through the pipe 82.

In this embodiment again, similarly to the foregoing embodiment, the inside of the bottom casing 80 is prevented from being contaminated by the drain. Since the combustion gas outlet 22B is utilized also as the drain discharge port, the heat exchanger A4 does not require an additional discharge port for solely discharging the drain, which is suitable for simplifying the structure of the heat exchanger A4.

Figure 31:
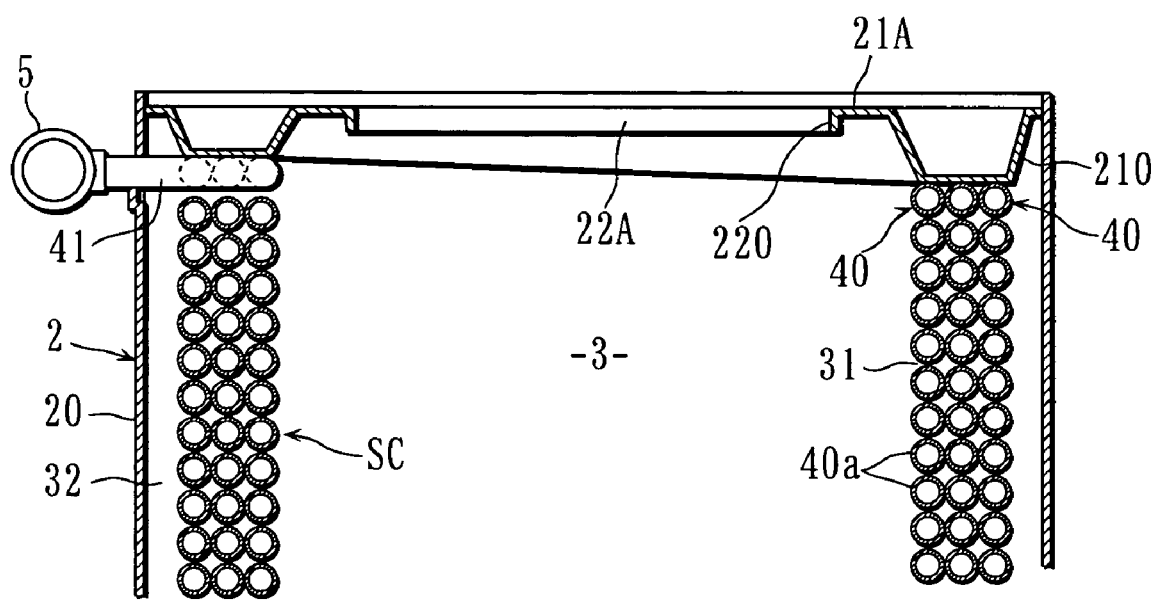
FIG. 31 is a sectional view showing a principal portion of another example of heat exchanger according to the present invention.

In the embodiment shown in FIG. 31, the cover 21A includes a downward projection 210 formed by press molding. The projection 210 is held in contact with the upper end of the tube lap winding structure SC. The lower surface of the projection 210 is inclined correspondingly to the upper end surface of the tube lap winding structure SC. According to this embodiment, a gap through which the combustion gas flows is prevented from being formed above the tube lap winding structure SC. Further, such a separate member as the heat insulating member 84 shown in FIG. 30 is unnecessary, and the need for holding the annular wall 220 in contact with the coiled tube 40 can be eliminated.

Figure 32:
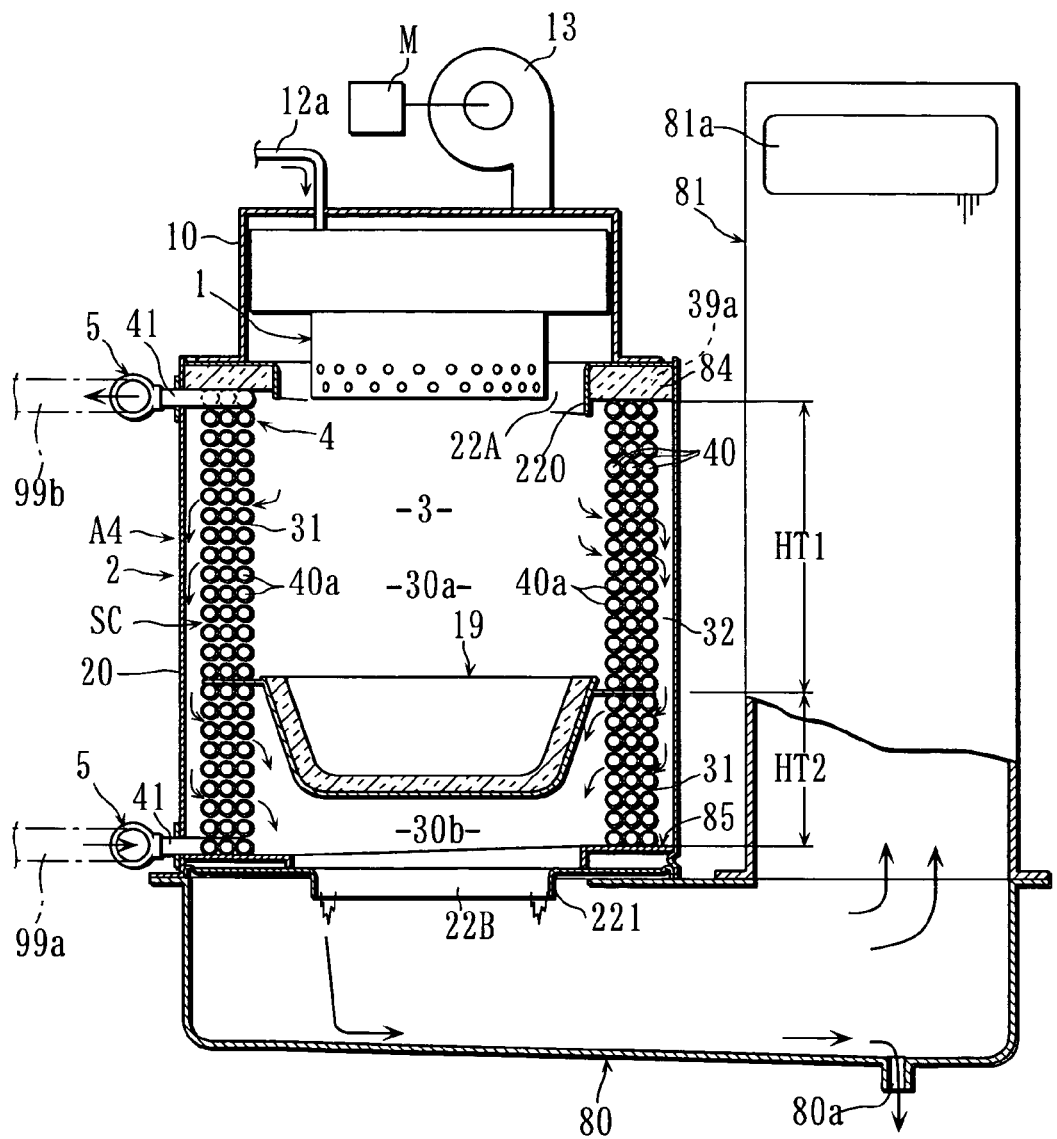
FIG. 32 is a schematic sectional view showing another example of heat exchanger and water heater incorporating the heat exchanger according to the present invention.

In the embodiment shown in FIG. 32, the drain dropping downward through the combustion gas outlet 22B of the heat exchanger A2 is received by the bottom wall of the bottom casing 80. The bottom wall is formed with a drain discharge port 80a. Preferably, the bottom wall is so inclined that the drain flows readily toward the drain discharge port 80a. In this embodiment, since the bottom casing 80 is utilized as a drain receiving member, a member to be used exclusively for receiving drain does not need to be provided, which is advantageous for reducing the number of parts. To prevent the bottom casing 80 from being easily corroded by the acidic drain, it is preferable to make the bottom casing 80 out of stainless steel or other acid-resistant materials.

Figure 33:
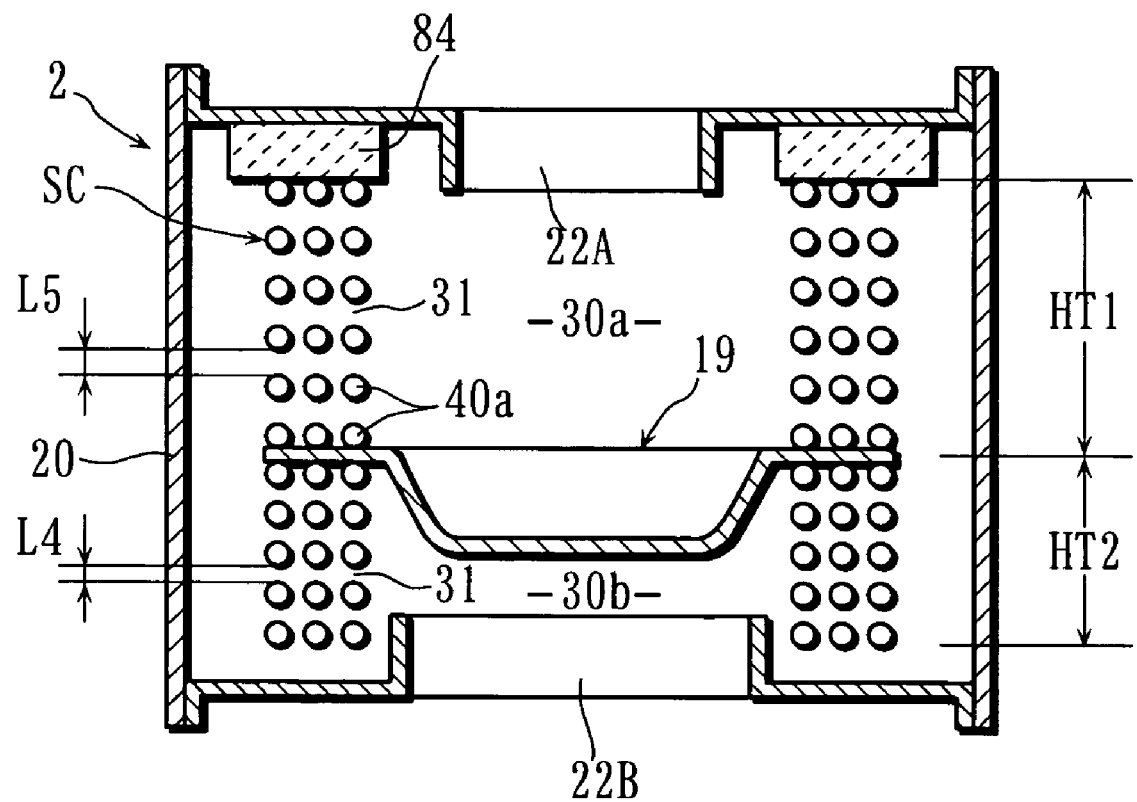
FIG. 33 is a schematic sectional view showing another example of heat exchanger according to the present invention.

In the embodiment shown in FIG. 33, the dimensions L4 and L5 of the clearances 31 of the first and the second heat exchanging portions HT1 and HT2 differ from each other. Specifically, the dimension L4 is smaller than the dimension L5. With this structure, as compared with a structure in which the dimensions L4 and L5 are equal, the amount of heat recovery by the second heat exchanging portion HT2 relative to that by the first heat exchanging portion HT1 can be increased. Therefore, this structure is suitable for the latent heat recovery. In the present invention, contrary to this embodiment, the dimension L4 may be set larger than the dimension L5.

Figure 34:
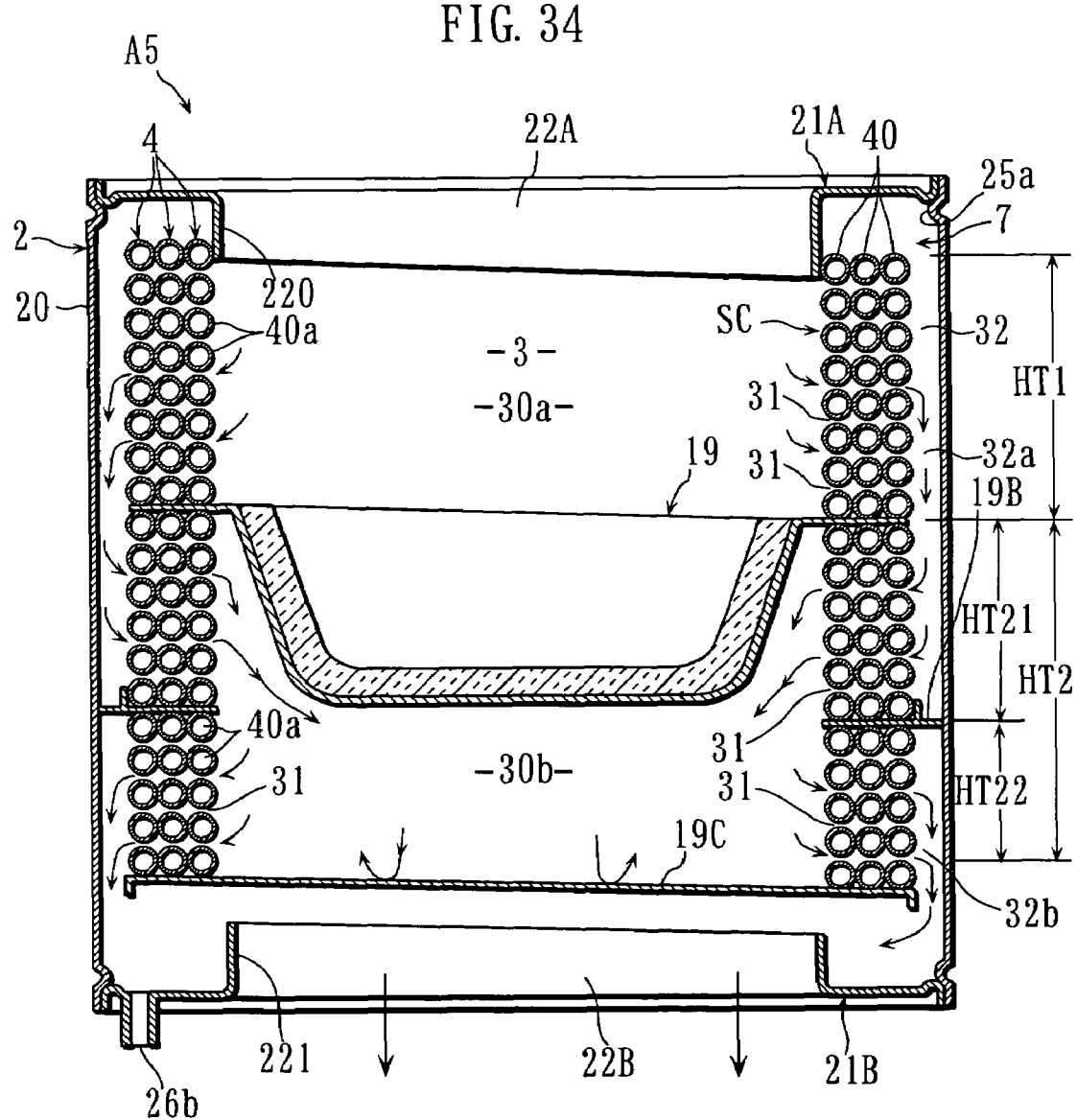
FIG. 34 is a sectional view showing another example of heat exchanger according to the present invention.

The heat exchanger A5 shown in FIG. 34 includes two auxiliary partitions 19B and 19C. For example, these partitions are made of stainless steel. The partition 19B is ring-shaped and partitions the second heat exchanging portion HT2 of the tube lap winding structure SC into two divided portions HT21 and HT22 while partitioning the combustion gas path 32 into two divided portions 32a and 32b. Preferably, the width of the second heat exchanging portion HT2 in the vertical direction is larger than that of the first heat exchanging portion HT1, and there is not much difference among respective widths of the first heat exchanging portion HT1, the divided portion HT21, and the divided portion HT22. The auxiliary partition 19C is in the form of a circular plate and arranged in contact with the lower end of the tube lap winding structure SC to close the bottom opening of the second region 30b.

In this embodiment, the combustion gas passed through the first heat exchanging portion HT1 and flowed to the divided portion 32a of the combustion gas path 32 enters the second region 30b by passing through the clearances 31 of the divided portion HT21 of the second heat exchanging portion HT2. Subsequently, the combustion gas flows from the second region 30b to the divided portion 32b of the combustion gas path 32 by passing through the clearances of the divided portion HT22 and then flows toward the combustion gas outlet 22B. As will be understood from this combustion gas flow, in this embodiment, the tube lap winding structure SC is divided into three small regions, i.e., the first heat exchanging portion HT1 and two divided portions HT21 and HT22, and the combustion gas passes successively through the three regions in a meandering manner. Further, the respective widths of the three regions are made generally uniform so as not to have much difference. Therefore, non-uniformity in the amount of combustion gas flowing to each region of the tube lap winding structure SC can be reduced, and the heat exchange efficiency can be further enhanced. By dividing the tube lap winding structure SC into smaller parts, the flow path area of the combustion gas is reduced so that the flow velocity of the combustion gas can be increased, which also enhances the heat exchange efficiency.

Figure 35:
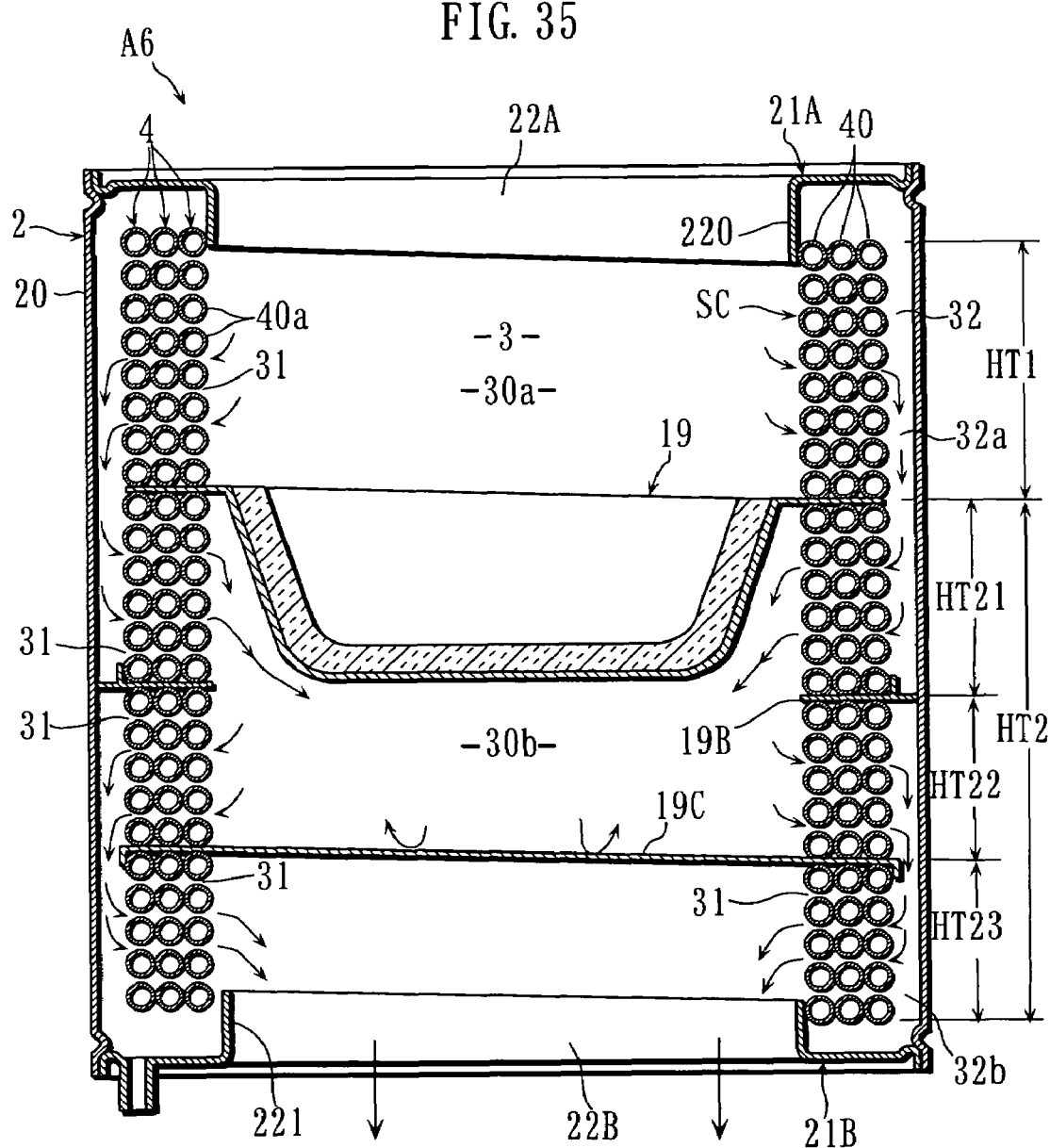
FIG. 35 is a sectional view showing another example of heat exchanger according to the present invention.

The heat exchanger A6 shown in FIG. 35 includes an extension portion HT23 provided under the tube lap winding structure SC and extending further downward relative to the auxiliary partition 19C. Preferably, the width of the extension portion HT23 in the vertical direction is also generally equal to the width of the first heat exchanging portion HT1 and the two divided portions HT21, HT22. In the heat exchanger A6, the combustion gas flowed to the divided portion 32b of the combustion gas path 32 flows from this portion to pass through the clearances 31 of the extension portion HT23.

According to this embodiment, the tube lap winding structure SC is divided into four smaller regions, and the combustion gas acts successively on all of the four regions. Therefore, a higher heat exchange efficiency can be achieved as compared with the heat exchanger A5 shown in FIG. 34.

Figure 36:
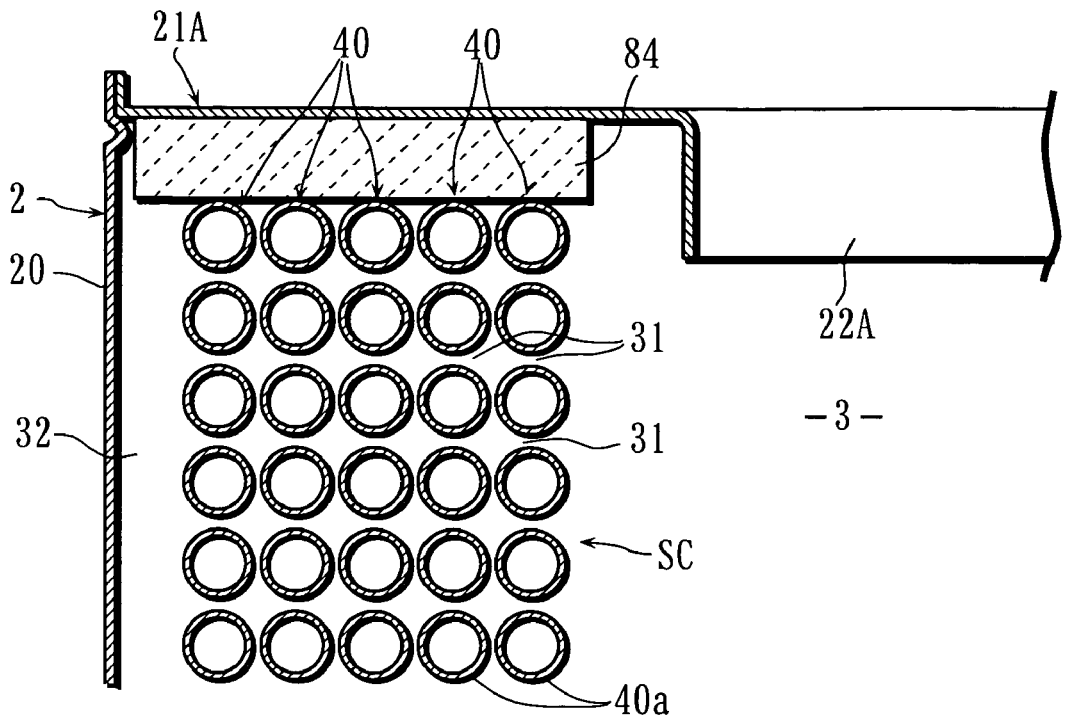
FIG. 36 is a sectional view showing a principal portion of another example of heat exchanger according to the present invention.

In the embodiment shown in FIG. 36, five coiled tubes in all are arranged in a lap winding manner. Since the number of coiled tube 40 is large in this embodiment, the amount of heat recovery can be increased. As will be understood from this embodiment, according to the present invention, high heat exchange efficiency can be easily achieved by increasing the number of coiled tubes.

Figure 37:
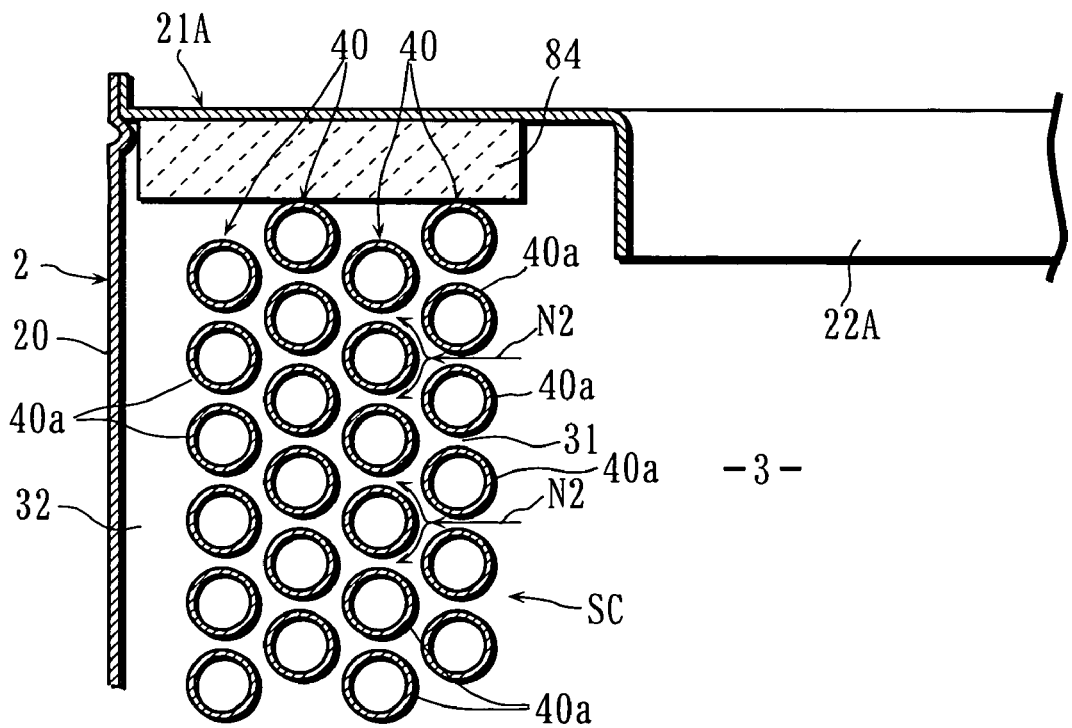
FIG. 37 is a sectional view showing a principal portion of another example of heat exchanger according to the present invention.

In the embodiment shown in FIG. 37, a plurality of coiled tubes 40 are provided in a staggered arrangement. Beside a clearance 31 between adjacent loops 40a of one coiled tube 40, a loop 40a of another coiled tube 40 exists. In this embodiment, as indicated by the arrows N2, the combustion gas passed through a clearance 31 of one coiled tube 40 hits against the loop 40a positioned beside the clearance. Therefore, the degree of contact between the combustion gas and the loops 40a is increased, whereby the amount of heat recovery is increased. As will be understood from this embodiment, in the present invention, the heat exchange efficiency can be enhanced also by contriving the arrangement of the plurality of coiled tubes 40, and the coiled tubes 40 can be arranged in various ways.

Figure 38:
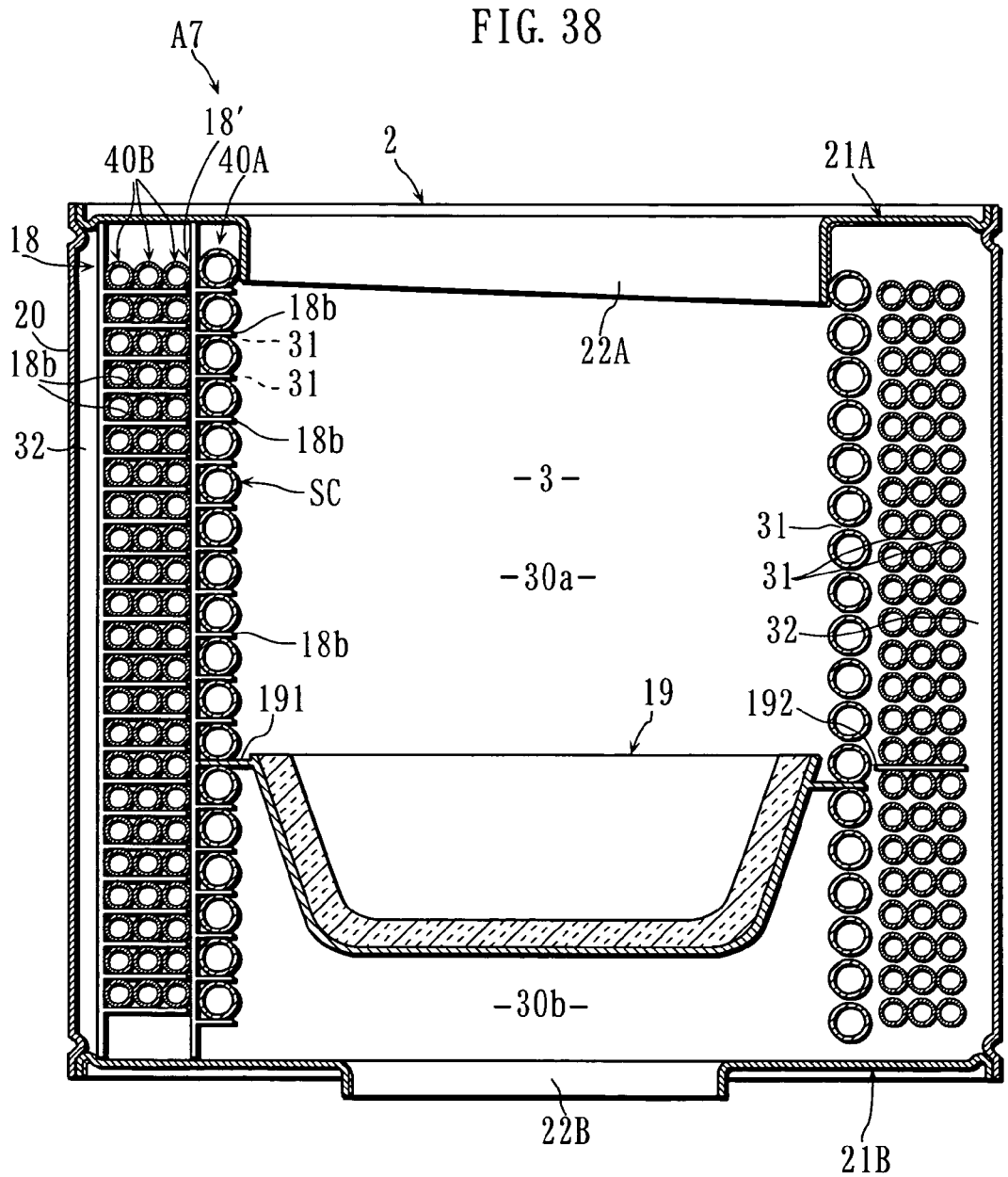
FIG. 38 is a sectional view showing another example of heat exchanger according to the present invention.

In the heat exchanger A7 shown in FIG. 38, the plurality of coiled tubes 40 are not equal in tube diameter, and the tube diameter of the innermost coiled tube 40A is larger than those of other coiled tubes 40B. Since the helical pitch of the coiled tube 40A differs from that of the coiled tubes 40B, a spacer 18' which differs from the spacer 18 in arrangement pitch of the projections 18b is used as means for forming clearances 31 between the loops 40a of the coiled tube 40A.

In this embodiment, since the tube diameter of the coiled tube 40A is large, the amount of water that flows this portion is large. The coiled tube 40A, which directly surrounds the first region 30a serving as the combustion chamber, is the portion which is heated to a highest temperature. Therefore, the amount of heat recovery by the coiled tube 40A is large, whereby the heat exchange efficiency can be further enhanced. Moreover, since the coiled tube 40A and coiled tubes 40B differ from each other in helical pitch due to the difference of the tube diameter, a stepped portion in the height direction is defined between each of the clearances 31 of the coiled tube 40A and the clearances 31 of the coiled tubes 40B. Therefore, the combustion gas flowing from the space 3 hits against the coiled tubes 40B after passing through the clearances 31 of the coiled tube 40A. Therefore, the degree of contact between the coiled tubes 40 and the combustion gas is increased, so that further enhancement of the heat exchange efficiency can be expected.

As will be understood from the above-described embodiment, in the present invention, the tube diameters of the plurality of coiled tubes do not need to be equal. Contrary to the above embodiment, the coiled tube having the largest tube diameter may be arranged at the outermost position so that the latent heat recovery is performed by this portion. Further, all the coiled tubes may be different from each other in tube diameter.

Figure 39:
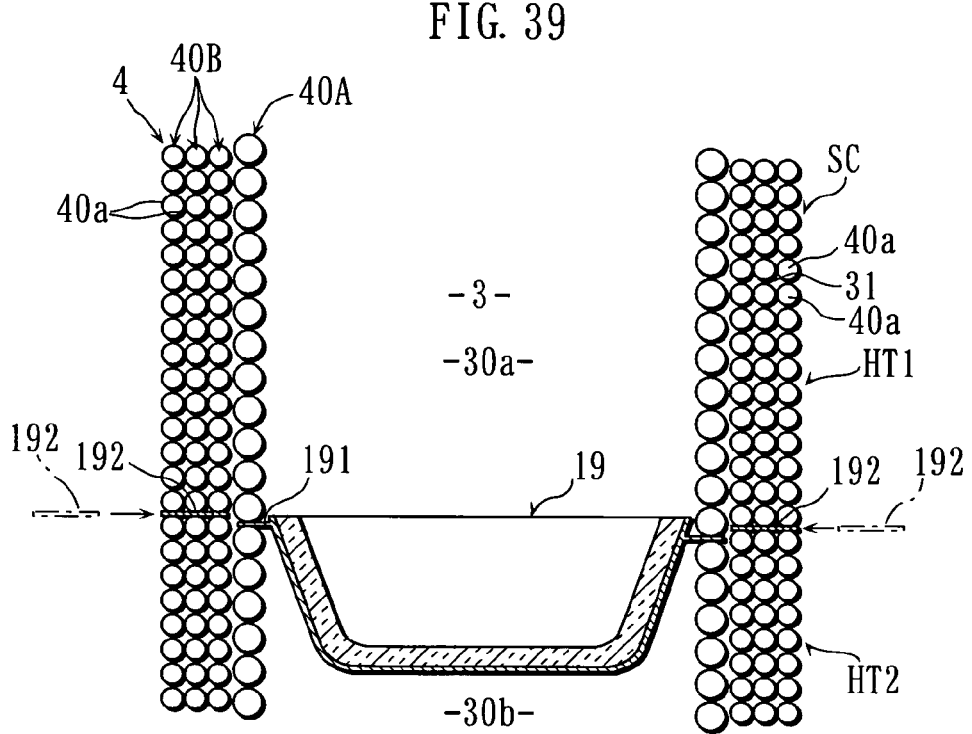
FIG. 39 shows means for mounting a partition applied to the heat exchanger shown in FIG. 38.

In the heat exchanger A7 shown in FIG. 38, since the coiled tubes 40A and 40B differ from each other in helical pitch, it is difficult to screw the flange piece 191 of the partition 19 to both of the coiled tubes 40A and 40B. Therefore, in the heat exchanger A7, the flange piece 61 is screwed only to the innermost coiled tube 40A, and other coiled tubes 40B are partitioned by using a plurality of additional partitions 192. For example, each of the partitions 192 is an arcuate thin plate and inserted into the clearance 31 of the coiled tubes 40B from a side of the tube lap winding structure SC, as shown in FIG. 39. By the provision of the partitions 192, the combustion gas flowed from the first region 30a to a lower region of the first heat exchanging portion HT1 is prevented from flowing straight downward to directly enter the second region 30b.

Figure 40:
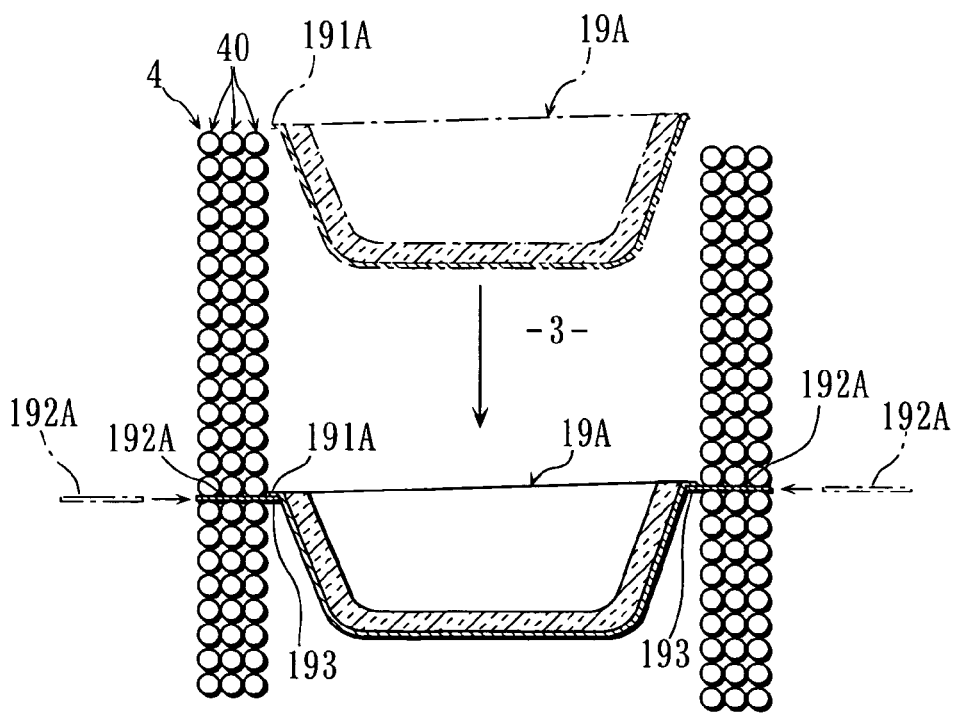
FIG. 40 shows another example of means for mounting a partition.
Figure 41:
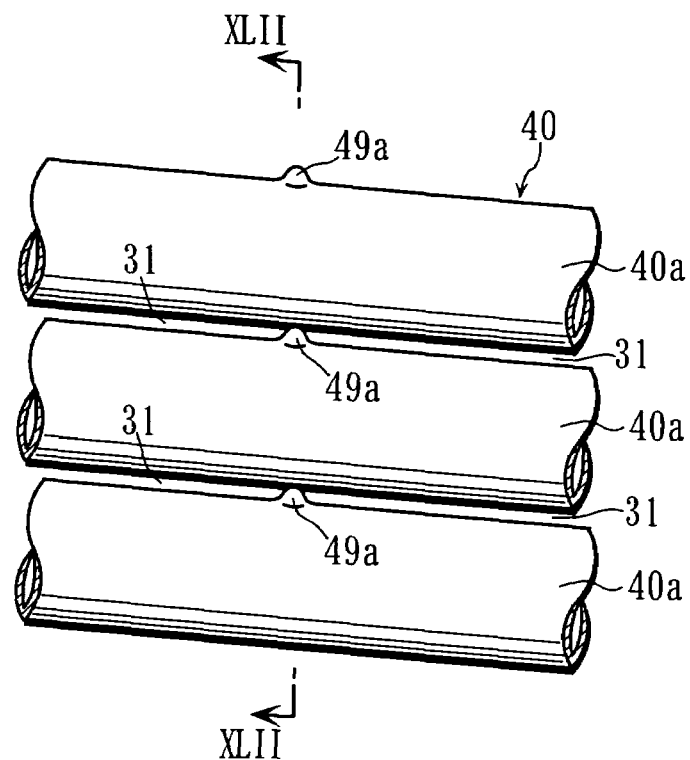
FIG. 41 is a side view showing a principal portion of another example of means for forming clearances in a coiled tube.
Figure 42:
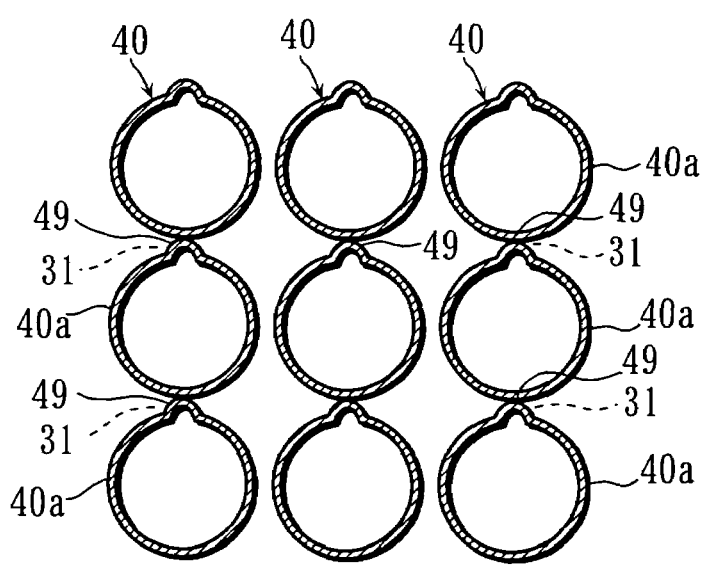
FIG. 42 is a sectional view taken along lines XLII-XLII in FIG. 41.

FIG. 40 shows another example of means for mounting a partition. In this embodiment, a plurality of additional partitions 192A are inserted into the clearances 31 of the coiled tubes 40 from the outside thereof. Although the partition 192A is similar to the partitions 192, the inner peripheral portion of the partition 192A is a projection 193 projecting into the space 3. Although the partition 19A includes a flange piece 191A, the flange piece 191A is not a portion for screwing to the coiled tubes 40, and the outer diameter of the flange piece is slightly smaller than the inner diameter of the innermost coiled tube 40. By inserting the partition 19A into the space 3 through the upper opening of the space 3, the flange piece 191A engages the projection 193 and is supported by the projection. Also by this embodiment, the partition can be properly mounted at a predetermined portion in the space 3.

FIGS. 41-49 show other examples of means for forming clearances between loops of a coiled tube. In the embodiment shown in FIGS. 41 and 42, each loop 40a of the coiled tubes 40 is formed with a projection 49a. Vertically-adjacent loops 40a are held in contact with each other via the projection 49a, whereby clearances 31 are defined.

Figure 43:
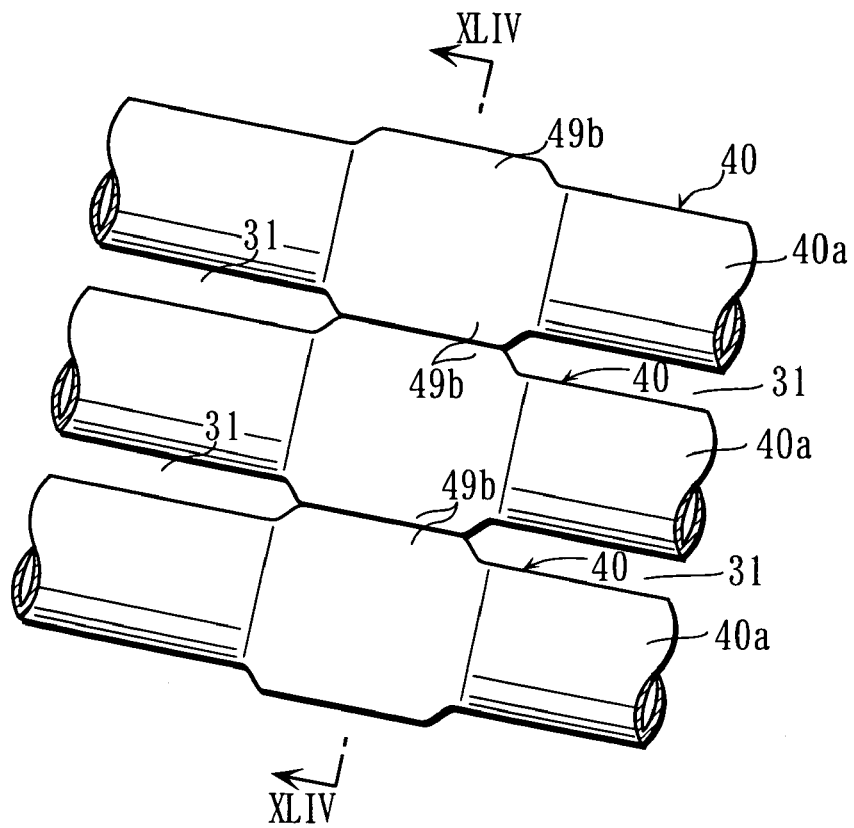
FIG. 43 is a side view showing a principal portion of another example of means for forming clearances in a coiled tube.
Figure 44:
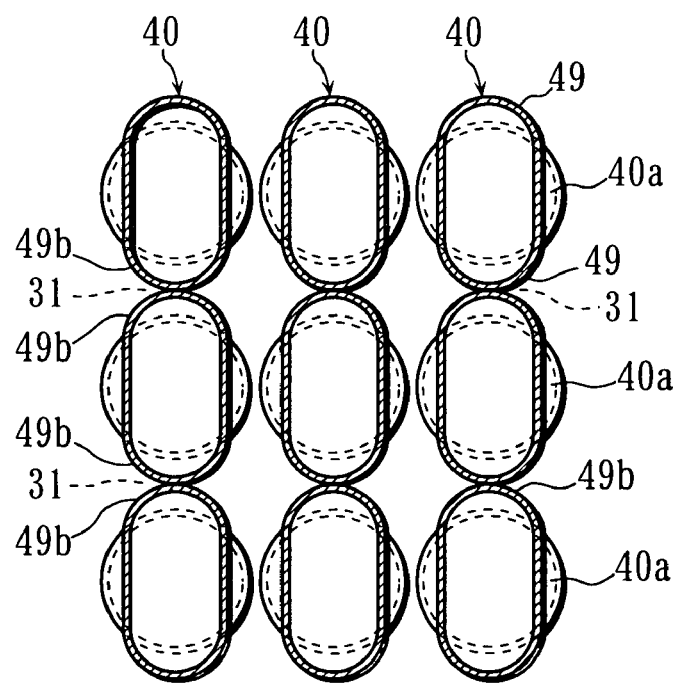
FIG. 44 is a sectional view taken along lines XLIV-XLIV in FIG. 43.
Figure 45:
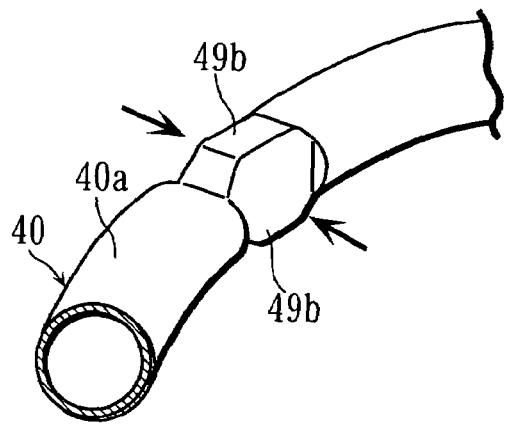
FIG. 45 is a perspective view of the coiled tube shown in FIGS. 43 and 44.

In the embodiment shown in FIGS. 43 and 44, part of the upper surface and part of the lower surface of each loop 40a are projections 49b. Adjacent loops 40a are held in contact with each other via the projection 49b, whereby clearances 31 are defined. For example, as shown in FIG. 44, each loop 40a comprises a tube which is circular in cross section but includes a portion which is not circular but flat in cross section, whereby the projections 49b are formed. As shown in FIG. 45, the projections can be formed by pressing part of the coiled tube 40 from opposite sides.

Figure 46A:
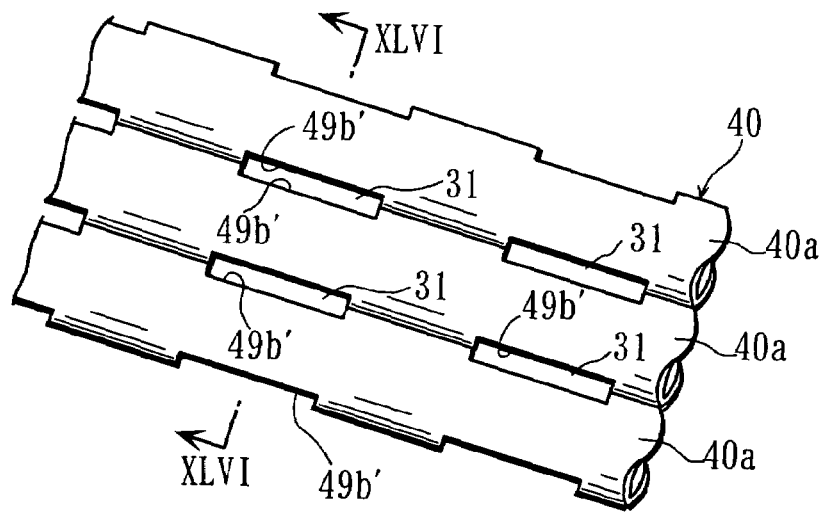
Figure 46B:
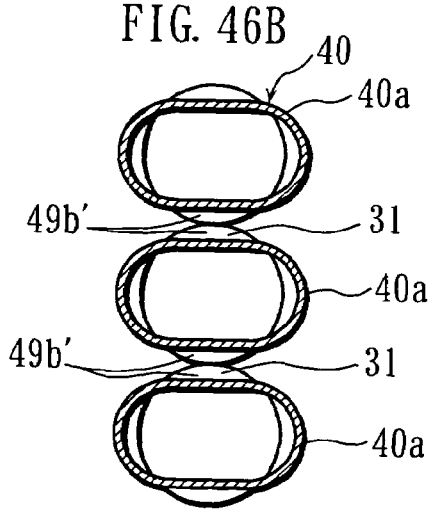
FIG. 46B is a sectional view taken along lines XLVI-XLVI in FIG. 46A.

In the embodiment shown in FIGS. 46A and 46B, a plurality of recesses 49b' are formed at each of the loops 40a. The recesses 49b' can be formed by pressing part of the coiled tube 40 from above and below to form flat surfaces. Loops 40a which are adjacent to each other in the height direction are stacked in contact with each other, but clearances 31 are defined between the loops at the locations where the recesses 49b' are formed. Also with this structure, clearances 31 can be formed properly.

Figure 47:
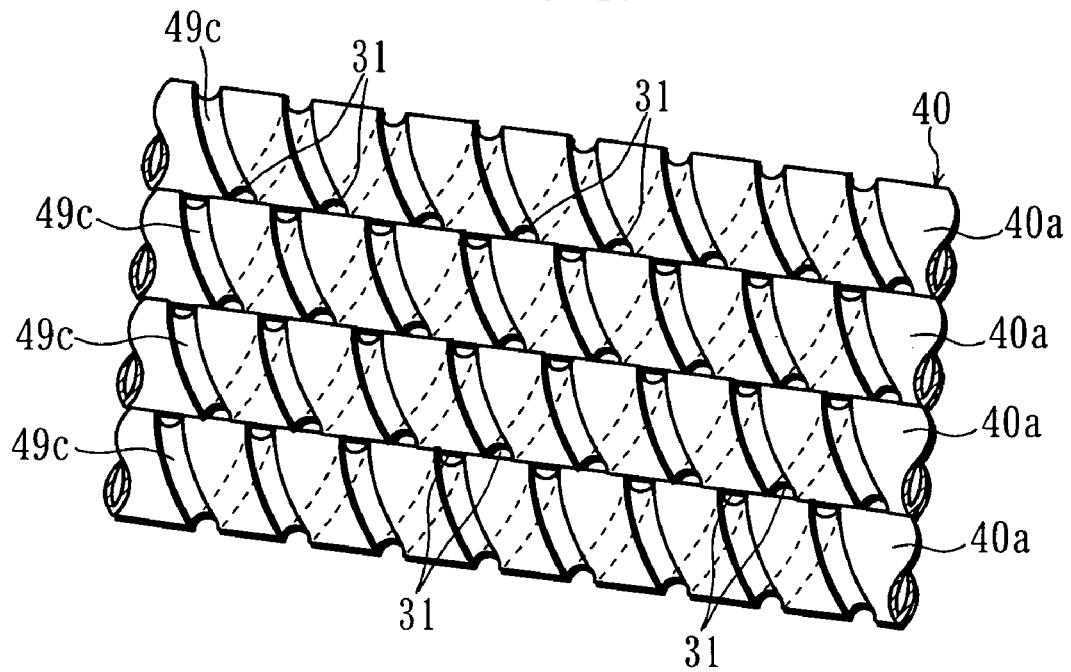
FIG. 47 is a side view showing a principal portion of another example of means for forming clearances in a coiled tube.
Figure 48:
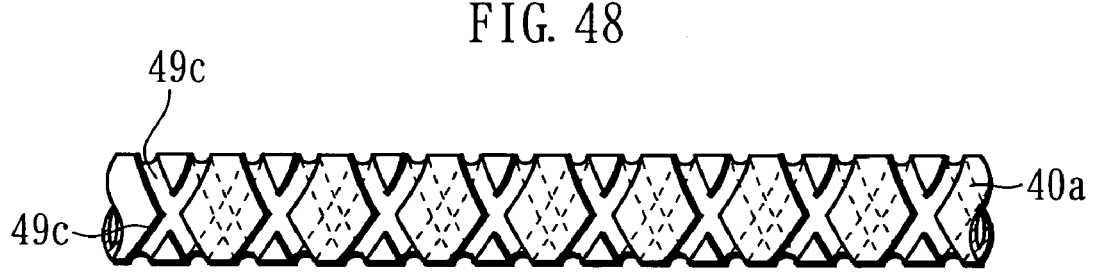
FIG. 48 is a side view showing a principal portion of another example of means for forming clearances in a coiled tube.
Figure 49:
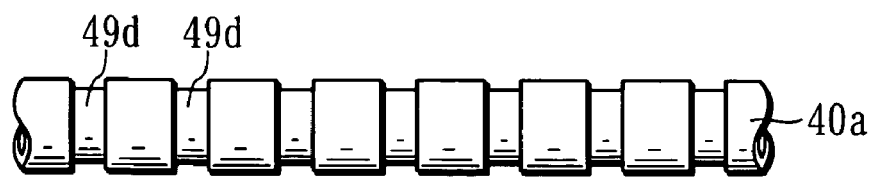
FIG. 49 is a side view showing a principal portion of another example of means for forming clearances in a coiled tube.

In the embodiment shown in FIG. 47, a helical groove 49c is formed on the outer surface of each loop 40a, and part of the groove 49c serves as a clearance 31. In the embodiment shown in FIG. 48, two strips of grooves 49c which differ from each other in direction of helix are formed. As the number of grooves 49c increases, the total size of the clearances 31 increases. Therefore, a large number of grooves 49c may be formed. In the embodiment shown in FIG. 49, a plurality of non-helical annular grooves 49d are formed on the outer surface of the loop 40a. Also with this structure, the clearances 31 can be formed.

Figure 50:
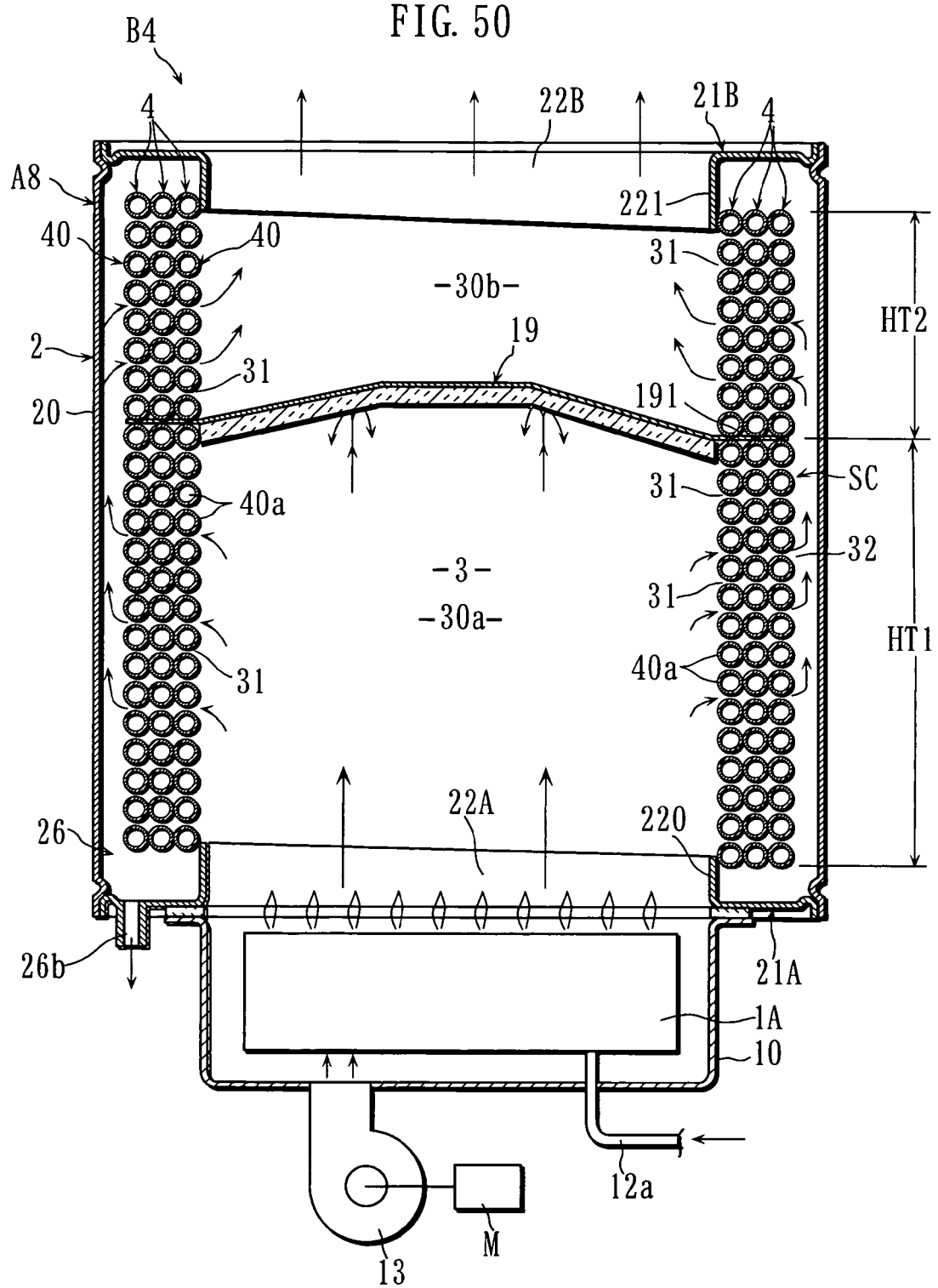
FIG. 50 is a sectional view showing an example of heat exchanger and water heater incorporating the heat exchanger according to the present invention.
Figure 51:
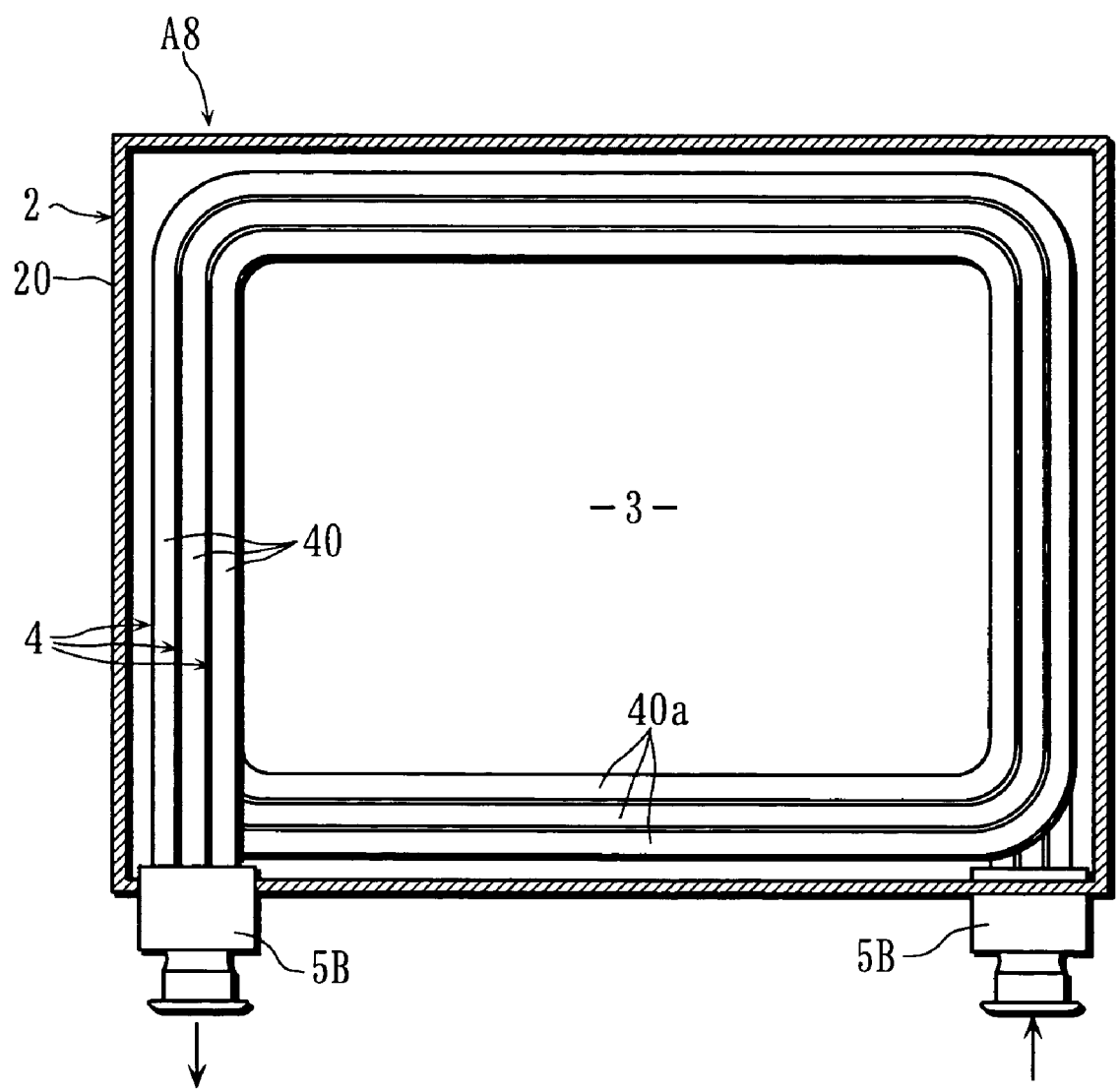
FIG. 51 is a horizontal sectional view of FIG. 50.
Figure 52:
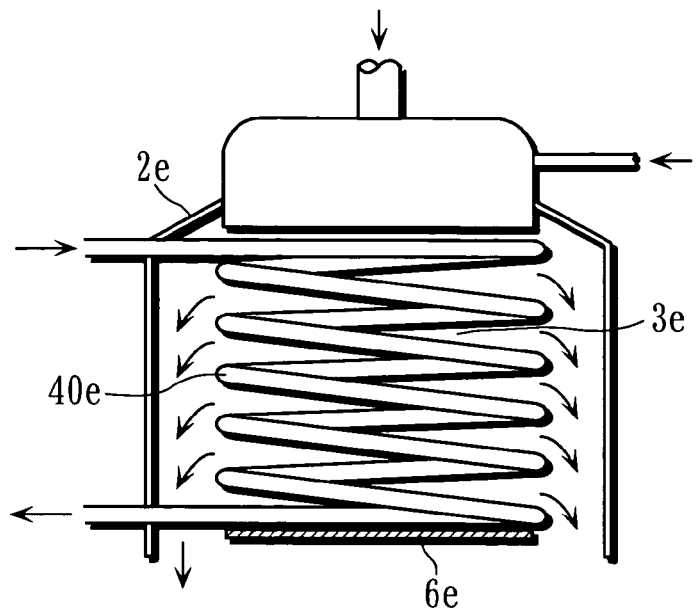
FIG. 52 shows an example of prior art structure.
Figure 53:
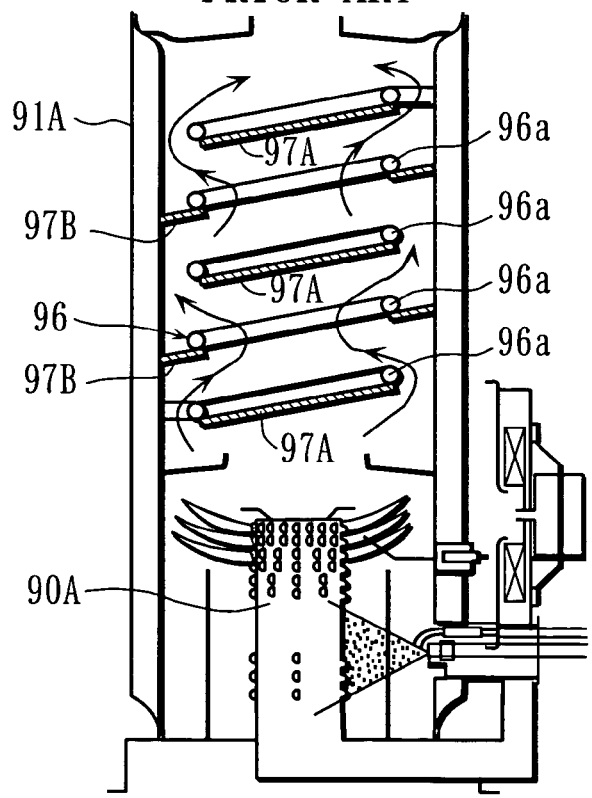
FIG. 53 shows another example of prior art structure.

FIGS. 50 and 51 show an example of water heater which utilizes a forward-combustion burner. The water heater B4 shown in the figures includes a burner 1A and a heat exchanger A8. The burner 1A is a gas burner for upwardly burning fuel gas such as natural gas supplied through a gas supply pipe 12a, for example. The burner is surrounded by a housing 10 connected to the bottom of the heat exchanger A8. A fan 13 is also provided to supply air for combustion upward into the housing 10.

The heat exchanger A8 includes a housing 2 formed with a burner opening 22A at the bottom thereof and is positioned directly above the burner 1A. A combustion gas outlet 22B is formed at the top of the housing 2. The structure of the heat exchanger A8 is generally the same as that obtained by turning the heat exchanger A3 shown in FIG. 17 upside down. However, the position of the drain receiving portion 26 is not inverted, and the drain receiving portion is formed at the bottom of the housing 2. As shown in FIG. 51, each of the coiled tubes 40 includes rectangular loops 40a helically connected to each other, and the circumferential wall 20 of the housing 2 is in the form of a hollow rectangular prism conforming to the loops. Though not illustrated in the figures, the fuel combustion portion of the burner 1A is rectangular in plan view, and the shapes of the loops 40a and the circumferential wall 20 correspond to this. Therefore, when the fuel combustion portion of the burner 1A is circular in plan view, the loops 40a and the circumferential wall 20 can be circular. Headers 5B are connected to opposite ends of the coiled tubes 40. Specifically, the headers 5B are connected directly to opposite ends of the coiled tubes 40.

In the water heater B4 of this embodiment, the combustion gas generated in the burner 1A flows upward through the burner opening 22A to enter the first region 30a of the space 3. Then, the combustion gas passes through the clearances 31 of the first heat exchanging portion HT1 to flow upward within the combustion gas path 32. Thereafter, the combustion gas passes through the clearances 31 of the second heat exchanging portion HT2 to enter the second region 30b and is then discharged out of the housing 2 through the combustion gas outlet 22B. This heat recovery process is basically the same as that of the reverse-combustion burner, and sensible heat recovery and latent heat recovery can be performed in the first and the second heat exchanging portion HT1 and HT2, respectively. When the combustion gas passes through the clearances 31 of the first and the second heat exchanging portions HT1 and HT2, the combustion gas comes into contact with many loops 40a, whereby the heat exchange efficiency is enhanced. Further, the drain generated accompanying the latent heat recovery flows downward along the helical gradient of each coiled tube 40 to be received in the drain receiving portion 26. Then, the drain is properly discharged out of the housing 2 through the discharge port 26b.

As will be understood from this embodiment, the advantages of the heat exchanger according to the present invention can be obtained also when the heat exchanger is used in combination with a forward-combustion burner instead of a reverse-combustion burner. Thus, the heat exchanger according to the present invention is effective regardless of the flow direction of the combustion gas.

The present invention is not limited to the foregoing embodiments. The specific structure of each portion of the heat exchanger and the water heater according to the present invention may be modified in various ways.

As the burner, various kinds of burner can be used as long as it generates combustion gas, and an oil burner or a gas burner may be used, for example. The water heater in the present invention means any apparatus having the function to produce hot water and includes various kinds of water heating apparatuses for supplying hot water for general use, for a bath, for space heating or for melting snow, and other apparatuses which produce hot water for the purposes other than hot water supply.

The invention claimed is:

1. A heat exchanger comprising:
   a housing including axially opposite ends formed with a burner opening and a combustion gas outlet, respectively;
   a heat-exchange coiled tube including a plurality of loops arranged in the housing along the axial direction via a plurality of clearances;
   a space surrounded by the coiled tube and having one end communicating with the burner opening; and
   a combustion gas path formed around the coiled tube for guiding the combustion gas flowed thereto to the combustion gas outlet;
   wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;
   wherein combustion gas supplied to the first region flows to the combustion gas path by passing through a plurality of clearances of the first heat exchanging portion and then passes through a plurality of clearances of the second heat exchanging portion,
   wherein the coiled tube comprises a flat tube having a thickness in the axial direction and a width in a direction crossing the axial direction, the width being larger than the thickness, and
   wherein the width of the flat tube is larger in the second heat exchanging portion than in the first heat exchanging portion.

2. A heat exchanger comprising:
   a housing including axially opposite ends formed with a burner opening and a combustion gas outlet, respectively;
   a heat-exchange coiled tube including a plurality of loops arranged in the housing along the axial direction via a plurality of clearances;
   a space surrounded by the coiled tube and having one end communicating with the burner opening; and
   a combustion gas path formed around the coiled tube for guiding the combustion gas flowed thereto to the combustion gas outlet;
   wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;
   wherein combustion gas supplied to the first region flows to the combustion gas path by passing through a plurality of clearances of the first heat exchanging portion and then passes through a plurality of clearances of the second heat exchanging portion,
   wherein the coiled tube comprises a flat tube having a thickness in the axial direction and a width in a direction crossing the axial direction, the width being larger than the thickness, and
   wherein at least part of the coiled tube is inclined to reduce height as proceeding in a direction in which the combustion gas passes through the clearance.

3. A heat exchanger comprising:
   a housing including axially opposite ends formed with a burner opening and a combustion gas outlet, respectively;
   a heat-exchange coiled tube including a plurality of loops arranged in the housing along the axial direction via a plurality of clearances;
   a space surrounded by the coiled tube and having one end communicating with the burner opening; and
   a combustion gas path formed around the coiled tube for guiding the combustion gas flowed thereto to the combustion gas outlet;
   wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;
   wherein combustion gas supplied to the first region flows to the combustion gas path by passing through a plurality of clearances of the first heat exchanging portion and then passes through a plurality of clearances of the second heat exchanging portion, and
   wherein the first and the second heat exchanging portions differ from each other in dimension of the clearance.

4. A heat exchanger comprising:
   a housing including axially opposite ends formed with a burner opening and a combustion gas outlet, respectively;
   a heat-exchange coiled tube including a plurality of loops arranged in the housing along the axial direction via a plurality of clearances;
   a space surrounded by the coiled tube and having one end communicating with the burner opening; and
   a combustion gas path formed around the coiled tube for guiding the combustion gas flowed thereto to the combustion gas outlet;
   wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;
   wherein combustion gas supplied to the first region flows to the combustion gas path by passing through a plurality of clearances of the first heat exchanging portion and then passes through a plurality of clearances of the second heat exchanging portion, and
   wherein the heat exchanger further comprises at least one additional coiled tube which differs from said coiled tube in either one of diameter of the loops and width of the loops, the plurality of coiled tubes being arranged in a lap winding manner to form a tube lap winding structure in which the plurality of loops are arranged along the axial direction and along a direction crossing the axial direction; and wherein the tube lap winding structure is partitioned into the first and the second heat exchanging portions.

5. The heat exchanger according to claim 4, wherein each of the coiled tubes comprises a helical tube in which the plurality of loops are helically connected to each other.

6. The heat exchanger according to claim 4, wherein the plurality of coiled tubes are equal to each other in tube diameter.

7. The heat exchanger according to claim 4, wherein the plurality of coiled tubes are unequal to each other in tube diameter, and the innermost coiled tube has largest tube diameter.

8. The heat exchanger according to claim 4, wherein the first and the second heat exchanging portions are partitioned from each other by either of the partition and a member separate from the partition.

9. A heat exchanger comprising:
a housing including axially opposite ends formed with a burner opening and a combustion gas outlet, respectively;
a heat-exchange coiled tube including a plurality of loops arranged in the housing along the axial direction via a plurality of clearances;
a space surrounded by the coiled tube and having one end communicating with the burner opening;
a combustion gas path formed around the coiled tube for guiding the combustion gas flowed thereto to the combustion gas outlet; and
a partitioning portion closing a gap between an end of the coiled tube and the housing and preventing the combustion gas from flowing directly from the first region to an end of the combustion gas path which is adjacent to the burner opening,
wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances; and
wherein combustion gas supplied to the first region flows to the combustion gas path by passing through a plurality of clearances of the first heat exchanging portion and then passes through a plurality of clearances of the second heat exchanging portion.

10. A heat exchanger comprising:
a housing including axially opposite ends formed with a burner opening and a combustion gas outlet, respectively;
a heat-exchange coiled tube including a plurality of loops arranged in the housing along the axial direction via a plurality of clearances;
a space surrounded by the coiled tube and having one end communicating with the burner opening; and
a combustion gas path formed around the coiled tube for guiding the combustion gas flowed thereto to the combustion gas outlet;
wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;
wherein combustion gas supplied to the first region flows to the combustion gas path by passing through a plurality of clearances of the first heat exchanging portion and then passes through a plurality of clearances of the second heat exchanging portion,
wherein the combustion gas path is formed continuously around the first and the second heat exchanging portions; and
wherein the heat exchanger further comprises a partitioning portion closing an end of the combustion gas path which is adjacent to the combustion gas outlet and preventing the combustion gas reached the end from flowing directly to the second region.

11. A heat exchanger comprising:
a housing including axially opposite ends formed with a burner opening and a combustion gas outlet, respectively;
a heat-exchange coiled tube including a plurality of loops arranged in the housing along the axial direction via a plurality of clearances;
a space surrounded by the coiled tube and having one end communicating with the burner opening;
a combustion gas path formed around the coiled tube for guiding the combustion gas flowed thereto to the combustion gas outlet;
a first auxiliary partition partitioning each of the second heat exchanging portion and the combustion gas path in the axial direction into two divided portions and causing the combustion gas passed a portion of the combustion gas path around the first heat exchanging portion to flow to a clearance of one of the divided portions of the second heat exchanging portion to guide the combustion gas into the second region; and
a second auxiliary partition for preventing the combustion gas guided into the second region from directly flowing to the combustion gas outlet and causing the combustion gas to flow to a clearance of another one of the divided portions of the second heat exchanging portion
wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances; and
wherein combustion gas supplied to the first region flows to the combustion gas path by passing through a plurality of clearances of the first heat exchanging portion and then passes through a plurality of clearances of the second heat exchanging portion.

12. The heat exchanger according to claim 11, wherein the second heat exchanging portion is extended beyond the second auxiliary partition toward the combustion gas outlet, and the combustion gas flowed to a portion of the combustion gas path which surrounds the extended portion passes through a clearance of the extended portion.

13. A water heater comprising a burner and a heat exchanger for recovering heat from combustion gas generated by the burner,
wherein the heat exchanger comprises:
a housing including axially opposite ends formed with a burner opening and a combustion gas outlet, respectively;

a heat-exchange coiled tube including a plurality of loops arranged in the housing along the axial direction via a plurality of clearances;

a space surrounded by the coiled tube and having one end communicating with the burner opening; and a combustion gas path formed around the coiled tube for guiding the combustion gas flowed thereto to the combustion gas outlet;

wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;

wherein combustion gas supplied to the first region flows to the combustion gas path by passing through a plurality of clearances of the first heat exchanging portion and then passes through a plurality of clearances of the second heat exchanging portion, wherein a water inflow tube is connected to the first heat exchanging portion, whereas a hot-water outflow tube is connected to the second heat exchanging portion; and wherein water from the water inflow tube flows through the second heat exchanging portion after flowing through the first heat exchanging portion.

14. A water heater comprising a burner and a heat exchanger for recovering heat from combustion gas generated by the burner, wherein the heat exchanger comprises:

a housing including axially opposite ends formed with a burner opening and a combustion gas outlet, respectively;

a heat-exchange coiled tube including a plurality of loops arranged in the housing along the axial direction via a plurality of clearances;

a space surrounded by the coiled tube and having one end communicating with the burner opening; and a combustion gas path formed around the coiled tube for guiding the combustion gas flowed thereto to the combustion gas outlet;

wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;

wherein combustion gas supplied to the first region flows to the combustion gas path by passing through a plurality of clearances of the first heat exchanging portion and then passes through a plurality of clearances of the second heat exchanging portion, and wherein the heat exchanger is so oriented that the burner opening is positioned higher than the combustion gas outlet;

wherein the burner is connected to an upper portion of the heat exchanger and burns fuel downward; and wherein a bottom casing for guiding combustion gas flowed downward through the combustion gas outlet to an exhaust port is connected to a lower portion of the heat exchanger.

15. The water heater according to claim 14, further comprising a drain receiving portion provided in the housing of the heat exchanger for receiving drain dropping from the coiled tube; and drain discharge means for discharging drain received by the drain receiving portion to outside of the heat exchanger so that the drain does not flow into the bottom casing.

16. The water heater according to claim 14, wherein the heat exchanger is so configured that drain dropping from the coiled tube is guided to the combustion gas outlet; and wherein a drain receiving member for receiving drain dropping through the combustion gas outlet and discharging the drain to outside of the bottom casing is provided in the bottom casing.

17. water heater according to claim 14, wherein the heat exchanger is so configured that drain dropping from the coiled tube is guided to the combustion gas outlet; and wherein the bottom casing includes a bottom wall for receiving drain dropping through the combustion gas outlet and a discharge port for discharging the drain received on the bottom wall to outside.

18. A water heater comprising a burner and a heat exchanger for recovering heat from combustion gas generated by the burner, wherein the heat exchanger comprises:

a housing including axially opposite ends formed with a burner opening and a combustion gas outlet, respectively;

a heat-exchange coiled tube including a plurality of loops arranged in the housing along the axial direction via a plurality of clearances;

a space surrounded by the coiled tube and having one end communicating with the burner opening; and a combustion gas path formed around the coiled tube for guiding the combustion gas flowed thereto to the combustion gas outlet;

wherein the heat exchanger further comprises a partition which closes an axially intermediate portion of the space to partition the space in the axial direction into a first and a second regions and to partition the coiled tube into a first and a second heat exchanging portions surrounding the first region and the second region, respectively and each including a plurality of loops and a plurality of clearances;

wherein combustion gas supplied to the first region flows to the combustion gas path by passing through a plurality of clearances of the first heat exchanging portion and then passes through a plurality of clearances of the second heat exchanging portion, wherein the heat exchanger is so oriented that the burner opening is positioned lower than the combustion gas outlet;

wherein the burner is connected to a lower portion of the heat exchanger and burns fuel upward; and wherein the heat exchanger further comprises a drain receiving portion for receiving drain dropping from the coiled tube, and drain discharge means for discharging the drain received by the drain receiving portion to outside of the heat exchanger so that the drain does not drop onto the burner.

19. The water heater according to claim 18, wherein each of the loops is rectangular, the housing includes a circumferential wall which is in a form of a rectangular cylinder and which surrounds the loops, and the combustion gas path is defined between the circumferential wall and the loops.

* * * * *